United States Patent [19]

Nakatsuyama

[11] Patent Number: 6,108,676
[45] Date of Patent: Aug. 22, 2000

[54] DOCUMENT PROCESSING APPARATUS, DOCUMENT TYPE DETERMINING METHOD, AND HIERARCHICAL REGULAR EXPRESSION DETERMINING METHOD

[75] Inventor: Hisashi Nakatsuyama, Nakai-machi, Japan

[73] Assignee: Fuji Xerox Co., Ltd., Tokyo, Japan

[21] Appl. No.: 08/958,331

[22] Filed: Oct. 27, 1997

[30] Foreign Application Priority Data

Oct. 28, 1996 [JP] Japan .................................. 8-285659

[51] Int. Cl.[7] .................................................. G06F 17/30
[52] U.S. Cl. ........................... 707/522; 707/104; 707/513
[58] Field of Search .................................... 707/513, 501, 707/522, 500, 101, 103, 1, 4, 100

[56] References Cited

U.S. PATENT DOCUMENTS

| | | | |
|---|---|---|---|
| 5,251,314 | 10/1993 | Williams | 707/101 |
| 5,542,086 | 7/1996 | Andrew et al. | 707/6 |
| 5,557,720 | 9/1996 | Brown, Jr. et al. | 707/513 |
| 5,583,762 | 12/1996 | Shafer | 707/532 |
| 5,629,846 | 5/1997 | Crapo | 708/705 |
| 5,649,218 | 7/1997 | Saito | 707/513 |
| 5,655,130 | 8/1997 | Dodge et al. | 707/511 |
| 5,708,806 | 1/1998 | Derose et al. | 707/104 |
| 5,727,195 | 3/1998 | Nakatsuyama | 707/1 |
| 5,745,745 | 4/1998 | Tada et al. | 707/1 |
| 5,752,021 | 5/1998 | Nakatsuyama et al. | 707/5 |
| 5,875,441 | 2/1999 | Nakatsuyama | 707/1 |
| 5,915,259 | 6/1999 | Murata | 707/513 |
| 5,924,105 | 7/1999 | Punch, III et al. | 707/513 |
| 6,009,442 | 12/1999 | Chen et al. | 707/522 |
| 6,014,680 | 1/2000 | Sato et al. | 707/513 |
| 6,021,202 | 2/2000 | Anderson et al. | 705/54 |

FOREIGN PATENT DOCUMENTS 7-319917 12/1995 Japan .
8-190542 7/1996 Japan .

OTHER PUBLICATIONS

Papakonstantinou et al, "Enhancing Semistructured Data Mediators with Document Type Definitions", Proceedings of 15th International Conference on Data Engineering, IEEE, pp. 136–145, 1999.

(List continued on next page.)

Primary Examiner—Joseph H. Feild
Assistant Examiner—Robert D. Bourque
Attorney, Agent, or Firm—Oliff & Berridge, PLC

[57] ABSTRACT

It is an object of the invention to simultaneously process documents of a plurality of document types by simple management and simple inputs by the user. A document process designating means 3 determines a target document type as a target to be processed and a process to be executed. A finite-state automaton constructing means 4a composes a finite-state automaton from a content model defining lower elements included in each document type inputted. A document type collation control means 4c inputs a set of finite-state automatons having elements included in both the target document type and a document type to be compared to a finite-state automaton collating means 4b. The finite-state automaton collating means 4b determines whether the two finite-state automatons have a predetermined relationship. The document type collation control means 4c detects a related document type having a predetermined relationship with the target document type from the result of the collation by the finite-state automaton collating means 4b. A document process executing means 5 executes a process to both the target document type and a document of the related document type as targets to be processed.

14 Claims, 46 Drawing Sheets

OTHER PUBLICATIONS

Poullet et al, "Semantic Structuring of Documents", Proceedings of Third Basque International Workshop on Information Technology, IEEE, pp. 118–124, 1997.

Kochi et al, "User–defined Template for Identifying Document Type and Extracting Information form Documents", Proceedings of Fifth International Conference on Document Analysis and Recognition, IEEE, pp. 127–130, 1999.

Bohm et al, "Query Optimization for Structured Documents Based on Knowledge on the Document Type Definition", Proceedings of IEEE International Forum on Research and Technology Advances in Digital Libraries, IEEE, pp. 196–205, 1998.

Buford et al, "Integrating Object–Oriented Scripting Languages with HyTime", Proceedings of International Conference on Multimedia Computing and Systems, IEEE, pp. 425–434, 1994.

"Making Hypermedia Work: A User's Guide to HyTime", Steven J. DeRose et al., Kluwer Academic Publishers, 1994, Chapter 5.2.

"Facilities for Braille, large print and computer voice" of ISO 12083:1994.

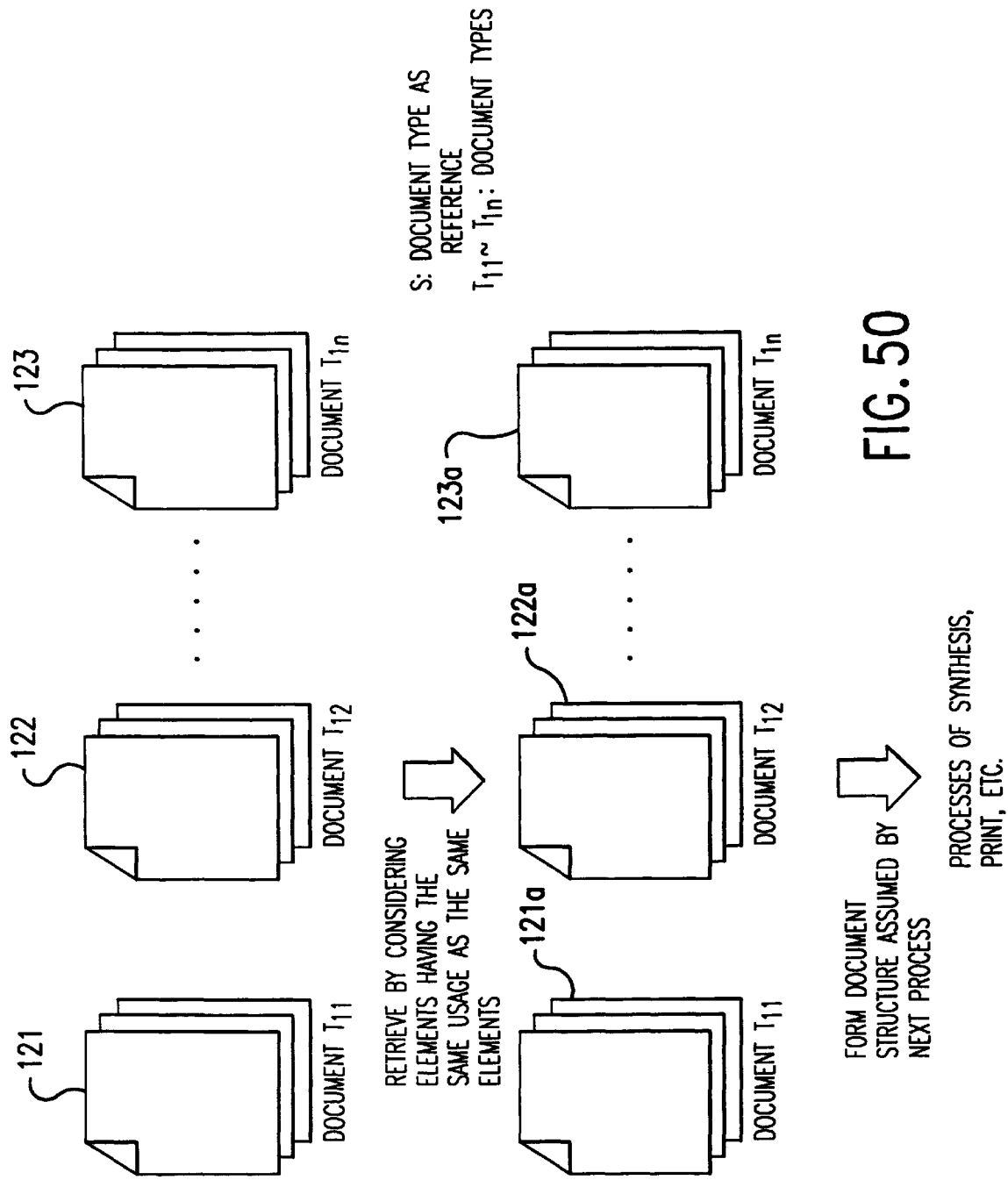

DOCUMENT PROCESSING APPARATUS, DOCUMENT TYPE DETERMINING METHOD, AND HIERARCHICAL REGULAR EXPRESSION DETERMINING METHOD

BACKGROUND OF THE INVENTION

1. Field of the Invention

The present invention relates to a document processing apparatus for processing a structured document, a document type determining method for determining document types, and a hierarchical regular expression determining method for determining hierarchical regular expressions. More particularly, the invention relates to a document processing apparatus for processing documents formed from a plurality of document types, a document type determining method for determining the inclusive or intersectional relationship of the document types, and a hierarchical regular expression determining method for determining the inclusive or intersectional relationship of languages received by hierarchical regular expressions.

2. Related Background Art

In a structured document, contents of the document are called a logical structure and are expressed by a tree structure consisting of a plurality of document constructing elements such as chapter, section, figure, and the like. FIG. 46 is a diagram showing an example of the logical structure. Such a logical structure 101 is not arbitrarily formed but is formed according to a syntax called a document type.

FIG. 47 is a diagram showing an example of the document type. In a document type 102, rectangular nodes define types of elements. The label of each rectangular node shows the name of the element type. The substance of the rectangular node having the same name is of the same element type. The element type having the name of "paragraph" in FIG. 47 is, recursively defined.

Nodes shown in oval define connection of the elements. The oval node is called a constructor. For example, in FIG. 3, a SEQ node shows that every node connecting to the SEQ node is generated sequentially as set forth by the numbers 1 and 2. An REP node denotes that any nodes connected to the REP node is generated on the basis of the document type. An OPT node denotes that a node that is connected to the OPT node does not have to appear, i.e., the node is optional. A CHO node denotes that any of the nodes connecting to the CHO node may be generated on the basis of the document type. The definition of the document type in FIG. 47 is described from the top to the bottom as follows. An "Article" comprises one "section" or more, and the a "section" is constructed by a "title", by zero or more "paragraphs" or "figures", and by zero or more "sections". As mentioned above, the "section" can be nested. The logical structure 101 in FIG. 46 satisfies the construction rules of the document type 102 in FIG. 47.

Although an example of a simple document type is shown in FIG. 47, document types in practical use are quite large and it is not unusual that the number of element types in a document type can reach into the hundreds.

A document type resembles a schema in a database. That is, in a document type, the meaning of the element of the document type and the relationship among the elements are described. As processing of a database is executed according to the schema, a structured document is processed on the basis of information about the document type. For example, a layout instruction is defined according to the document type. Based on the document type, a layout instruction is inputted, and a document layout is performed. In another example, necessary parts are properly extracted from existing documents and synthesized to form a new document. In this case, a new part can be inserted if it is necessary. In such a process, the information pertaining to the document type is used to specify necessary parts in a retrieving process step and to verify whether the newly constructed document is of a desired format in a verifying process step.

After a predetermined time period after the time of design, the request for the document type is usually changed and the document type definition is changed (this is called revision of the document type). In the case of a SGML, by defining entity parameters, referred to as a document type declaration subset, parts of the document type definition can be customized (this is called customization of the document type).

When the document type is used for a long time or in many aspects, by revision and customization of the document type, a number of document types are derived from the same document type, which are similar but different in some aspects. FIG. 48 illustrates a diagram showing an example of a derivation of document types. The solid lines show a derivation of document types by revision and the broken lines show a derivation of a document type by customization. The diagram shows that an original document type S is customized, thereby forming new document types T and U, and the document types S, T, and U are revised. Numbers beside S, T, and U show the number of revisions.

Usually, the user regards the document types derived from the same document type as the same, so that it is often necessary to simultaneously execute a process step such as retrieval of documents formed according to the document types.

However, since the process step of the structured document is described according to the document type, and depending on the revision or customization of the document type, there is the possibility that the process step used for the original document type cannot be applied to a document type defined by a derivation. Since the number of document types are large, as mentioned above, and the rules of definition of the different document types are complicated, it is extremely difficult to grasp the relationship between the original document type and the document types defined by a derivation. Consequently, it is necessary to define and execute the process steps individually for each document type.

The following techniques can be used for the problems addressed above. For example, the following four techniques can be used for the problems addressed above; (1) architectural forms of HyTime (Hypermedia/Time-based Structuring Language; the ISO/IEC 10744:1992); (2) the SDA (SGML Document Access) of ICADD (The International Committee of Accessible Document Design); (3) "Apparatus and method for managing document database" (hereinafter, called a "duplexing of logical structure") described in Japan Published Unexamined Patent Appln. No. Hei 8-190542; and (4) the technique defined in "Document database manager and document database system" (hereinafter, called a "semantic description") described in Japan Published Unexamined Patent Appln. No. Hei 7-319917.

The technique defined in the architectural form of HyTime is described in detail in Chapter 5.2 "Architectural forms" of "Making Hypermedia Work: A User's Guide to HyTime" (Steven J. DeRose and David G. Durand, Kluwer Academic Publishers, 1994). The SDA technique is described in detail in Chapter A.8 "Facilities for Braille, large print and computer voice" of ISO12083: 1994.

The above four conventional techniques can be divided into two kinds of methods: (1)normalization of the logical structure and (2)normalization of the element type. Architectural forms, SDA, and duplexing of logical structures belong to the former and semantic description belongs to the latter.

FIG. 49 is a diagram showing processes using the method of normalization of the logical structure. The diagram shows an example where documents are retrieved and a new document is created by synthesizing the results. According to this method of normalizing the logical structure, before executing a common process for documents 111 to 113 of a plurality of document types $T_1$ to $T_n$, for example, a document 114 having a logical structure conforming to a specific document type S serving as a reference is formed from logical structures of a documents to be processed, and the formed document 114 is processed.

FIG. 50 is a diagram showing a process using the method for normalization of elements. The diagram shows an example in which documents are retrieved and the results are synthesized, thereby creating a new document. In this method of normalizing the elements, attention is paid to purpose (usage, meaning) of the element type. For example, the element types of documents 121 to 123 derived from a plurality of document types $T_{11}$ to $T_{1N}$ which have the same purpose are regarded as the same. The purpose is either added to the document type definition or expressed so as to be related to the document type definition. When executing a retrieval step, a retrieval expression is converted by using information pertaining to the purpose. Documents 121a to 123a are obtained as the retrieval results having logical structures conforming to the original document types $T_{11}$ to $T_{1n}$. Consequently, prior to synthesis, it is necessary to preliminarily generate logical structures of the document types as a target to be synthesized from the logical structures obtained by the retrieval step.

Features of the conventional techniques will be respectively described hereinbelow.

The architectural form is a kind of meta-document type for extending a document type definition (DTD) of SGML. Information showing the relationship between an architectural form and the elements or attributes are defined for a document type according to the architectural form. By using the architectural form, the same semantics can be given to a plurality of different elements. For example, in case of the architectural form of HyTime, the semantics of hyperlink which are generally required by hypermedia are expressed.

In order to execute a process using the architectural form, it is necessary to perform a legitimate check of an SGML document and a legitimate check of the meta-document type with respect to each SGML document. The legitimate check of an SGML document checks whether the document conforms to the rule defined by the document type. The check is performed by an SGML validating parser. According to the legitimate check for the meta-document type, element names and attribute names of the document are replaced by names of the architectural form, and whether the resultant can be parsed by the meta-document type is checked. If the replacement of the names are completed, the check can also be executed by the SGML validating parser. Only documents satisfying the two legitimacies can be actual targets to be processed.

The document is processed by using not the document type itself but the architectural form as mentioned above, thereby enabling the document type to be freely designed in a predetermined range.

SDA also extends the document type of SGML in a manner similar to the architectural form and is used to form a document of a preliminarily defined document type (canonical document type) from one SGML document. In a document type using SDA, the relationship between elements of the document type and elements of the canonical document type is described. With respect to the relationship, there are simple one-to-one correspondences and a correspondence according to the context.

When a document of the canonical document type is formed from a document of a document type using SDA, it is also necessary to check the legitimacy as an SGML document. If the document conforms, the document structure is rewritten according to the information added to the document type, thereby enabling the document of the canonical document type to be obtained.

Also, by processing the document by using the canonical document type in a manner similar to the case of the architectural form, the document type can be designed freely in a predetermined range.

In the duplexing of a logical structure, when a document is stored into a database management apparatus, the logical structure in the database is formed from the original logical structure of the document. In the formation of the logical structure, a rule defined by a set comprising the document type of the original document and a document schema as a document type in the database is used. At the time of retrieval, by referring to only the logical structure in the database, a group of documents formed according to a plurality of document types can be uniformly retrieved.

According to the semantic description, when a document schema, equivalent to a document type, in the database is defined, the semantic description expressing the semantics is added to elements of the document schema. The semantic description is defined in the database. A plurality of document types can be retrieved by either forming a retrieval expression in which conditions regarding the semantic description are designated from a retrieval expression in which conditions regarding the document element are designated, conversely, forming a retrieval expression in which conditions regarding the document element are designated from a retrieval expression in which conditions regarding the semantic description are designated, or by a combination of the above forming methods.

The method of normalizing the logical structure (architectural form, SDA, duplexing of logical structure) has, however, the following problems.

First, it is difficult to design the document type as a reference. It is extremely difficult to define a document type as a reference before using the document type, which can withstand revisions or customization for a long time. It is also difficult to define the document type serving as a reference after a plurality of document types are derived by revision or customization.

Secondly, preparation costs are high. The burden on a designer of a document type is heavy when the document type is defined since he has to acquire knowledge regarding the architectural form or SDA to fill the document type with information. According to the duplexing of logical structure, it is necessary to define a rule for forming a logical structure conforming to a document type from a logical structure of a document conforming to a certain document type. Furthermore, according to the duplexing of logical structure, in order to obtain a desired document type as a retrieval result, a rule for forming a logical structure of a desired document type from logical structures conforming to a document schema has to be defined. Since the definition of the rule is complicated, the burden on the end user (database manager) becomes heavier when the database is being operated.

Thirdly, execution costs are high. The normalization of the logical structure is a high cost process. Since logical structures of many documents have to be normalized, processing costs for preparation of a batch process are also high.

On the other hand, the method of normalizing the element (semantic description) has the following problems.

First, settings of the semantic description are difficult. When the semantic description is too general, element types whose purposes are quite different are regarded as the same. Conversely, when the semantic description is too specific, even if the purposes of element types are the same in a sense, they are discriminated as different purposes. Consequently, it is very difficult to set proper semantic description.

Secondly, it is necessary to normalize the structure for a document process. In the semantic description, attention is paid to only the purpose of element types and their lower structure is ignored. Consequently, when a plurality of document types are retrieved by using the semantic description, the original logical structure of the document is derived as a result. In order to execute a synthesis or the like of the retrieved result, it is necessary to form a logical structure conforming to the document type from the logical structure of the retrieved result. Executing costs of the process for forming the logical structure are high. The processing time increases as the number of the retrieval results increases.

SUMMARY OF THE INVENTION

In view of the foregoing, it is an object of the invention to provide a document processing apparatus which can process documents having a plurality of document types by performing simple management and simple inputting operations by the user.

According to the invention, in order to solve the problems noted above, there is provided a document processing apparatus in which a structured document is targeted to be processed, comprising a document type holding means for holding information pertaining to a plurality of document types; a document holding means for holding documents formed according to any of the document types held in the document type holding means; a document processing designating means for designating a target document type as a target to be processed and a processing to be executed; a document type collating means for constructing finite-state automatons from a content model defining lower elements which can be held by an element in the document type on the basis of the document types held in the document type holding means and an finite-state automaton of the target document type is compared with the finite-state automatons of document types other than the target document type, thereby obtaining a related document type having a predetermined relationship with the targeted document type; and document process executing means for executing a process instructed by the document process designating means to a document targeted as a document type and a related document type which are targets to be processed among the documents held by the document holding means.

According to the document processing apparatus, the user designates the target document type that should be processed and the type of processing to be executed by the document process designating means. The document type collating means construct finite-state automatons from the content model thereby defining lower elements which can be held in the document type on the basis of the document types held in the document type holding means and obtaining a related document type having a predetermined relationship with the target document type by comparing the finite-state automaton of the target document type with the finite-state automatons of other document types. The document process executing means executes the contents instructed by the document process designating means for a document of the target document type and a related document type which are among the documents held in the document holding means.

Thus, the user can simultaneously execute processing for a document of the target document type and a related document type having a predetermined relationship with the target document type by designating the target document type as a target to be processed and executing the contents of the process.

There is also provided a document type determining method for determining the inclusive relationship of a document type and for determining a possible structure of a structured document, comprising: a document type inputting step for designating the first document type and the second document type which are to be compared; a finite-state automaton constructing step for constructing finite-state automatons from content models defining lower elements which can be held in the first and second document types, respectively; a finite-state automaton collating step for determining whether a language received by the finite-state automaton which is constructed from the first document type is included in a language received by the finite-state automaton which is constructed from the second document type, the two finite-state automatons being constructed from elements using the same name in the first and second document types, respectively; and a document type collating step for determining the presence or absence of the inclusive relationship by checking whether the element using the same name in the first document type exists in the second document type and whether the language defined by the element in the first document type is included in the language defined by the element in the second document type.

According to the document type determining method, first, the first and second document types are inputted during the document type inputting step. Subsequently, in the finite-state automaton constructing step, finite-state automatons are constructed from the content models of the first and second document types, respectively. In the finite-state automaton collating step, with respect to the two finite-state automatons constructed from the elements using the same name in the first and second document types, a determination is made on whether the language received by the finite-state automaton constructed from the first document type is included in the language received by the finite-state automaton constructed from the second document type . In the document type collating step, whether the element using the same name in the first document type exists in the second document type and whether the language defined by the element in the first document type is included in the language defined by the element of the second document type is checked, hereby determining the presence or absence of the inclusive relationship.

Thus, only by inputting the first and second document types, the user can determine whether the document types inputted have the inclusive relationship or not.

There is also provided a document type determining method for determining the intersectional relationship of the document types and for determining possible structures of structured documents, comprising: a document type inputting step for designating a first document type and a second document type which are to be compared; a finite-state automaton constructing step for constructing finite-state automatons from content models defining lower elements which can be held in the first and second document types, respectively; a finite-state automaton collating step for determining whether the intersectional relationship exists for the two finite-state automatons constructed from the elements using the same name which exits in both of the first and second document types, respectively; and a document type collating step of determining the presence or absence of the intersectional relationship by checking whether there is a document which can be formed from both of the first document type and the second document type from the determination result of the intersection of the languages of the elements existing in both of the first and second document types.

According to the document type determining method, first, in the document type inputting step, the first and second document types are inputted. Subsequently, in the finite-state automaton constructing step, finite-state automatons are constructed from the content models of the elements in the first and second document types respectively. In the finite-state automaton collating step, with respect to the set of elements having the same name in the first and second document types, the finite-state automatons constructed from the content models are collated with each other, and it can be determined whether languages received by the content models intersect. In the document type collating step, whether there is a document which can be formed from both of the first and second document types is checked from the determination result of the language intersection of the element which exists in both the first and second document types, thereby determining the presence or absence of the intersectional relationship.

Thus, only by inputting the first and second document types, can the user determine whether the inputted document types have the intersectional relationship.

There is also provided a hierarchical regular expression determining method of determining the inclusive relationship of languages received by hierarchical regular expressions, comprising: a hierarchical regular expression inputting step for designating a first hierarchical regular expression and a second hierarchical regular expression which are to be compared; a finite-state automaton constructing step for constructing finite-state automatons from content models defining lower elements which can be held in the first and second hierarchical regular expressions, respectively; a finite-state automaton collating step for determining whether a language received by the finite-state automaton constructed from the first hierarchical regular expression is included in a language received by the finite-state automaton constructed from the second hierarchical regular expression, the two finite-state automatons being constructed from elements using the same name in the first and second hierarchical regular expressions; and a hierarchical regular expression collating step for determining the presence or absence of the inclusive relationship by checking whether the element using the same name as the element in the first hierarchical regular expression exists in the second hierarchical regular expression and whether the language defined by the element in the first hierarchical regular expression is included in the language defined by the element in the second hierarchical regular expression.

According to the hierarchical regular expression determining method, first, in the hierarchical regular expression inputting step, first and second hierarchical regular expressions are inputted. Subsequently, in the finite-state automaton constructing step, finite-state automatons are constructed from the content models of elements of the first and second hierarchical regular expressions, respectively. In the finite-state automaton collating step, with respect to the set of the elements using the same name in the first and second hierarchical regular expressions, the finte-state automatons constructed from the content models are collated with each other, and a determination is made as to whether languages received by the content models intersect. In the hierarchical regular expression collating step, whether the element using the same name as the element in the first hierarchical regular expression exists in the second hierarchical regular expression and whether the language defined by the element in the first hierarchical regular expression is included in the language defined by the element in the second hierarchical regular expression is checked, thereby determining the presence or absence of the inclusive relationship.

Thus, only by inputting the first and second hierarchical regular expression, the user can determine whether the inputted hierarchical regular expressions have the inclusive relationship or not.

There is also provided a hierarchical regular expression determining method of determining the intersectional relationship of the hierarchical regular expressions, comprising: a hierarchical regular expression inputting step for designating a first hierarchical regular expression and a second hierarchical regular expression which are to be compared; a finite-state automaton constructing step for constructing finite-state automatons from regular expressions defining lower elements of respective elements in the first and second hierarchical regular expressions; a finite-state automaton collating step for determining whether the two finite-state automatons constructed from the elements of the same name existing in both of the first and second hierarchical regular expressions have the intersectional relationship ; and a hierarchical regular expression collating step for determining the presence or absence of the intersectional relationship by checking whether there is a document which can be formed from both of the first and second hierarchical regular expressions from the determination result of the intersection of the languages of the elements existing in both of the first and second hierarchical regular expressions.

According to the hierarchical regular expression determining method, first, in the hierarchical regular expression inputting step, the first and second hierarchical regular expressions are inputted. Subsequently, in the finite-state automaton constructing step, finite-state automatons are constructed from the content models of the elements in the first and second hierarchical regular expressions. In the finite-state automaton collating step, whether the intersectional relationship exists in the two finite-state automatons constructed from the elements using the same name existing in both of the first and second hierarchical regular expressions is determined. In the hierarchical regular expression collating step, whether there is a document which can be formed from both of the first and second hierarchical regular expressions is checked from the determination result of the intersection of the languages of the elements existing in the first and second hierarchical regular expressions, thereby determining the presence or absence of the intersectional relationship.

Thus, only by inputting the first and second hierarchical regular expressions, the user can determine whether there is the intersectional relation between the inputted hierarchical regular expressions.

BRIEF DESCRIPTION OF THE DRAWINGS

and FIG. 50 is a diagram showing a process using normalization of an element.

DETAILED DESCRIPTION OF PREFERRED EMBODIMENTS

Embodiments of the invention will be described hereinbelow with references to the drawings.

Figure 1:
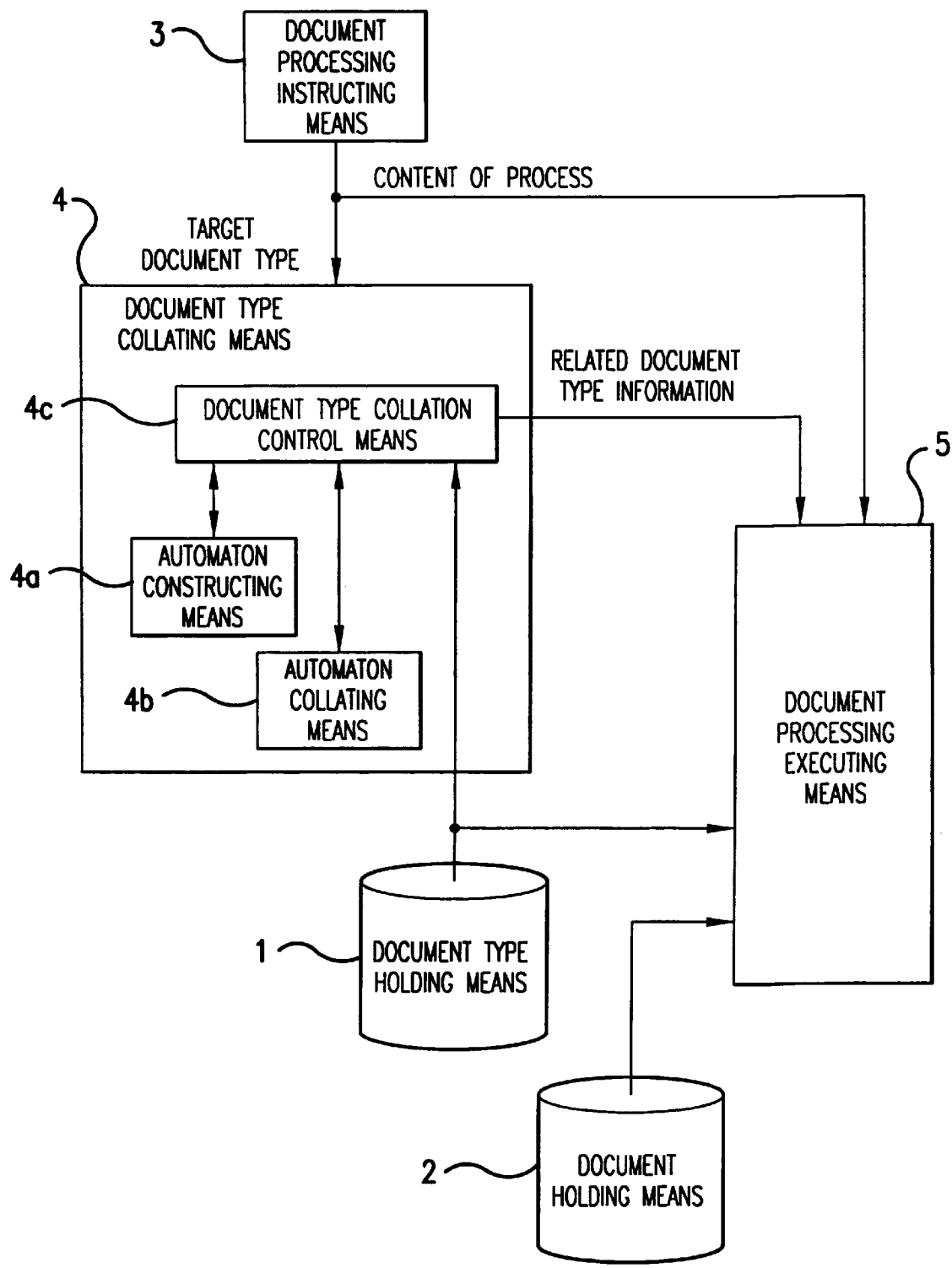
FIG. 1. is a diagram showing the principle construction of the invention.

FIG. 1 is a diagram showing a principle construction of the invention. A document processing system of the invention has a document type holding means 1 as storage means for holding information about a plurality of document types and a document holding means 2 for holding a document formed according to any document type held in the document type holding means 1. By using the information in these storage means, document processing can be performed.

A document processing designating means 3 generates a document type serving as a target to be processed and contents of a process to be executed. The target document type generated by the document process designating means 3 is inputted to a document type collating means 4. Instructions from the document process designating means 3 is inputted into a document process executing means 5.

The document type collating means 4 is constructed by a finite-state automaton constructing means 4a, a finite-state automaton collating means 4b, and a document type collation control means 4c. When the target document type is inputted from the document process designating means 3 to the document type collating means 4, the document type collation control means 4c retrieves document types from the document type holding means I one by one and inputs them into the finite-state automaton constructing means 4a. The finite-state automaton constructing means 4a composes a finite-state automaton from a content model defining lower elements that an element of each document type inputted can have. Thus, the finite-state automaton is formed in correspondence to each element of each document type.

The document type collation control means 4c selects documents types one by one to collate with the target document type, and inputs a set of finite-state automatons of an element included in the target document type and an element included in a document type to be compared with the target document type to the finite-state automaton collating means 4b. The finite-state automaton collating means 4b determines whether the inputted two finite-state automatons have a predetermined relationship. The document type collation control means 4c determines from the collation result by the finite-state automaton collating means 4b whether the target document type and another document type have a predetermined relationship. Information about the document type determined to have the predetermined relationship is sent, as related document type information, from the document type collation control means 4c to the document process executing means 5.

The document process executing means 5 regards the target document type and documents of the related document type as targets to be processed among the documents held by the document holding means 2 and executes a process having the contents generated by the document process designating means 3.

As mentioned above, as a result of the instructions generated for one document type, document types which can be generated conforming to the document type can be simultaneously generated. Moreover, it is not necessary to add information to the document type, or to execute a process of forming the logical structure, nor to prepare for the forming process. Therefore, the burden on the user is small.

Concerning the types of relationships exhibited by the document type to be collated by the document type collating means 4, there are the inclusive relationships and the intersecting relationships. The inclusive relationship denotes that every document conforming from one document type also always conforms to another document type. The intersecting relationship denotes that there exists documents which are generated from one document type which can conform to another document type.

The embodiment of the invention will be described in further detail.

Figure 2:
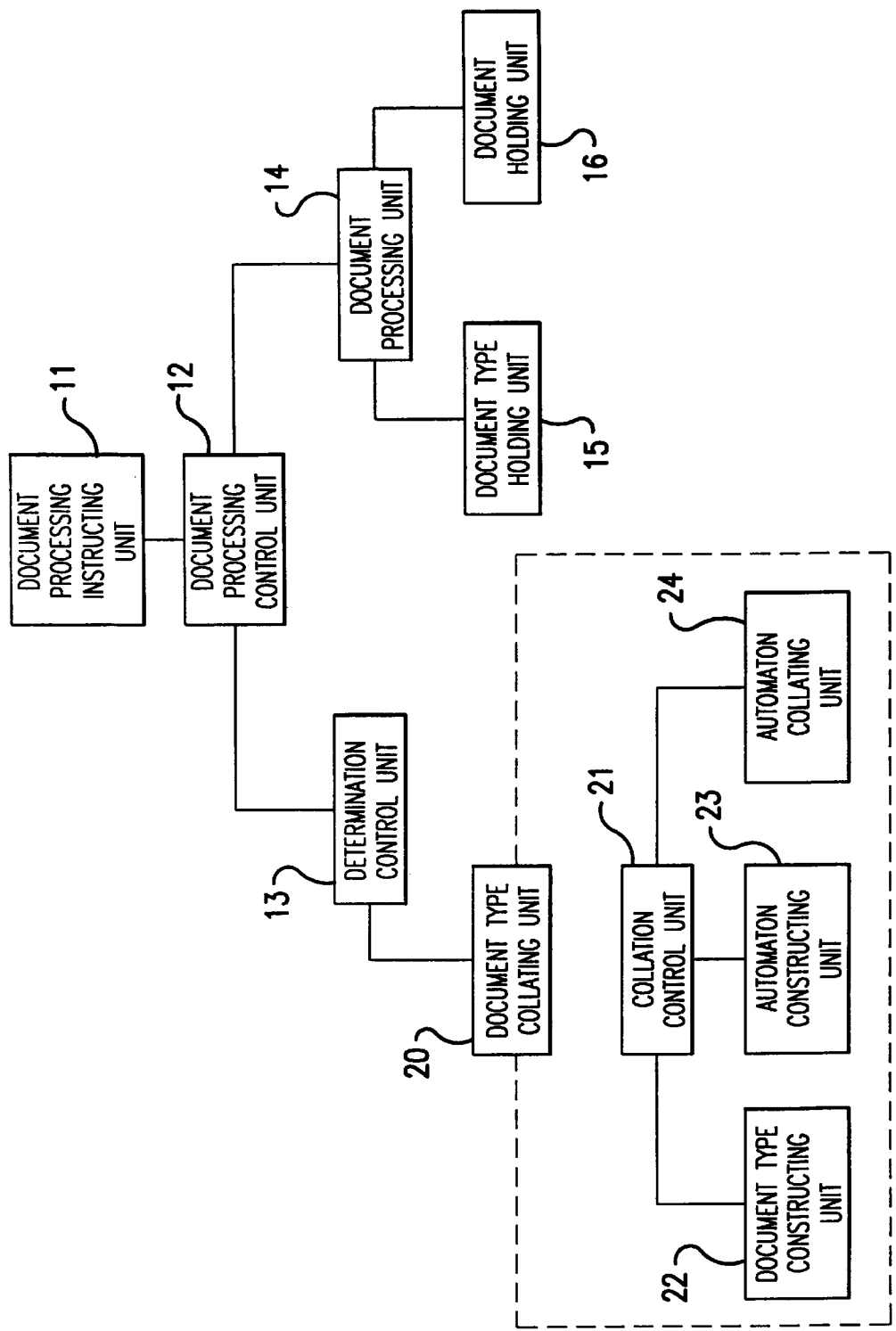
FIG. 2 is a schematic construction diagram of an embodiment of a document processing apparatus of the invention.

FIG. 2 is a diagram showing a schematic construction of the embodiment of the document processing apparatus of the invention. The document processing apparatus has a document type holding unit 15 for storing a plurality of document types and a document holding unit 16 for holding and storing a plurality of documents formed from any of the document types stored in the document type holding unit 15.

A document process designating unit 11 inputs instructions relating to document processing when a process is performed to a document in the document holding unit 16. The process instruction includes designation of a process, a document type as a reference for specifying the target to be processed, and the relationship between the designated document type. The relationship with the document type denotes either an inclusive or intersecting relationship. If there is an omission in the process instruction, a default value is preliminarily set, therefore, it is not always necessary to designate the relationship between the document type in the document process designating unit 11.

The instructions from the document process designating unit 11 is sent to a document process control unit 12. The document process control unit 12 inputs the information relating to the designated document type into a determination control unit 13 and obtains information of a document type having a predetermined relationship with the designated document type (related document type) as a return value. The document process control unit 12 sends an instruction relating to the document process in which the document of the designated document type and the document of the related document type are designated as targets to be processed in a document processing unit 14.

The determination control unit 13 retrieves a document type defining a language having a designated relationship with the language defined by the designated document type by using a document type collating unit 20. "Language" denotes a concept indicating whole documents which can be formed from the document type. During retrieval of a document type, first, the document type designated by the document process designating unit 11 is taken out from the document type holding unit 15 and the document type is sent to the document type collating unit 20. Afterwards, other specific document types are sequentially taken from the document type holding unit 15 and sent to the document type collating unit 20. Each time another specific document type is sent, a collation result comprising the specific document type and the designated document type is returned from the document type collating unit 20. That is, information indicating whether there is a predetermined relationship between the specific document type and the designated document type is acquired.

The document type collating unit 20 comprises a collation control unit 21, a document type constructing unit 22, a finite-state automaton constructing unit 23, and a finite-state automaton collating unit 24. The collation control unit 21 controls an entire collating process. The document type constructing unit 22 generates a document type for collation from the original document type if there is an element which can be omitted in the description of the structure in the document type definition. The finite-state automaton constructing unit 23 forms a finite-state automaton for collation from the content model of each element of the document type. The "content model of the element" defines the lower elements which can be connected to the element. The finite-state automaton collating unit 24 collates the finite-state automatons constructed from the element types having the same name of the document types to be compared and obtains the relationship between the languages defined by the content models. The document type collating unit 20 decides the relationships of the languages defined by the document types on the basis of the relationships of the languages defined by the content models of the element types having the same name.

The document type constructing unit 22 is a component provided only when the element which can be omitted from the description of the structure can also be defined in the structure of the document type.

The document processing unit 14 receives the information about the related document type from the document process control unit 12 and executes the document process relating to the designated contents of the target document type designated by the document process designating unit 11 and all documents formed from related document types. An example of this process is a retrieval process used in the database system. In a retrieval process, retrieval expressions or the like are inputted as instructions for the process.

The document processing apparatus shown in FIG. 2 is an embodiment of the principle construction shown in FIG. 1. There are corresponding relationships in the constructions.

The document type holding means 1 corresponds to the document type holding unit 15. The document holding means 2 corresponds to the document holding unit 16. The document process designating means 3 corresponds to the document process designating unit 11. With respect to the functions of the document type collating means 4, the finite-state automaton constructing means 4a corresponds to the finite-state automaton constructing unit 23, the finite-state automaton collating means 4b corresponds to the finite-state automaton collating unit 24, and the document type collation control means 4c corresponds to the collation control unit 21. Furthermore, the document process executing means 5 corresponds to the document process unit 14. The document process control unit 12 and the determination control unit 13 in FIG. 2 are used for controlling input and output of the information to/from the document type collating unit 20 and the document processing unit 14 and for assisting the functions of the document collating means 4 and the document processing means 5 in FIG. 1.

Before describing the details of the process contents of the embodiment, various information to be used and the like will be explained.

First, construction rules of the document type will be described. It is assumed that the content model is not ambiguous for the document type of the embodiment. For example, when a certain content model is (sect+|sect), it cannot be determined whether a subtree consisting of one sect is derived from a partial expression of sec+. or a partial expression of sect. Such a content model is defined as inhibited (an ambiguous content model is inhibited also in SGML).

When the content model is ambiguous, a non-deterministic finite-state automaton is constructed by a finite-state automaton constructing method which will be described hereinafter. Since it is generally known that an equivalent deterministic finite-state automaton which receives the same language is constructed from the non-deterministic finite-state automaton, the construction rules do not deteriorate the effects of the invention.

A process for collating a document defined by a specific element in a document type can be performed by the document processing apparatus by considering a document type having the element as the root.

Various data can be expressed in the following representations.

Figure 3:
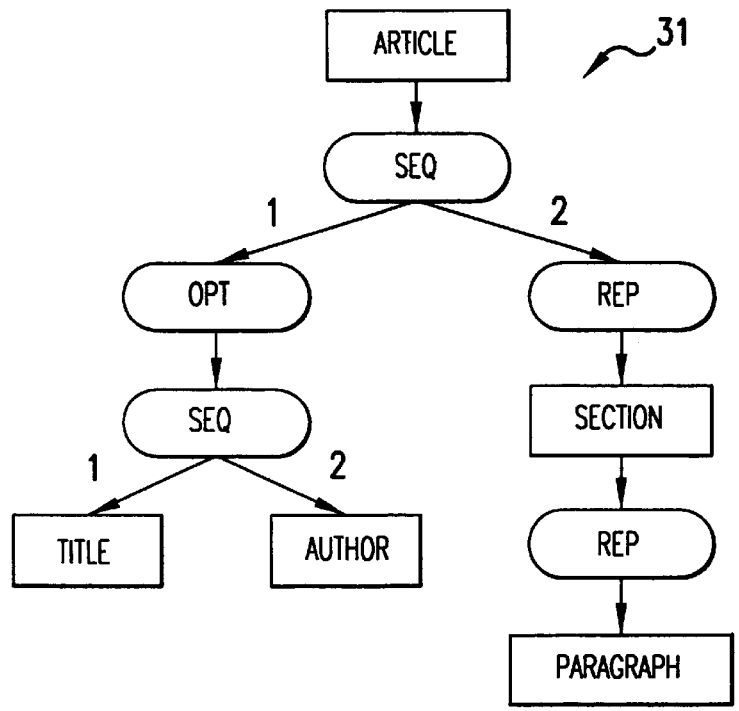
FIG. 3 is a diagram showing an example of internal expression of a document type.

FIG. 3 is a diagram showing an example of the internal expression of the document type. In FIG. 3, the document type is expressed by a directed sequence graph. In a directed sequence graph 31, rectangles show elements and ovals show constructors. Numbers added beside arcs show the order of children.

Figure 4:
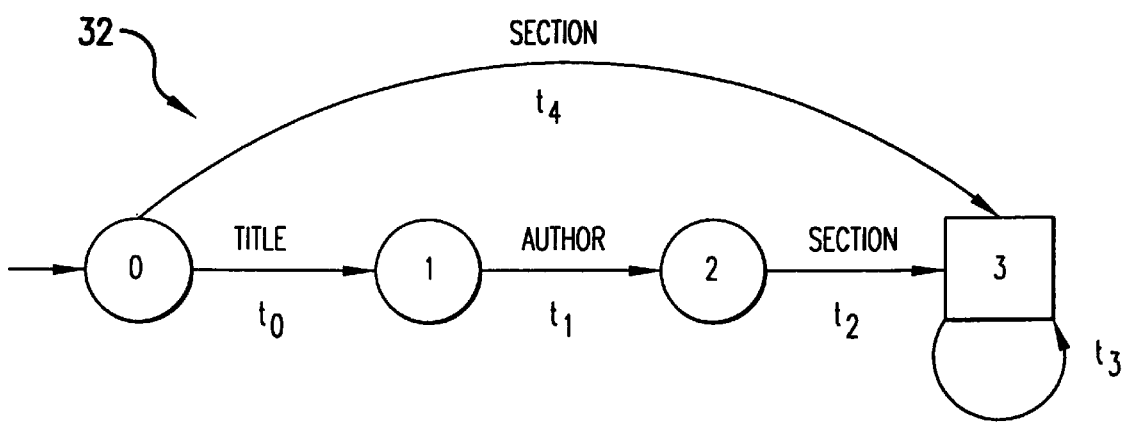
FIG. 4 is a diagram showing an example of a finite-state automaton for collation.

FIG. 4 is a diagram showing an example of the finite-state automaton for collation. This finite-state automaton 32 is constructed from the content model of an "Article" element as the root of the document type shown in FIG. 3 by a procedure which will be described hereinafter. Input alphabet are "Title", "Author", and "Section". "State 0" shows an initial state. A reception state is only "State 3" which is shown in the square.

Figure 5:
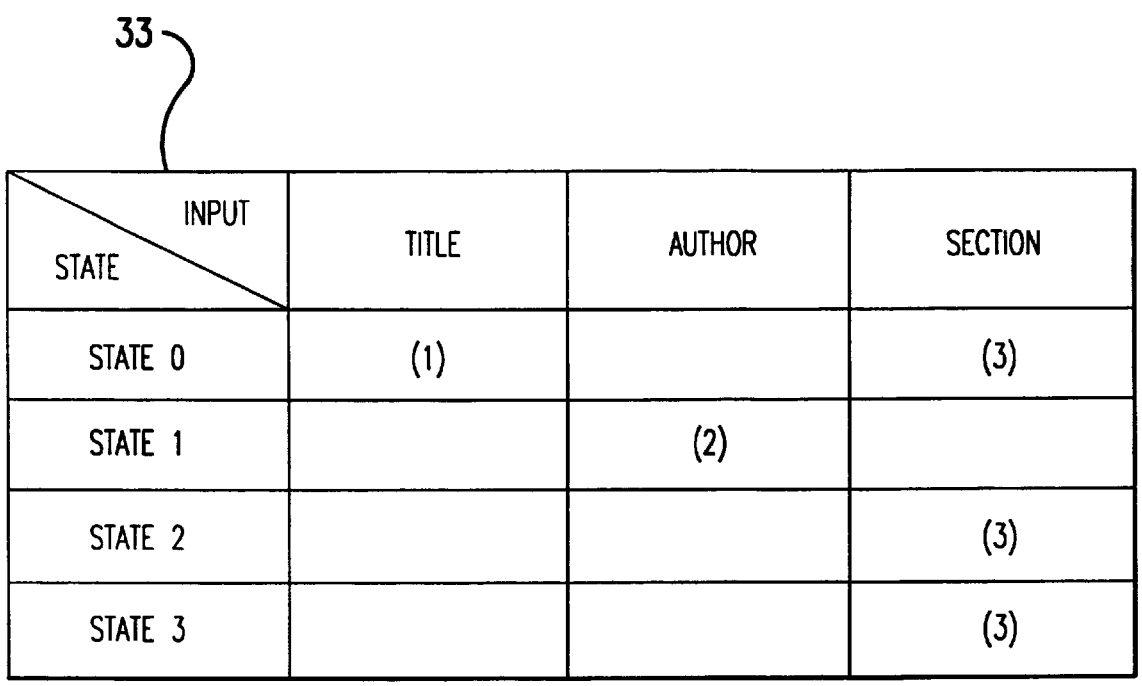
FIG. 5 is a diagram showing an example of internal expression of a finite-state automaton.

FIG. 5 is a diagram showing an example of the internal expression of the finite-state automaton. In the example, the finite-state automaton shown in FIG. 4 is expressed by using a transition table 33. In each column in the transition table 33, a set of transition states for the input is written. A vacant column shows a null set. When the content model is not ambiguous, the element of the set for the transition destination states is one or less. When it is determined that the initial state is always "State 0", information indicating the initial state is not needed. With respect to the reception state, a set is expressed by a linear list or hash.

Figure 6:
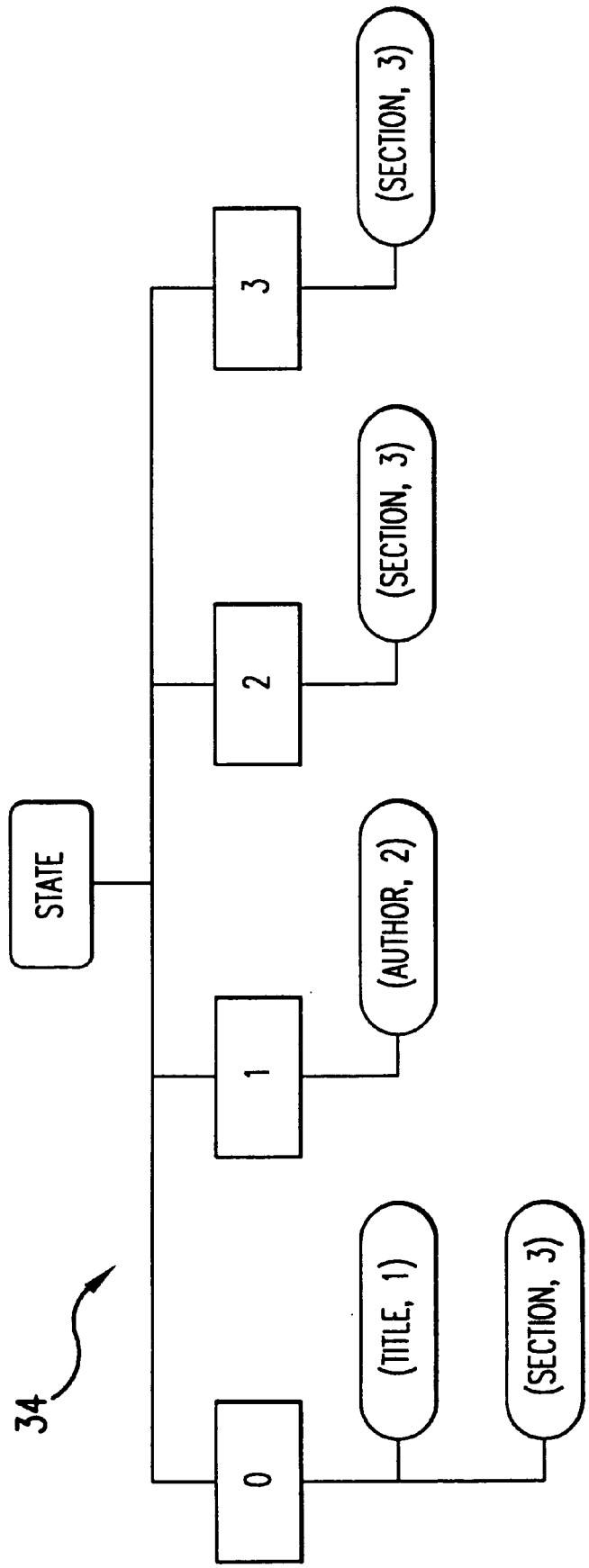
FIG. 6 is a diagram showing another example of the internal expression of a finite-state automaton.

FIG. 6 is a diagram showing another example of the internal expression of the finite-state automaton. In this internal expression 34, the finite-state automaton is expressed by using a list. In the diagram, rectangular nodes correspond to states. In each oval node, a set for the input alphabet and the transition destination state is shown. In the finite-state automaton expressing format, in a manner similar to the expression shown in FIG. 5, when it is determined that the initial state is always the State 0, information showing which one is in the initial state is not needed. As for the receiving state, it is sufficient to express the set for the reception states by a linear list or hash.

The procedure executed by the document type collating unit 20 in the document processing apparatus shown in FIG. 2 will be described. A procedure which is executed when a document type including an element which can be omitted is inputted, procedures for constructing and collating the finite-state automaton, and the details of the procedure for collating the document types will be sequentially described hereinbelow.

The procedure executed when the document type, including an element which can be omitted, is inputted will be described first. The procedure starts when the document type to be collated is sent from the determination control unit 13 to the document type collating unit 20.

When an element of the document type which is sent from the determination control unit 13 to the document type collating unit 20 can be omitted, the document type for collation is constructed from the original document type prior to construction of a finite-state automaton.

Figure 7:
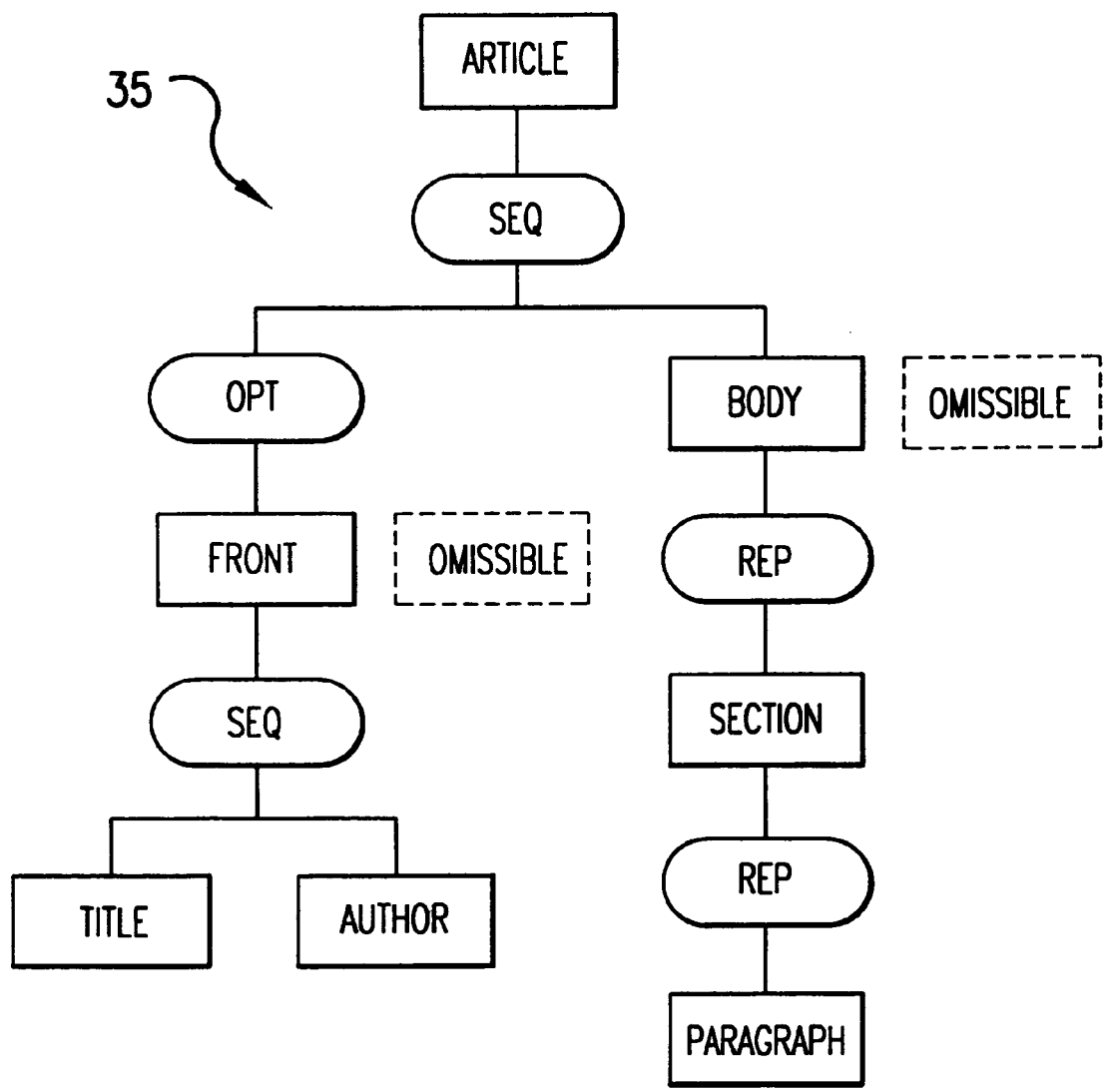
FIG. 7 is a diagram showing an example of a document type having omissible elements.

FIG. 7 is a diagram showing an example of a document type having omissible elements. In this document type 35, the elements of "Front" and "Body" can be omitted. Information indicating whether the element is omissible is designated when the document type is formed. When the document type having such omissible elements is sent to the document type collating unit 20, a document type for collation is constructed by the document type constructing unit 22.

Figure 8:
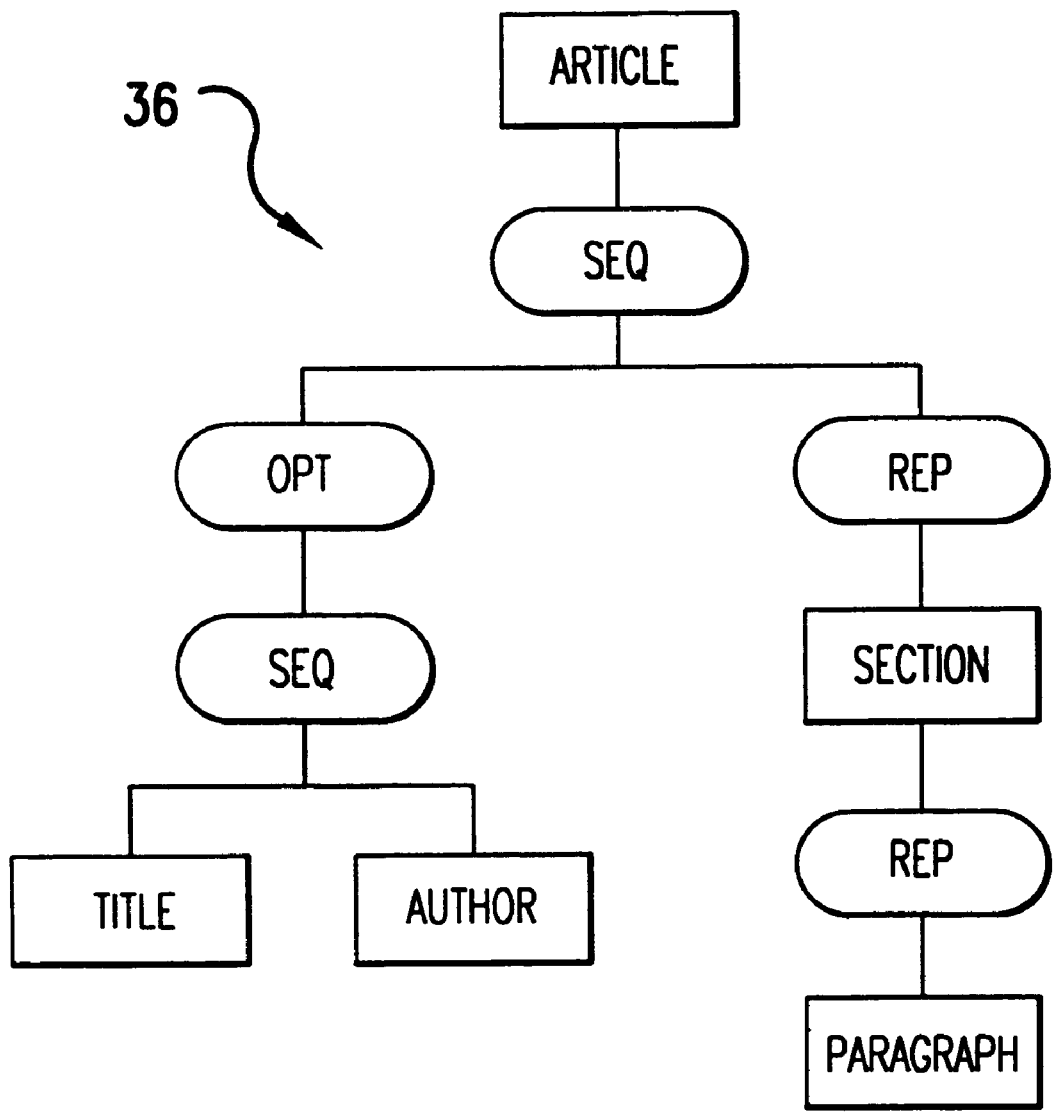
FIG. 8 is a diagram showing another example of a document type having an omissible element.

FIG. 8 is a diagram showing another example of a document type. In this document type 36, the omissible elements in the document type, 35 which are shown in FIG. 7, are not included. When the two document types are compared, a document conforming to the document type 36 shown in FIG. 8 can be parsed by using the SGML validating parser and the document type 35 shown in FIG. 7.

When the finite-state automaton is constructed, it is necessary to form a finite-state automaton so that the document type 36 shown in FIG. 8 is included in the document type 35 shown in FIG. 7. Consequently, the document type for collation is constructed prior to the construction of the finite-state automaton so that a finite-state automaton for collation of the document type 35 shown in FIG. 7 can be constructed by the same procedure as the procedure for constructing a finite-state automaton when no omissible element is included.

Figure 9:
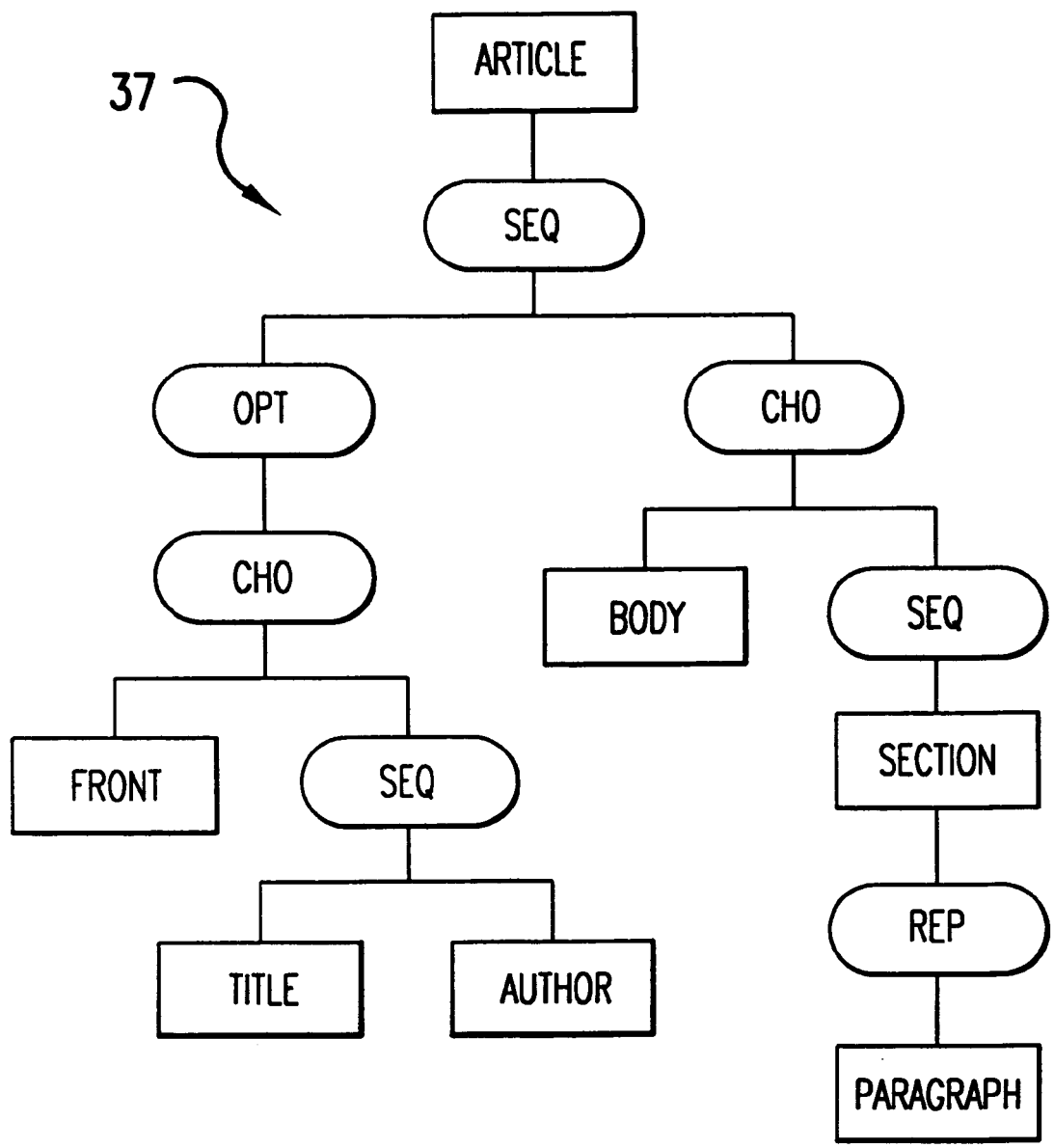
FIG. 9 is a diagram showing a document type for collation constructed from the document type shown in FIG. 7.

FIG. 9 is a diagram showing a document type for collation constructed from the document type shown in FIG. 7. In this document type 37, a construct "CHO" serving as a parent of the omissible element "Front" is inserted and an element "SEQ" as a child of the omissible element is connected as the last child of the node of "CHO".

Figure 10:
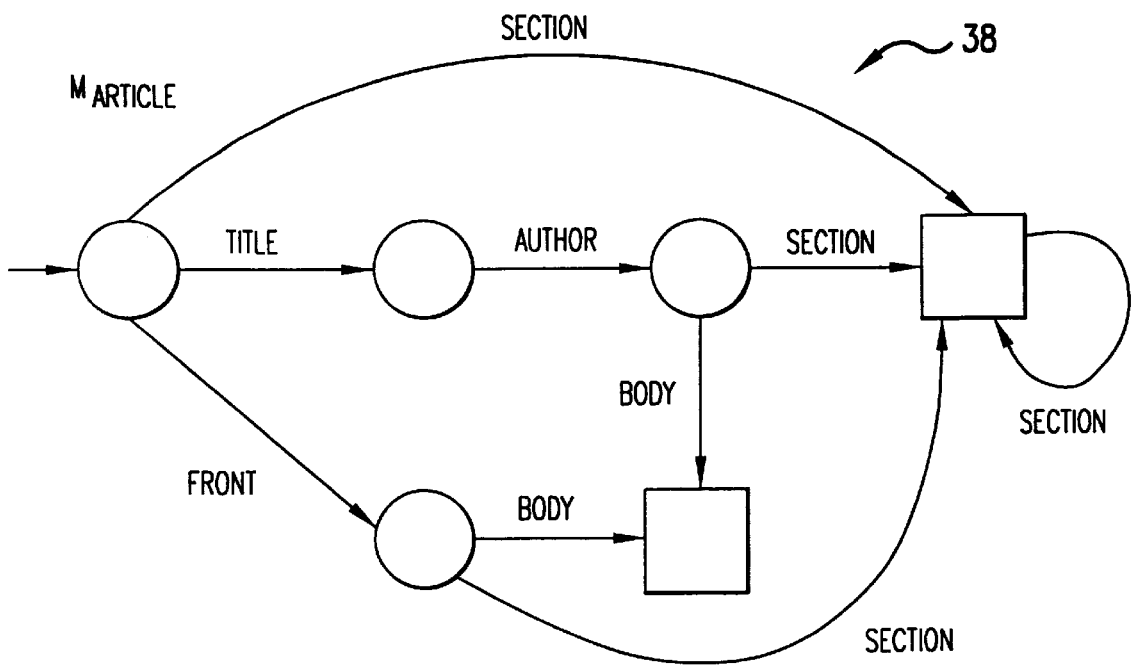
FIG. 10 shows a finite-state automaton for collation constructed from the document type shown in FIG. 9.

FIG. 10 shows a finite-state automaton for collation constructed from the document type shown in FIG. 9. This is a finite-state automaton 38 constructed from the element of "Article" in the document type 37.

Figure 11:
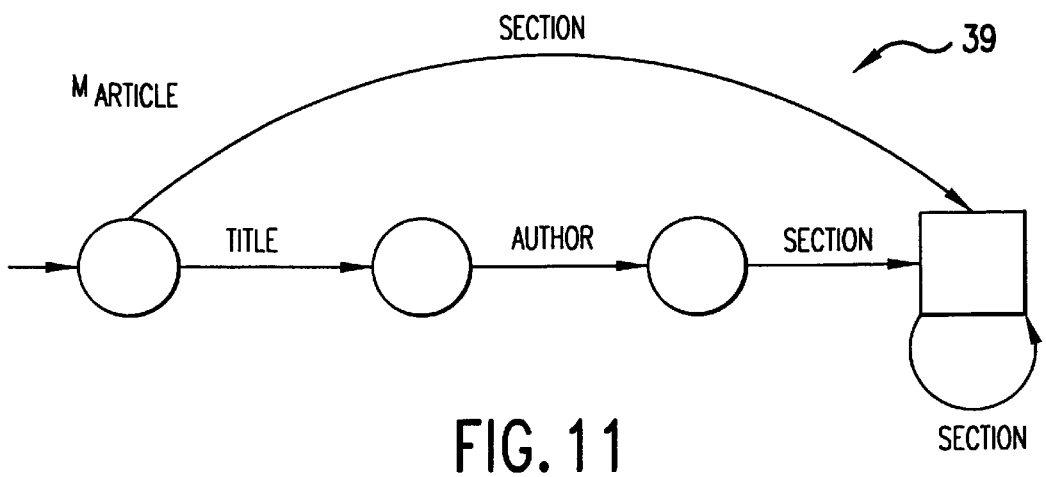
FIG. 11 shows a finite-state automaton for collation constructed from the document type shown in FIG. 9.

FIG. 11 shows a finite-state automaton for collation constructed from the document type shown in FIG. 8. This is a finite-state automaton 39 constructed from the element of "Article" in the document type 36. The finite-state automaton 39 is included in the finite-state automaton 38. That is, with respect to the input for which state transition is possible in the finite-state automaton 39, state transition is also possible in the finite-state automaton 38.

Since the two finite-state automatons 38 and 39 shown in FIGS. 10 and 11 are constructed from elements of the same name, when the document type 35 shown in FIG. 7 and the document type 36 shown in FIG. 8 are collated, the finite-state automatons 38 and 39 are collated with each other. Then, it is found that the finite-state automaton 39 is included in the finite-state automaton 38. That is, with respect to the input for which state transition is possible in the finite-state automaton 39, state transition is also possible in the finite-state automaton 38.

A procedure for constructing the document type for collation will be described hereinbelow with reference to flowcharts. The process is executed by the document type constructing unit 22.

Figure 12:
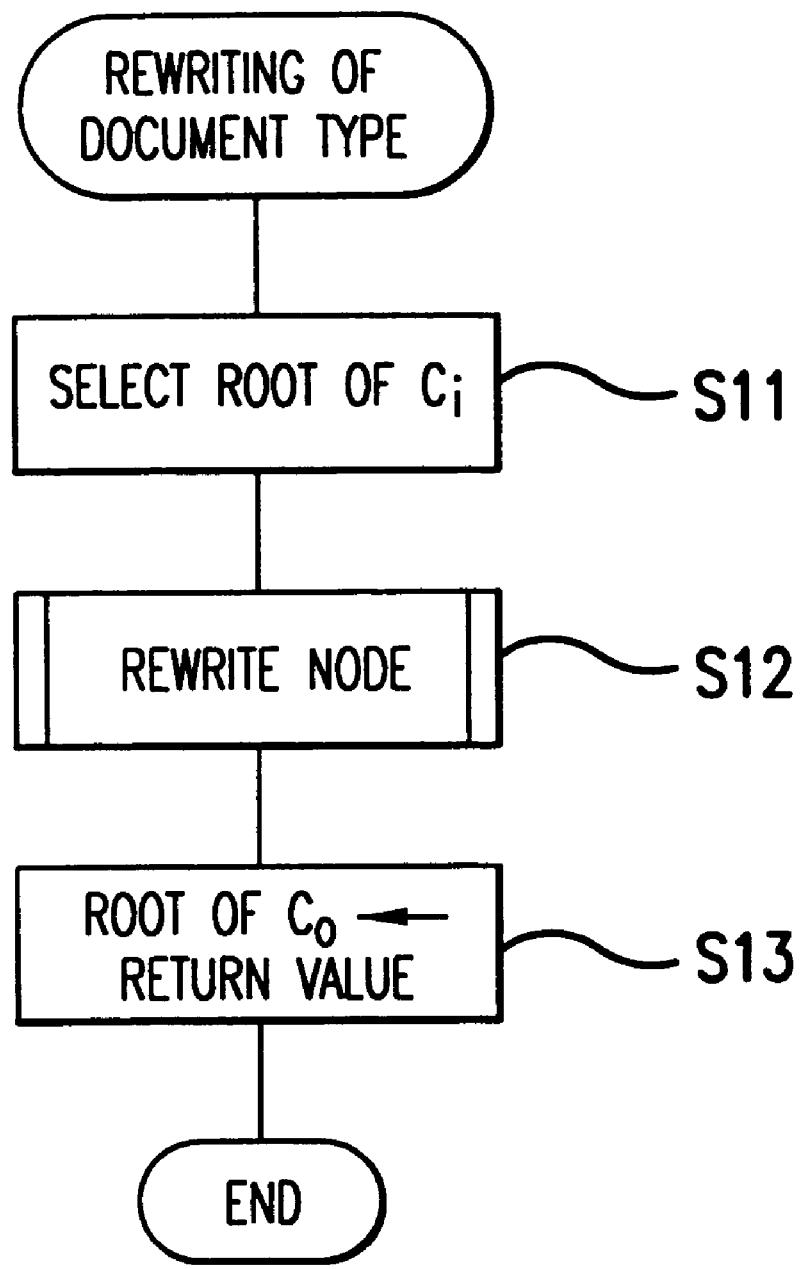
FIG. 12 is a flowchart showing a main procedure of a document type rewriting procedure.

FIG. 12 is a flowchart showing a main procedure for rewriting the document type. An input for the procedure is a document type Ci and the output is a document type Co obtained by rewriting the document type Ci. The steps of processing will be described in accordance with step numbers (other flowcharts, which will be described hereinafter, will be similarly described).

In step S11, the root of the document type Ci is located (selected).

In step S12, a process for rewriting a node is performed. That is, a procedure, which is shown in FIG. 13, is called by using the root specified in step S11 as the argument and a return value is obtained.

In step S13, the element obtained as a result of executing step S12 is set as the root of the document type Co.

Figure 13:
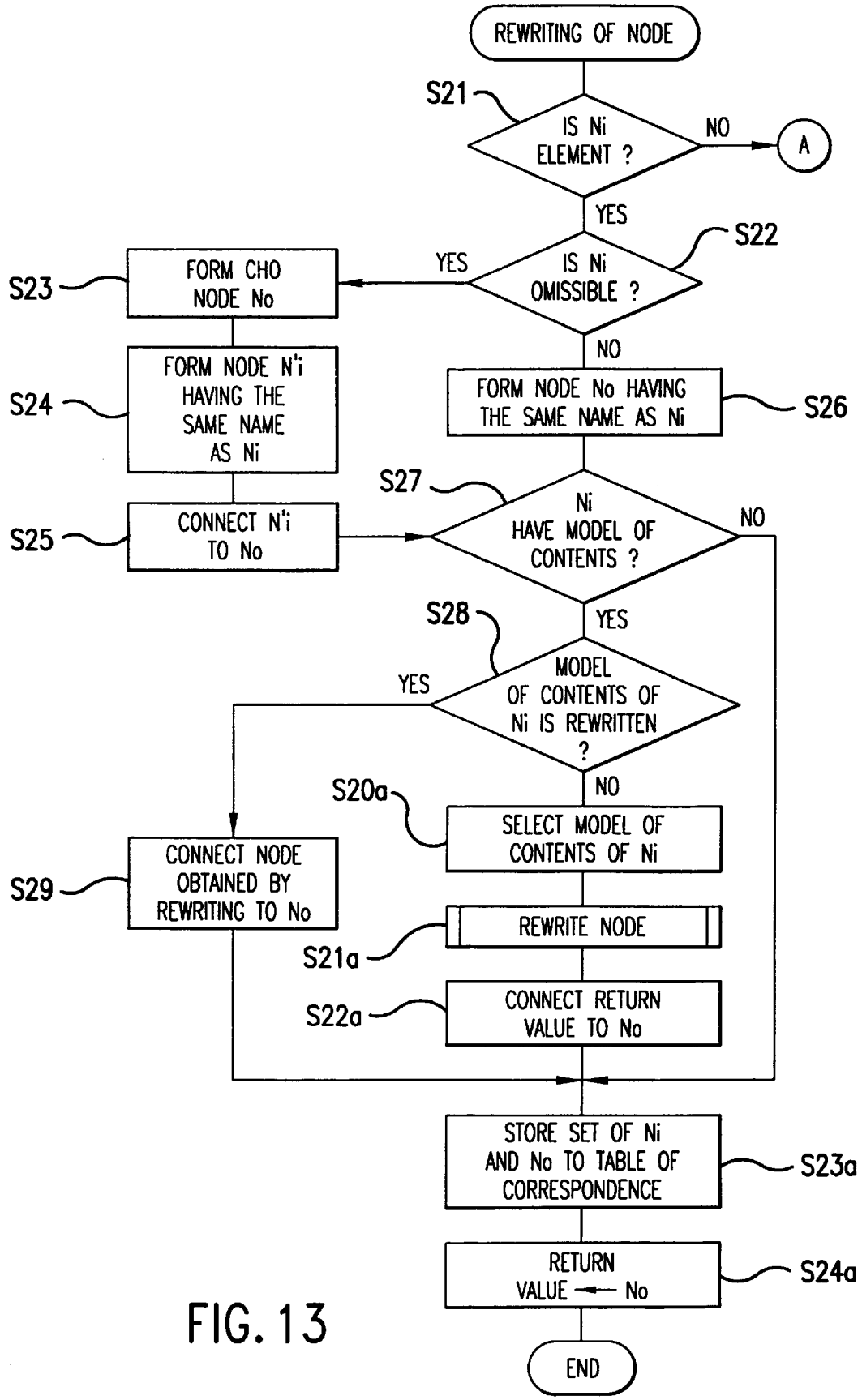
FIG. 13 is a flowchart showing a procedure for rewriting an element constructing a document type.

FIG. 13 is a flowchart showing a procedure for rewriting the elements for constructing the document type. The input of the procedure is an element Ni and the output is an element having a content model corresponding to a graph obtained by rewriting a graph derived from the content model of Ni. A correspondence table M consisting of original nodes and nodes corresponding to the original nodes is used during execution of the procedure. The procedure is recursively executed, and the correspondence table M is referred to in each procedure.

In step S21, a determination on whether Ni is an element is discriminated. If the determination is YES, the processing routine advances to step S22 and if the determination is NO, the processing goes to step S31 (shown in FIG. 14).

In step S22, a determination on whether Ni can be omitted is made. If YES, the processing routine advances to step S23, and if no, to step S26.

In step S23, a CHO node No is created.

In step S24, an element node N'i having the same name as Ni is formed.

In step S25, N'i is connected to No and the processing routine advances to step S27.

In step S26, an element node No having the same name as Ni is formed, and then the process goes to step S27.

In step S27, a determination on whether Ni has a content models made. If YES, the processing routine advances to step S28 and if NO, to step S23$a$.

In step S28, a determination on whether the content model of Ni has been rewritten is made by referring to the correspondence table M. If the content model of Ni has been rewritten, the processing routine advances to step S29 and if NO, to step S20$a$.

In step S29, a node derived by rewriting the content model of Ni is obtained with reference to the correspondence table M and is the node is connected to No, and the processing routine advances to step S23$a$.

In step S20$a$, the content model of Ni is selected.

In Step S21$a$, a procedure for rewriting the node is called. Since the procedure called is the procedure shown in this flowchart, it means that the procedure is recursively called.

In step S22$a$, the node obtained by calling the procedure in step S21 a is connected to node No and the processing routine advances to step S23$a$.

In step S23$a$, a pair consisting of Ni and No is stored in the correspondence table M.

In step S24$a$, the return value of the procedure is set to No and the processing routine is finished.

The process executed when it is determined that Ni is an element in step S21 has just been described above. The following is a process executed when it is determined that Ni is not an element in step S21.

Figure 14:
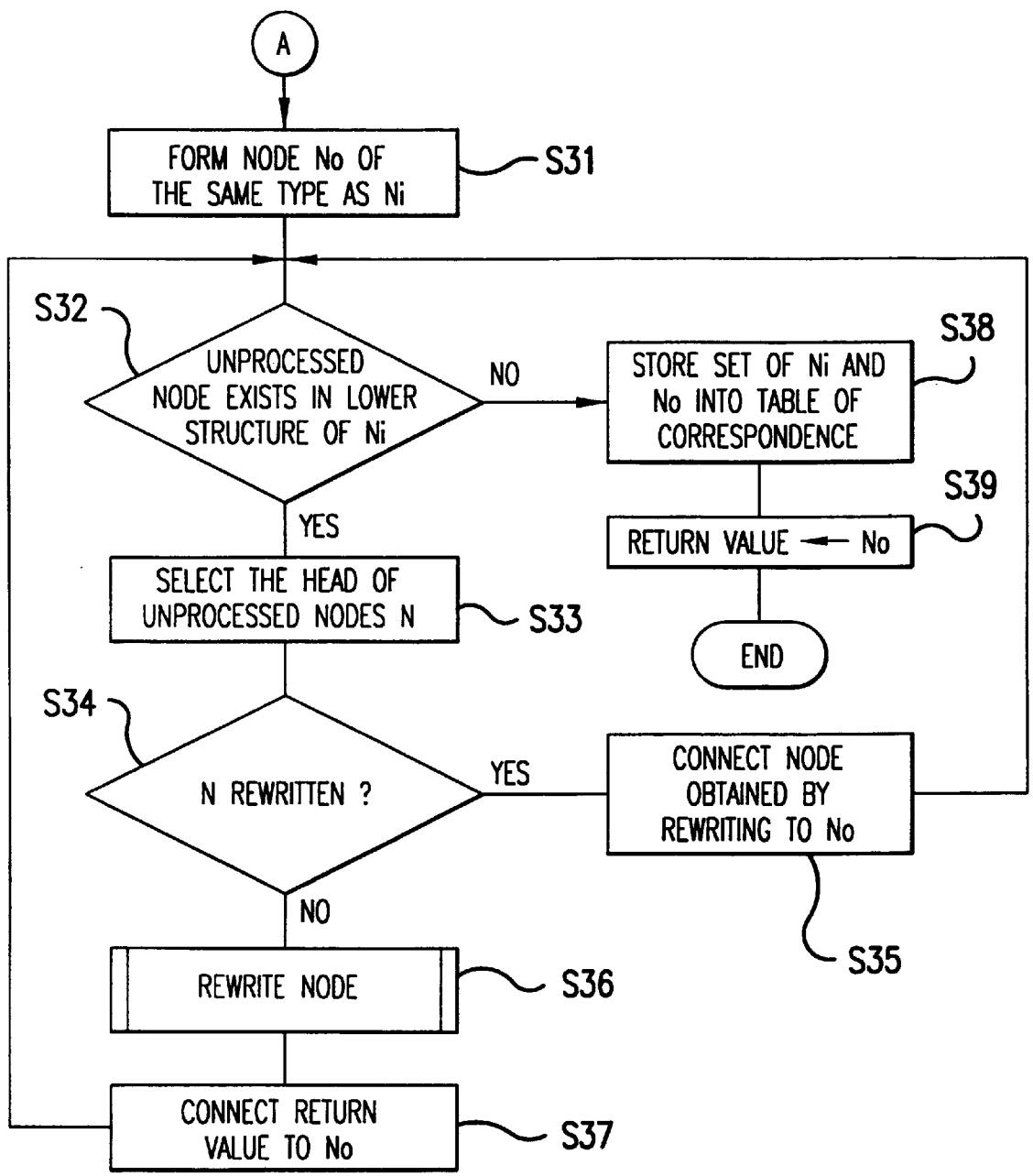
FIG. 14 is a flowchart showing a procedure when it is determined that Ni is not an element in step S21.

FIG. 14 is a flowchart showing a procedure executed when it is determined that Ni is not an element in step S21.

In step S31, the node No which is of the same type as Ni is formed. The routine then advances to step S32. Processes from step S32 to S37 are repeatedly executed in turn to the lower structure of Ni.

In step S32 a determination on whether there is an unprocessed node in the lower structure of Niis made. If YES, the processing routine advances to step S33, and if NO, to step S38.

In step S33, the first node among unprocessed nodes in the lower structure is specified.

In step S34 a determination on whether the specified node has been rewritten is made by referring to the correspondence table M. If YES, the process then goes to step S35. If NO, step S36 follows.

In step S35, the node obtained by rewriting is specified with reference to the correspondence table M and is connected as the last child. The processing routine is then returned to step S32.

In step S36, a procedure for rewriting the node is called. Since the procedure called is the one shown in this flowchart, it means that the procedure is recursively called.

In step S37, the node obtained by calling the procedure in step S36 is connected to No. The processing routine is then returned to step S32.

In step S38, the pair consisting of Ni and No is stored into the correspondence table M.

In step S39, the return value of the procedure is set to No, and the processing routine is finished.

By executing the processes as mentioned above, a new document type for collation is formed from the document type having omissible elements.

Subsequently, a finite-state automaton is constructed. The construction of the finite-state automaton is performed on the basis of the content model of the element. The process is executed by the finite-state automaton constructing unit 23. The content model of the element is defined by lower elements which can be held by a specific element in the document type.

Flowcharts showing procedures for constructing the finite-state automaton are shown in FIGS. 15 to 22. If the original content model is not ambiguous, the finite-state automaton constructed by the procedures is deterministic. That is, the transition destination for one input alphabet is at most one with respect to any state.

Figure 15:
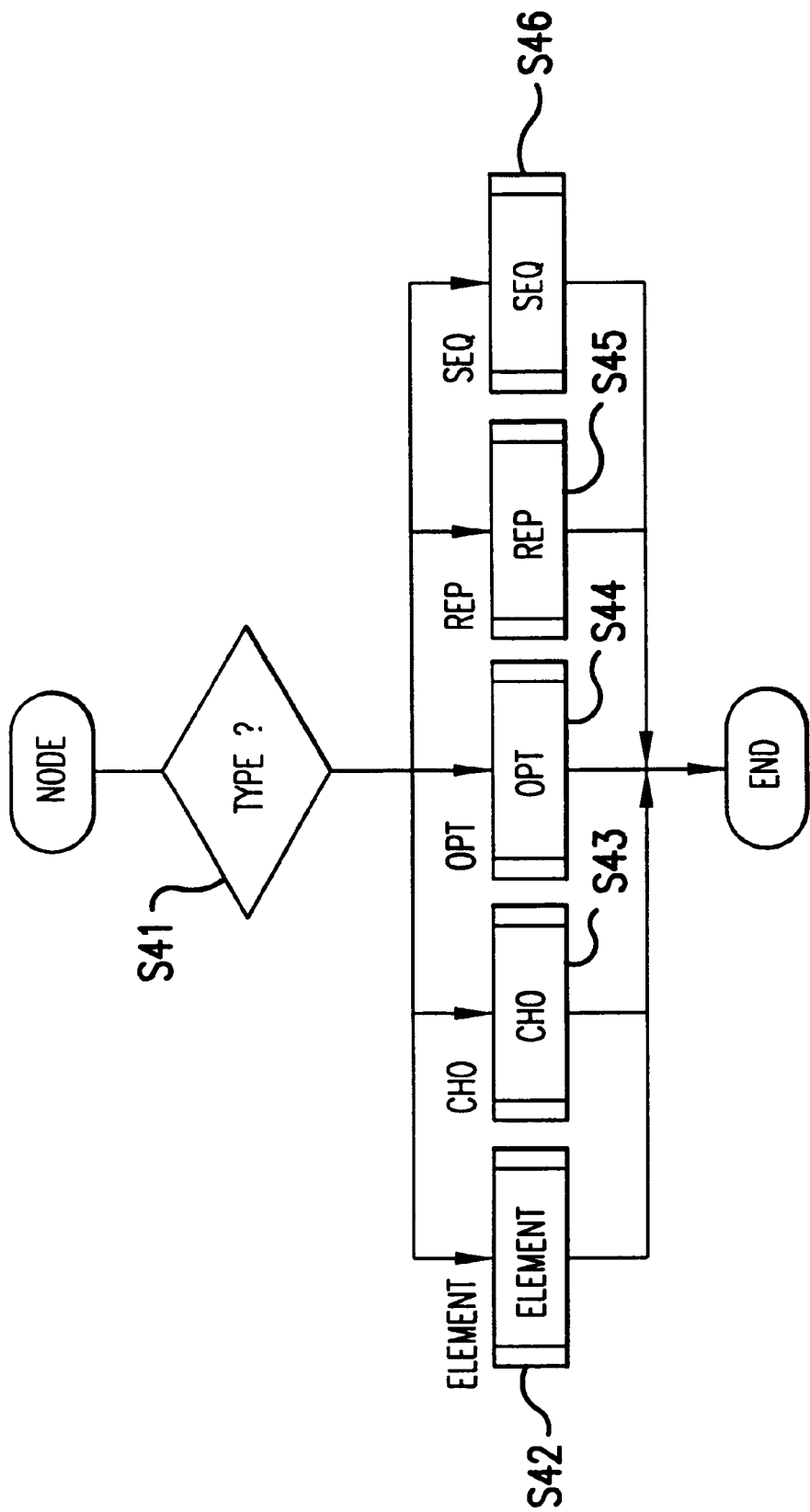
FIG. 15 is a flowchart showing a procedure for constructing a finite-state automaton from a node in a document type.

FIG. 15 is a flowchart showing a procedure for constructing a finite-state automaton from a node in a document type. The flowchart shows a procedure for calling a subroutine of the finite-state automaton construction in accordance with the kind of node. The input of the procedure is a node of a graph expressing a schema and the output is a finite-state automaton corresponding to the input node.

In step S41, the type of node is discriminated. If the node is an element, the processing routine advances to step S42. If the node is CHO, step S43 follows. If the node is OPT, step S44 follows. If the node is REP, step S45 follows. If the node is SEQ, step S46 follows.

In step S42, a finite-state automaton constructing procedure (FIG. 16) for the element is called by using the node being processed as the argument.

In step S43, a finite-state automaton constructing procedure (FIG. 17) for the CHO node is called by using the node being processed as the argument.

In step S44, a finite-state automaton constructing procedure (FIG. 18) for the OPT node is called by using the node being processed as the argument.

In step S45, a finite-state automaton constructing procedure (FIG. 19) for the REP node is called by using the node being processed as the argument.

In step S46, a finite-state automaton constructing procedure (FIG. 20) for the SEQ node is called by using the node being processed as the argument.

Figure 16:
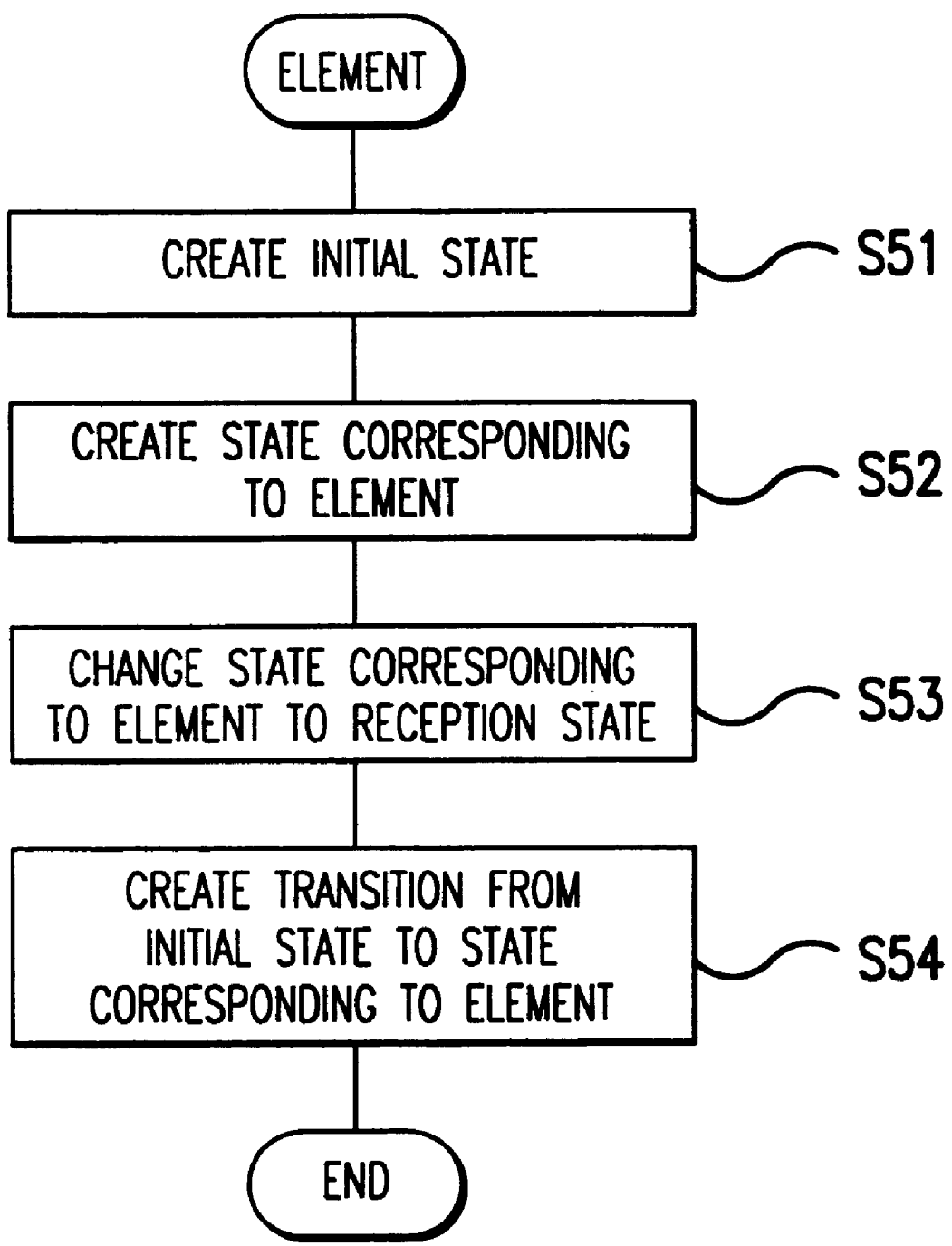
FIG. 16 is a flowchart showing a procedure for constructing a finite-state automaton from an element node.

FIG. 16 is a flowchart showing a procedure for constructing a finite-state automaton from the element node. An input of the procedure is node E and the output is a finite-state automaton corresponding to the input.

In step S51, an initial state I of the finite-state automaton is formed.

In step S52, a state q corresponding to the element is formed.

In step S53, q is changed to a reception state.

In step S54, a transition from I to q in response to the input E is added.

Figure 17:
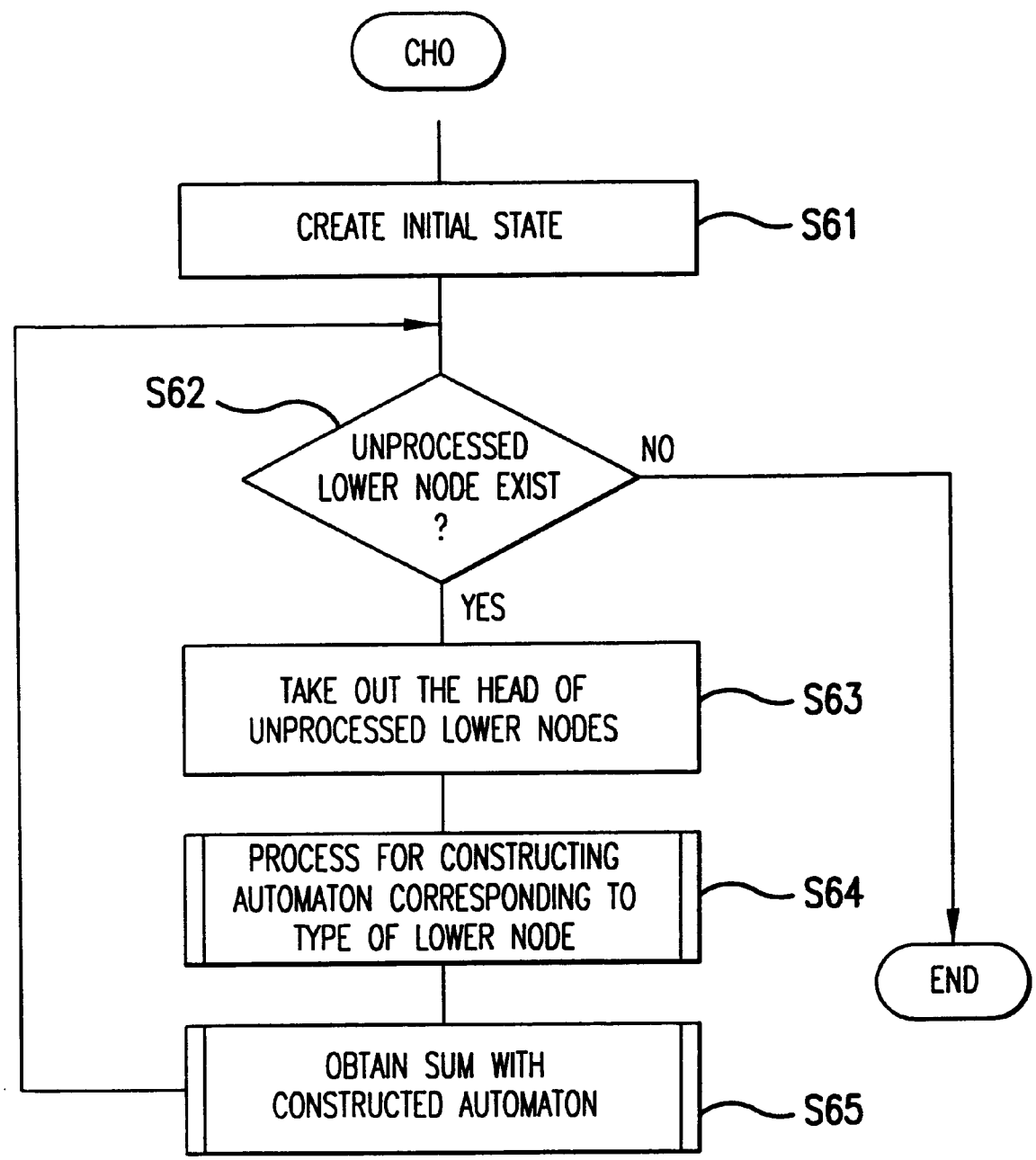
FIG. 17 is a flowchart showing a procedure for constructing a finite-state automaton from a CHO node.

FIG. 17 is a flowchart showing a procedure for constructing a finite-state automaton from the CHO node. The input of the procedure is a node and the output is a finite-state automaton corresponding to the input.

In step S61, an initial state of the finite-state automaton is formed. The following steps S62 to S65 are repetitive processes to lower nodes of the inputted CHO node.

In step S62, whether an unprocessed lower node of the inputted CHO node exists is checked. If YES, the processing routine advances to step S63. If NO, the processing routine is finished.

In step S63, the head node n of the unprocessed lower nodes is specified.

In step S64, the procedure shown in FIG. 15 is called by using n as an argument and the finite-state automaton corresponding to n is constructed.

In step S65, a procedure (FIG. 22) for obtaining the union of finite-state automatons is called, which will be described hereinafter, by using a finite-state automaton obtained as a result of calling the procedure of step S64 and a finite-state automaton being presently formed as arguments. After completion of the procedure for obtaining the union, the processing routine is returned to step S62.

Figure 18:
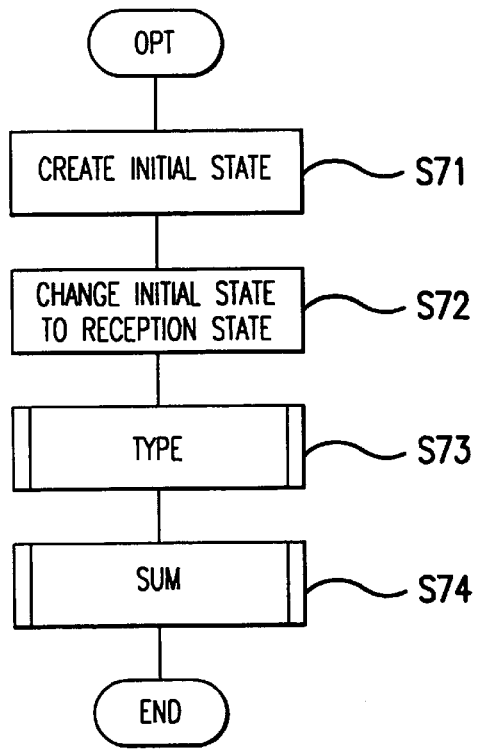
FIG. 18 is a flowchart showing a procedure for constructing a finite-state automaton from an OPT node.

FIG. 18 is a flowchart showing a procedure for constructing a finite-state automaton from the OPT node. The input of the procedure is a node and the output is a finite-state automaton corresponding to the input.

In step S71, an initial state of the finite-state automaton is formed.

In step S72, the initial state formed in step S71 is changed to a reception state.

In step S73, the procedure shown in FIG. 15 is called by using a lower node of the node as an argument.

In step S74, a procedure (FIG. 22) for obtaining the union of finite-state automatons is called by using finite-state automaton derived as a result of calling the procedure in step S73 and a finite-state automaton being presently formed as arguments. After completion of the procedure for obtaining the union, the execution of the procedure is finished.

Figure 19:
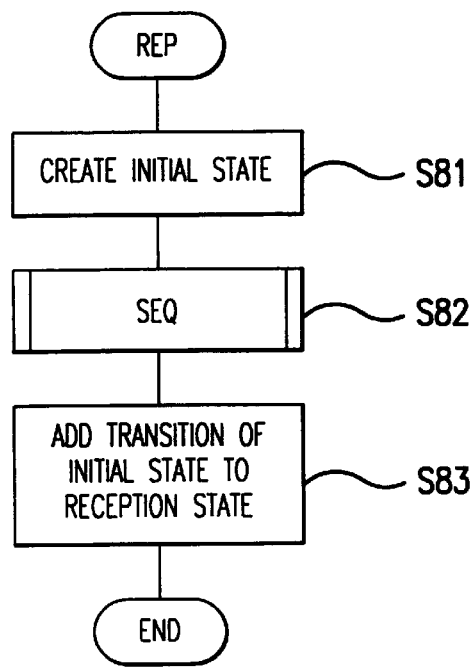
FIG. 19 is a flowchart showing a procedure for constructing a finite state automaton from an REP node.

FIG. 19 is a flowchart showing a procedure for construction a finite-state automaton from the REP node. An input of the procedure is a node and the output is a finite-state automaton corresponding to the input.

In step S81, a initial state of the finite-state automaton is formed.

In step S81, a procedure (FIG. 20) for constructing the finite-state automaton from the SEQ node is called by using the input node as an argument.

In step S83, a transition of the initial state is added to a reception state of the finite-state automaton obtained as a result of calling the procedure in step S82, and the procedure is finished.

Figure 20:
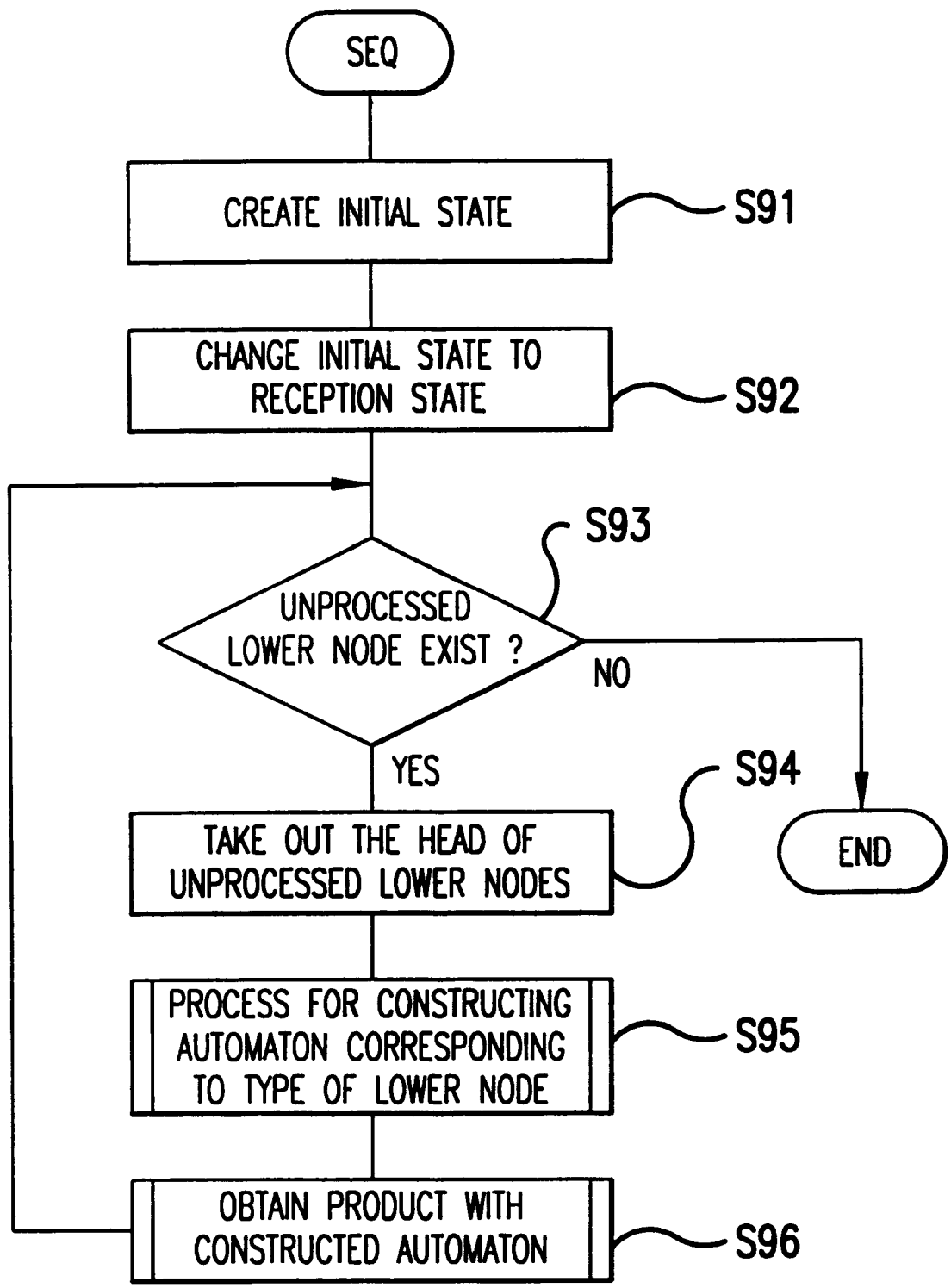
FIG. 20 is a flowchart showing a procedure for constructing a finite-state automaton from an SEQ node.

FIG. 20 is a flowchart showing a procedure for constructing finite-state automaton from the SEQ node. The input of the procedure is a node and the output is a finite-state automaton corresponding to the input.

In step S91, an initial state of the finite-state automaton is formed.

In step S92, the initial state formed in step S91 is set to a reception state. The following steps S93 to S96 are repetitive processes to lower nodes of the inputted SEQ node.

In step S93, whether an unprocessed lower node of the inputted SEQ node exists is checked. If YES, the processing routine advances to step S94 and if NO, the processing routine is finished.

In step S94, the head node n of the unprocessed lower nodes is specified.

In step S95, the procedure shown in FIG. 15 is called by using n as an argument and a finite-state automaton corresponding to n is constructed.

In step S96, the procedure (FIG. 21) for obtaining the intersection of finite-state automatons is called, which will be described hereinafter, by using a finite-state automaton obtained as a result of calling the procedure in step S95 and a finite-state automaton being presently formed as arguments.

The procedure for obtaining the intersection of two finite-state automatons and the procedure for obtaining the union of two finite-state automatons will be described hereinafter.

Figure 21:
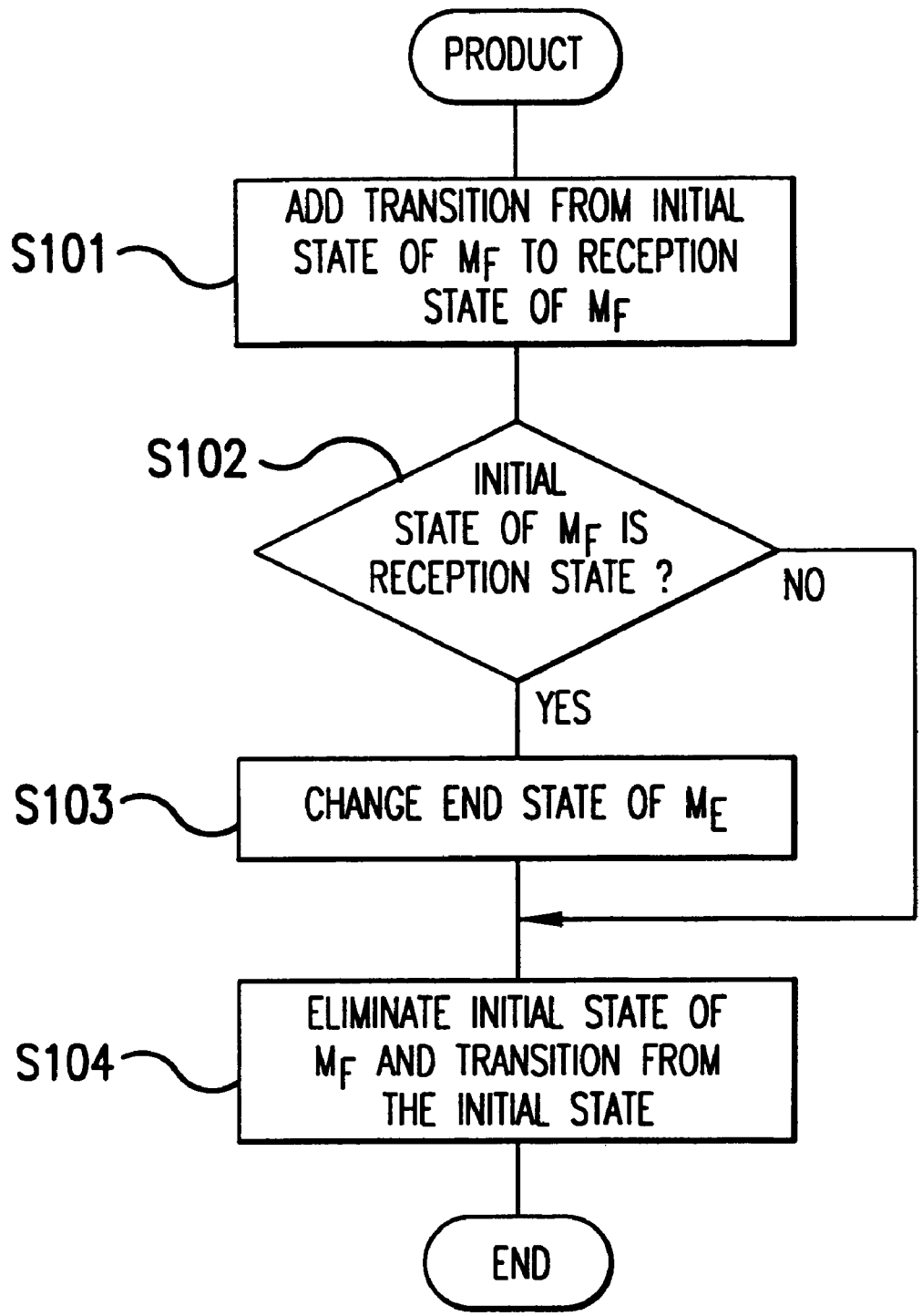
FIG. 21 is a flowchart showing a procedure for obtaining the product of two finite-state automatons.

FIG. 21 is a flowchart showing a procedure for obtaining the intersection of two finite-state automatons. The input (arguments) to the procedure are two finite-state automatons $M_E$ and $M_F$. As a result of execution of the procedure, a finite-state automaton for receiving an alphabet string obtained by connecting an alphabet string which can be received by $M_E$ and an alphabet string which can be received by $M_F$ is constructed. By executing the procedure, $M_E$ is directly rewritten and there is no output.

In step. S101, all of the transitions from the initial state of $M_F$ are added to each of the reception states of $M_E$.

In step S102, whether the initial state Of $M_F$ is the reception state is checked. If YES, the processing routine advances to step S103, and if NO, to step S104.

In step S103, each reception state of $M_E$ is changed to a reception state.

In step S104, the initial state of $M_F$ and the transition from the initial state are eliminated.

Figure 22:
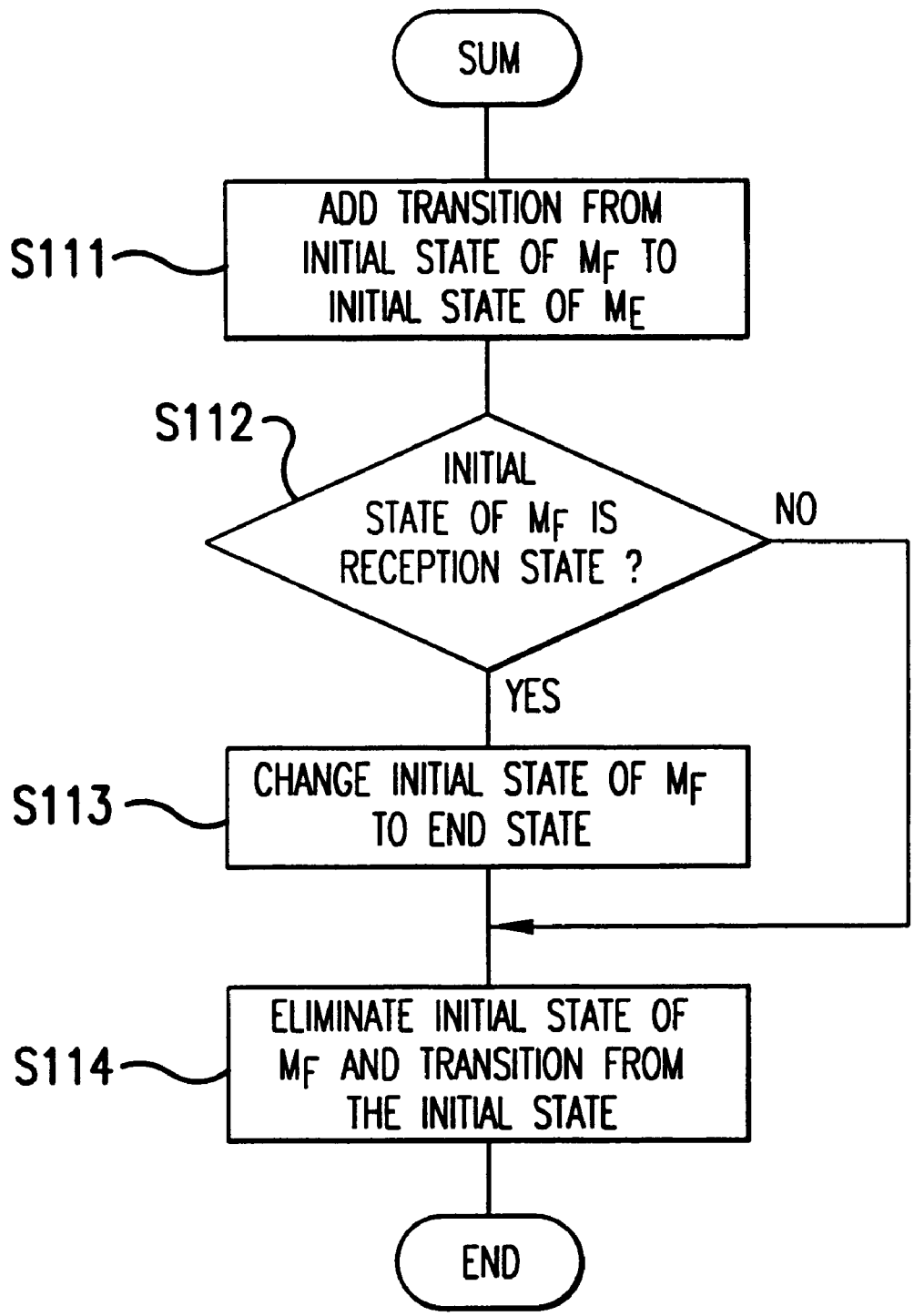
FIG. 22 is a flowchart showing a procedure for obtaining the union of two finite-state automatons.

FIG. 22 is a flowchart showing a procedure for obtaining the union of two finite-state automatons. The input of the procedure are two finite-state automatons $M_E$ and $M_F$. As a result of execution, a finite-state automaton for receiving both an alphabet string which can be received by $M_E$ and an alphabet string which can be received by $M_F$ is constructed. By executing the procedure, $M_E$ is directly rewritten and there is no output.

In step S111, all of the transitions from the initial state of $M_F$ are added to the initial state of $M_E$.

In step S112, whether the initial state of $M_F$, is the reception state is checked. If YES, step S113 follows. If NO, S114 follows.

In step S113, The initial state of $M_E$ is changed to the end state.

In step S114, The initial state of $M_F$ and the transition from the initial state are eliminated.

As mentioned above, the finite-state automaton of each document type can be constructed.

Figure 23:
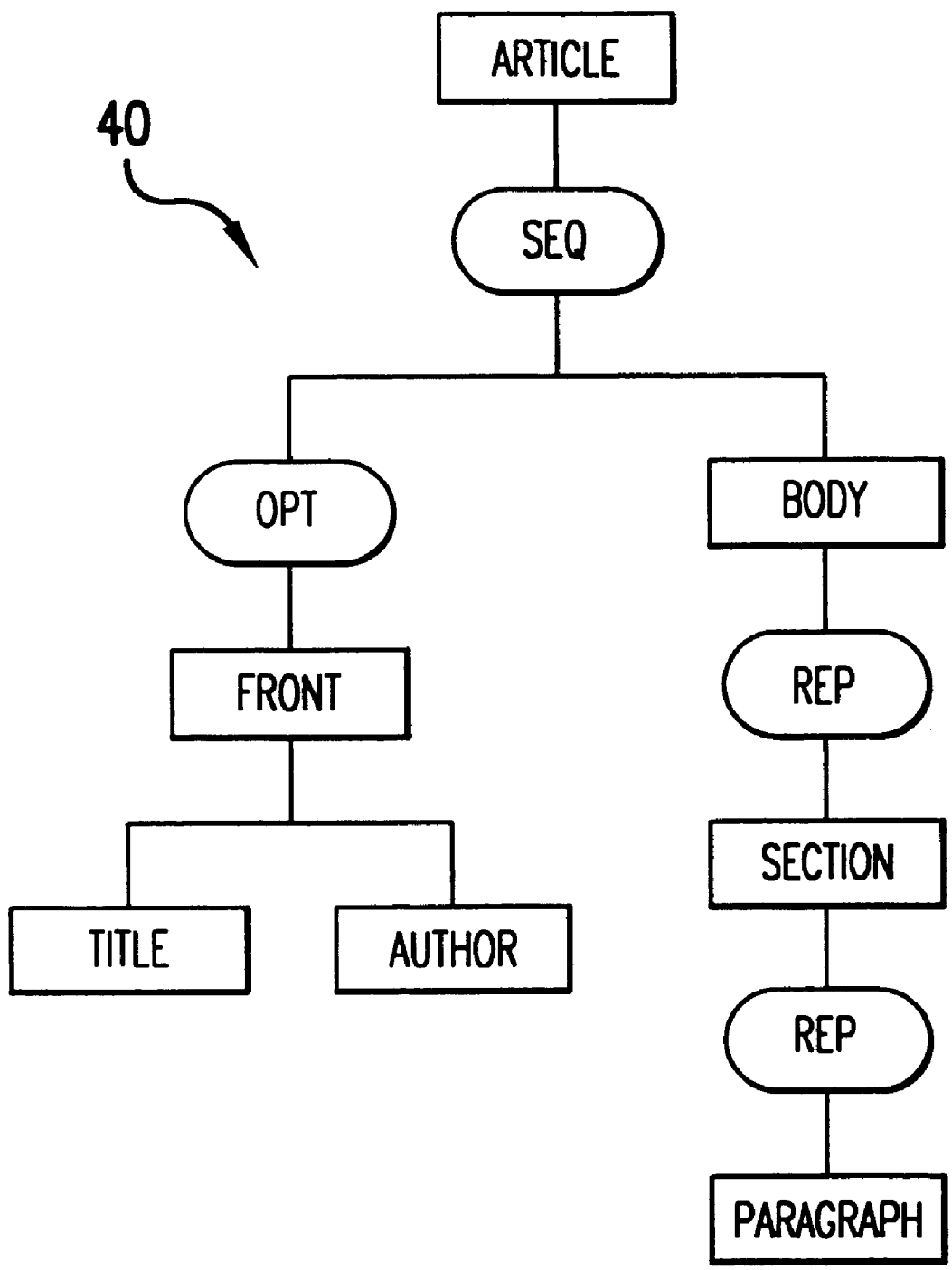
FIG. 23 is a diagram showing a first example of the document type.
Figure 24:
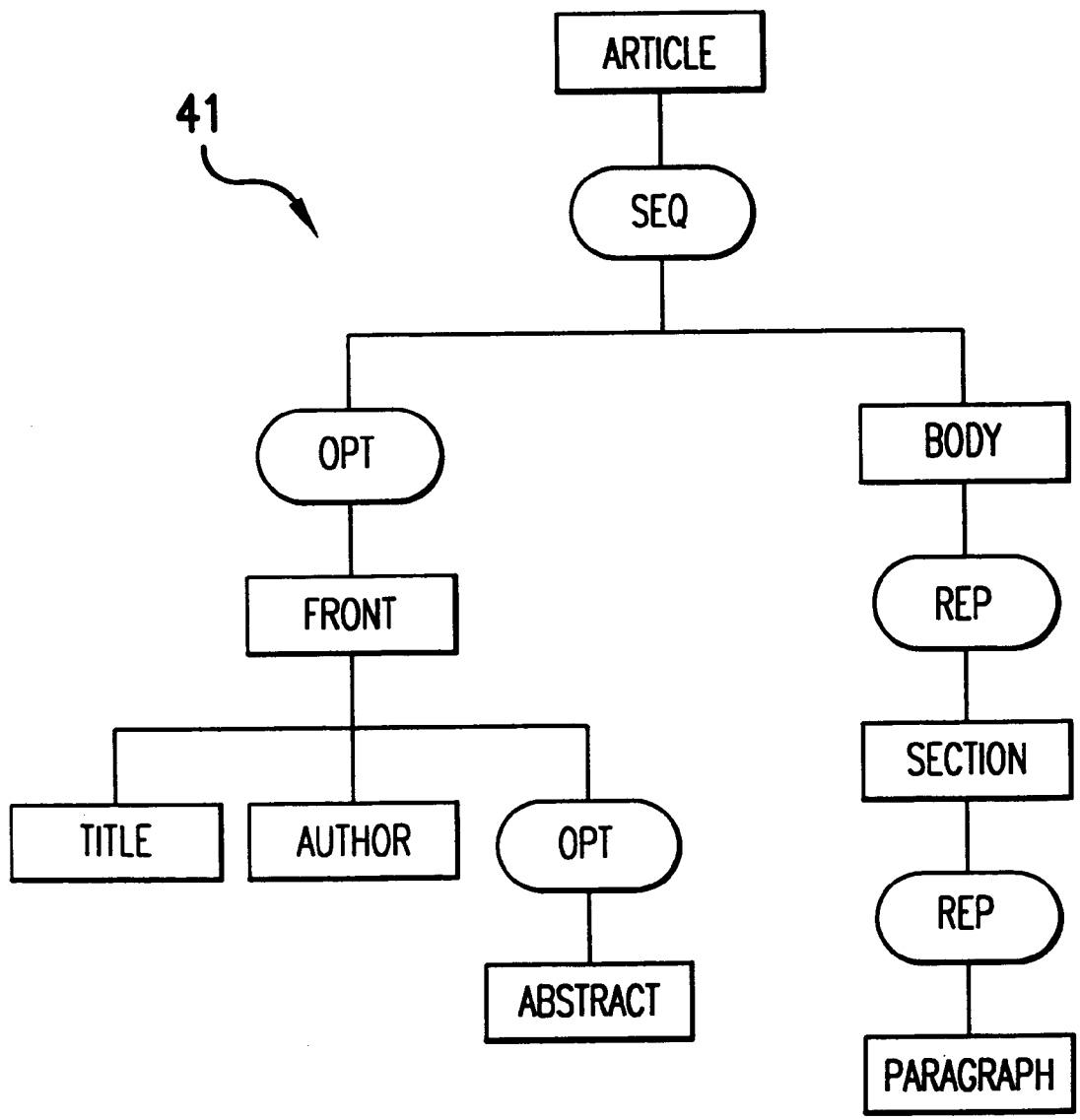
FIG. 24 is a diagram showing a second example of the document type.
Figure 25:
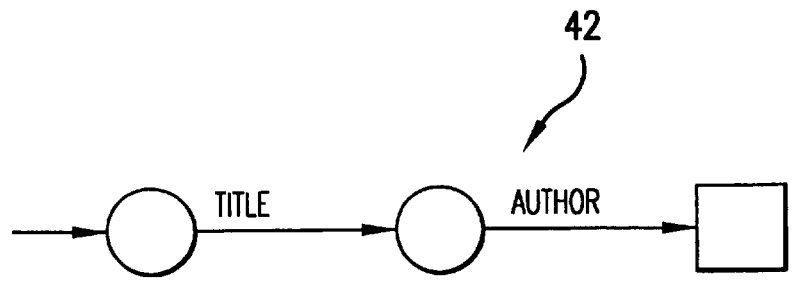
FIG. 25 is a diagram showing an automaton constructed from a content model of "Front" in the document type shown in FIG. 23.
Figure 26:
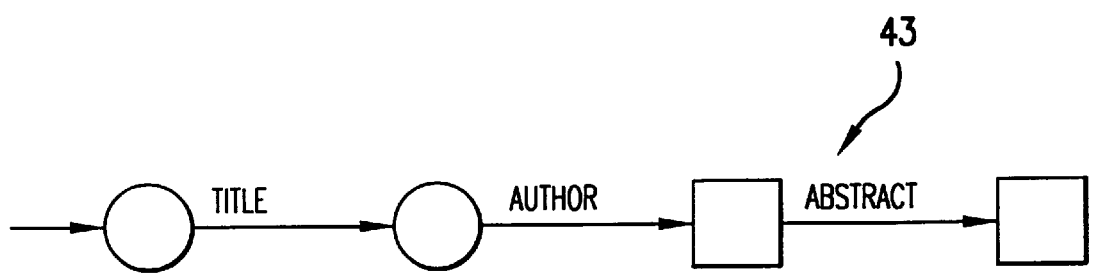
FIG. 26 is a diagram showing a finite-state automaton constructed from a content model of "Front" in the document type shown in FIG. 24.

FIG. 23 is a diagram showing a first example of the document type. FIG. 24 is a diagram showing the second example of the document type. FIG. 25 is a diagram showing a finite-state automaton 42 constructed from the content model of "Front" in a document type 40 shown in FIG. 23. FIG. 26 is a diagram showing a finite-state automaton 43 constructed from the content model of "Front" of a document type 41 shown in FIG. 24. Such finite-state automatons are constructed for every element.

When finite-state automatons for every elements in the document type are constructed, the relationship between the languages defined by the two finite-state automatons is checked. The relationship between the languages to be checked is either an inclusive or an intersecting relationship. An finite-state automaton collating process is executed by the finite-state automaton collating unit 24.

Figure 27:
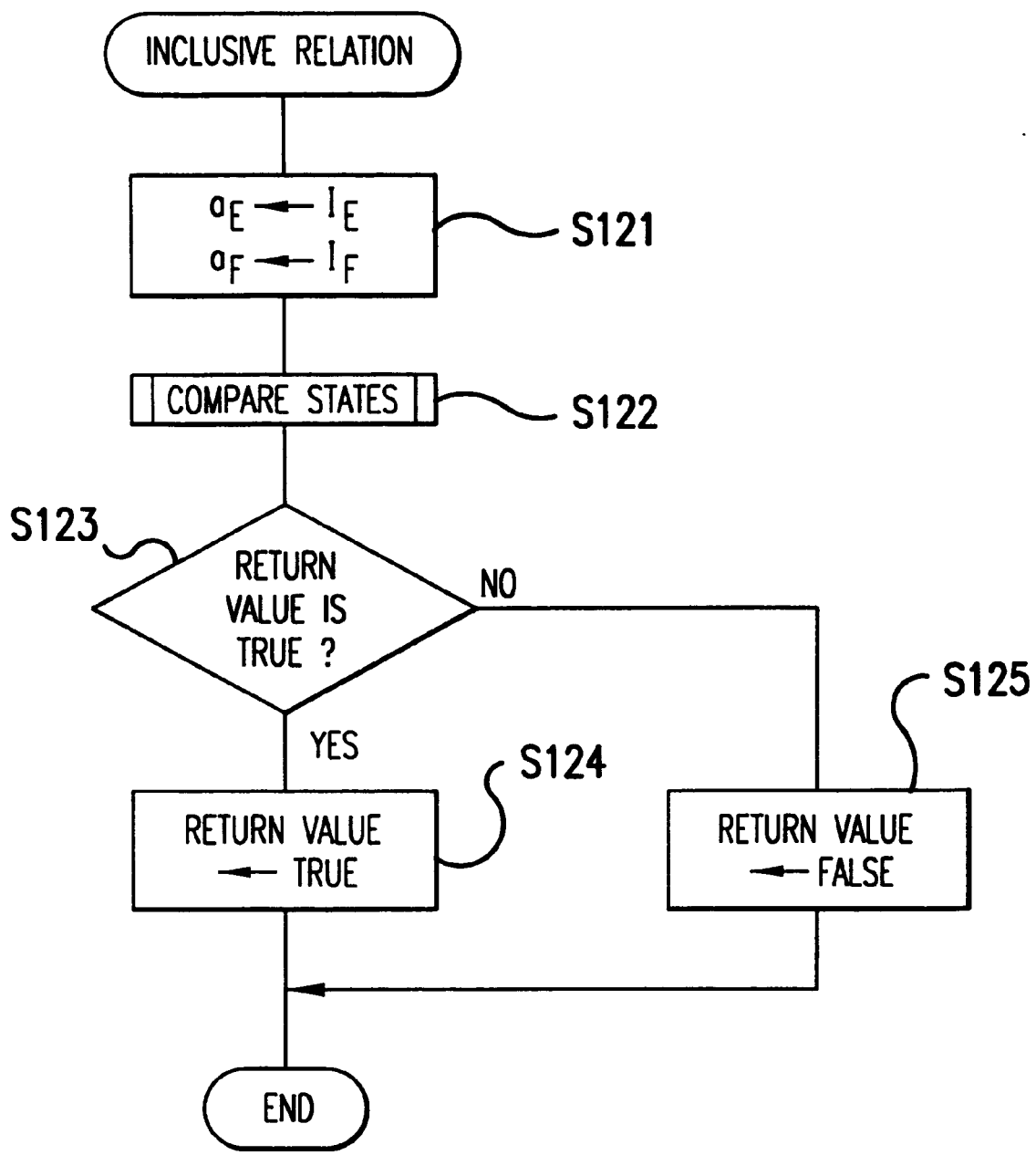
FIG. 27 is a flowchart showing a procedure for checking whether there is the inclusive relationship between languages received by two finite-state automatons.
Figure 28:
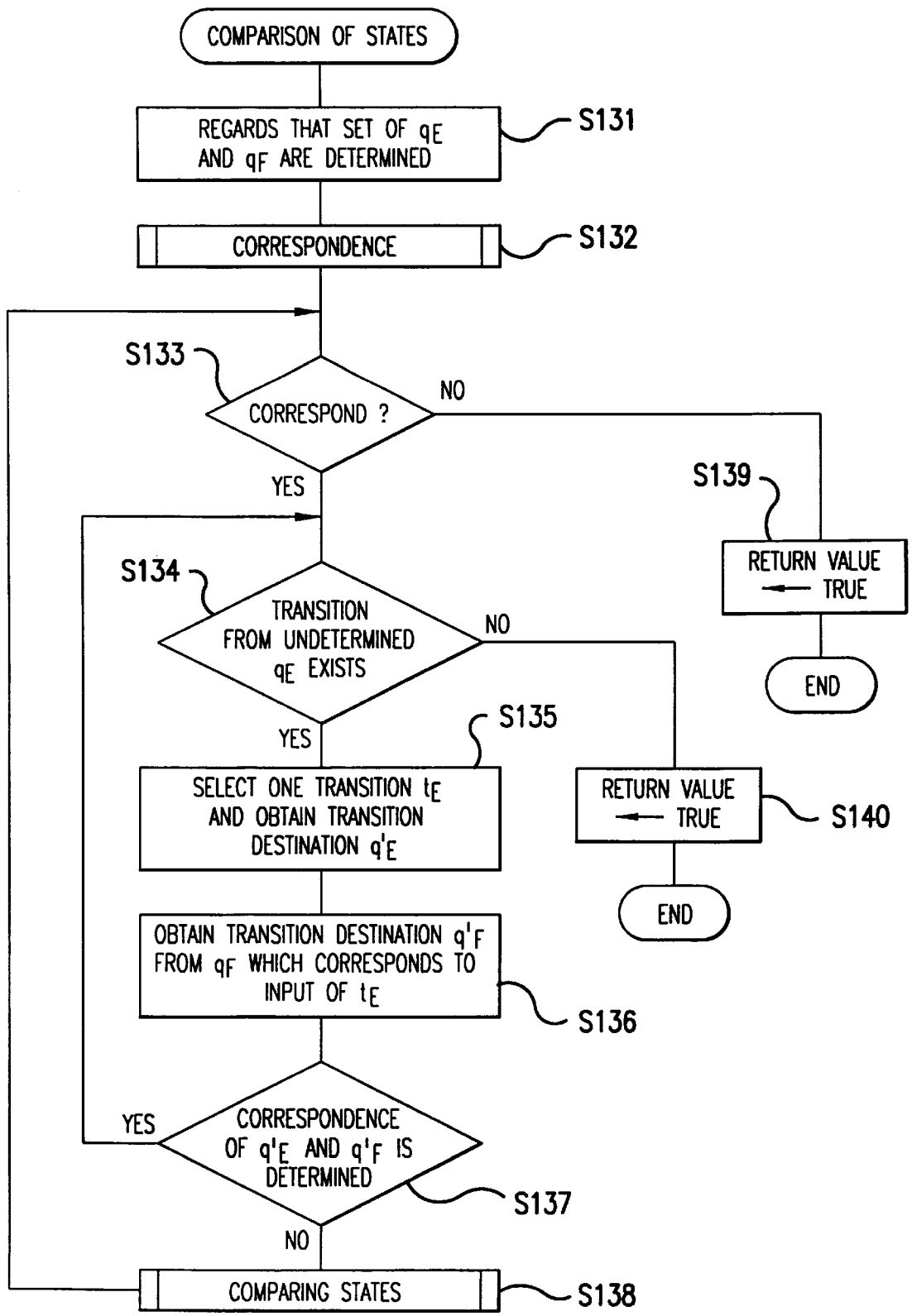
FIG. 28 is a flowchart showing a procedure for comparing the states of finite-state automatons.
Figure 29:
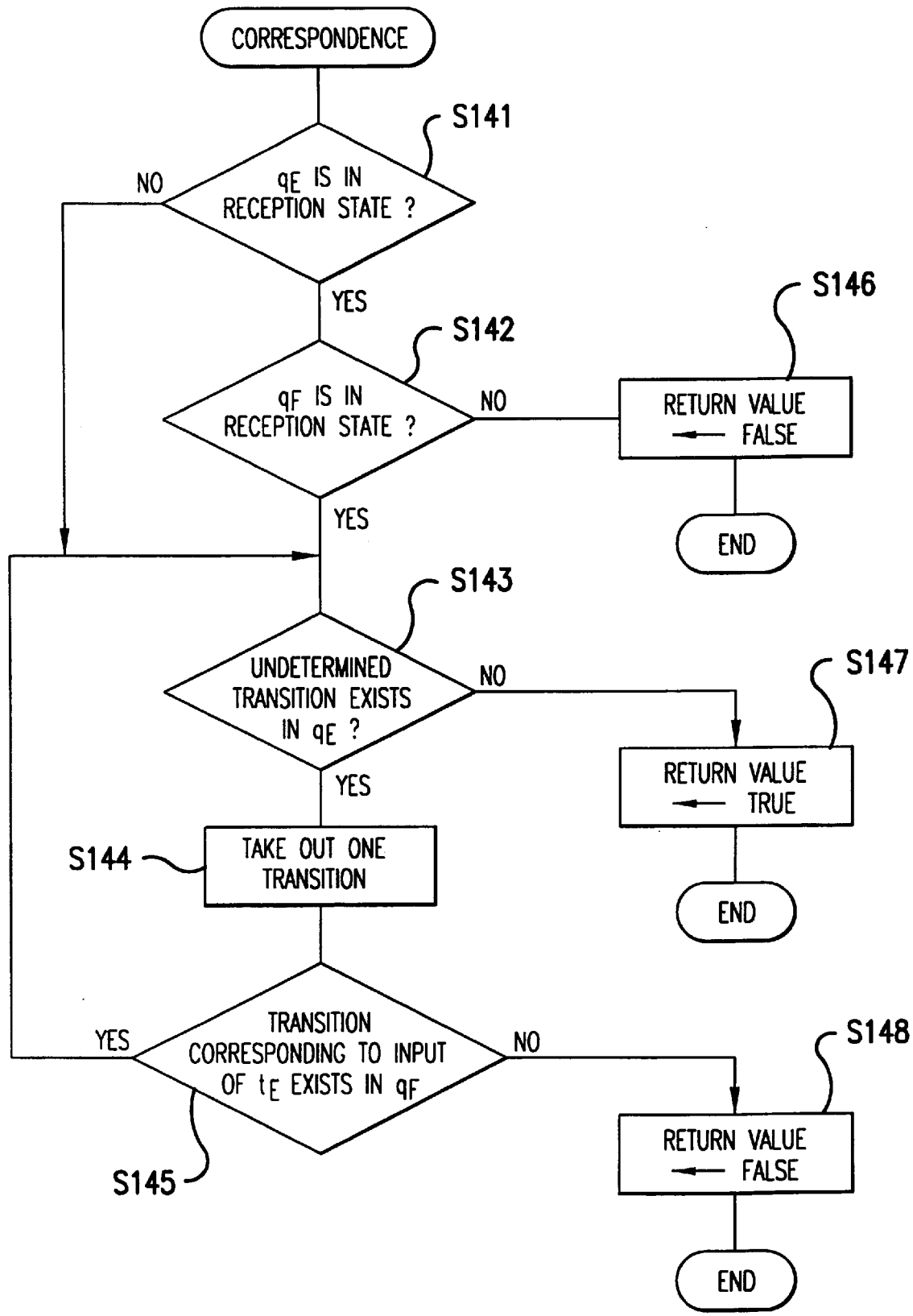
FIG. 29 is a flowchart showing a procedure for determining whether there is a corresponding relationship between two nodes.

FIGS. 27 to 29 are flowcharts showing a procedure for checking the inclusive relationship of the languages defined by two finite-state automatons. The return value is true when the language defined by a first finite-state automaton is included in the language defined by a second finite-state automaton. Otherwise the return value is false.

FIG. 27 is a flowchart showing a procedure for checking whether there is an inclusive relationship between the languages received by the two finite-state automatons. The input to the procedure are the finite-state automatons $M_E$ and $M_F$ and the output is either true or false. When the language received by $M_E$ is included in the language received by $M_F$, the output is true. If not, the output is false.

In step S121, the initial state $I_E$ of $M_E$ and the initial state $I_F$ of $M_F$ are obtained.

In step S122, a procedure (FIG. 28) for comparing states is called by using $M_E$, $I_E$, $M_F$, and $I_F$ as arguments.

In step S123, a check is made on whether the return value of the called procedure in step S122 is true. If it is true, step S124 follows. If it is false, the processing routine advances to step S125.

In step S124, the return value is set to true and the processing routine is finished.

In step S125, the return value is set to false and the processing routine is finished.

FIG. 28 is a flowchart showing a procedure for comparing states of finite-state automatons. The inputs to the procedure are $M_E$, $q_E$, $M_F$, and $q_F$, wherein $q_E$ is one of the states of the automaton $M_E$, and $q_F$ is one of the states of the automaton $M_F$. The output is either true or false. There is a corresponding relationship between $q_E$ and $q_F$, and between transition destinations from $q_E$ and transition destinations from $q_F$, each of which corresponds to the transition from $q_E$. In the procedure, a set S comprising pairs of a state in the finite-state automaton $M_E$ and a state in the finite-state automaton $M_F$, whose corresponding relationship has been checked, is used. Although the procedure is recursive, the set S can be commonly used in the procedure at any level. The initial value of S is $\phi$.

In step S131, the pair consisting of $q_E$ and $q_F$ is added to S.

In step S132, a procedure (FIG. 29) for discriminating whether there is a corresponding relationship between the two nodes is called by using $M_E$, $q_E$, $M_F$, and $q_F$ as arguments.

In step S133, whether the return value of the procedure called in step S132 is true is checked. If it is true, the processing routine advances to step S134. Otherwise, the processing routine advances to step S139. The following steps S134 to S137 are repetitive processes to the transitions from $q_E$.

In step S134, whether there are undetermined transitions from $q_E$ is checked. If YES, the processing routine advances to step S135. If NO, to step S140.

In step S135, an undetermined transition $t_E$ from $q_E$ is selected and a transition destination $q'_E$ is obtained.

In step S136, a transition destination $q'_F$ from $q_F$ is obtained in correspondence to the input of $t_E$.

In step S137. the set S is checked and whether the correspondence between $q'_E$ and $q'_F$ has been checked is determined. If YES, the processing routine is returned to step S134. If NO, step S138 follows.

In step S138, The main procedure is called recursively by using $M_E$, $q'_E$, $M_F$, and $q'_F$ as arguments. The result of the procedure calling is determined in step S133.

In step S139, the return value is set to false and the processing routine is finished.

In step S140, the return value is set to true and the processing routine is finished.

FIG. 29 is a flowchart showing a procedure for checking whether there is a corresponding relationship between two nodes. The inputs to the procedure are $M_E$, $q_E$, $M_F$, and $q_F$. The output is either true or false. When there is a corresponding relationship between $q_E$ and $q_F$, the output is true. If not, the output is false.

In step S141, whether $q_E$ is in a reception state is checked. If YES, the processing routine advances to step S142. If NO, the processing routine advances to step S143.

In step S142, whether $q_F$ is in a reception state is checked. If YES, the processing routine advances to step S143. If NO, to step S146.

The following steps S143 to S145 are repetitive processes for transitions from $q_E$.

In step S143, whether there are undetermined transitions from $q_E$ is checked. If YES, the processing routine advances to step S144, and if NO, to step S147.

In step S144, one of the undetermined transitions from $q_E$ is selected.

In step S145, whether a transition corresponding to the transition $t_E$ selected in step S144 exists for $q_F$ is checked. If YES, the processing routine is returned to step S143. If NO, the processing routine advances to step S148.

In step S146, the return value is set to false and the processing routine is finished.

In step S147, the return value is set to true and the processing routine is finished.

In step S148, the return value is set to false and the processing routine is finished.

By such procedures as mentioned above, a determination on whether there is a corresponding relationship between two nodes is made. For example, when the flowchart shown in FIG. 29 is executed by using the finte-state automatons shown in FIGS. 25 and 26 as arguments, the return value is true. When the finite-state automatons are given in the opposite order, the return value is false. It is therefore understood that the language defined by the finite-state automaton shown in FIG. 25 is smaller than the language defined by the finite-state automaton shown in FIG. 26.

Figure 30:
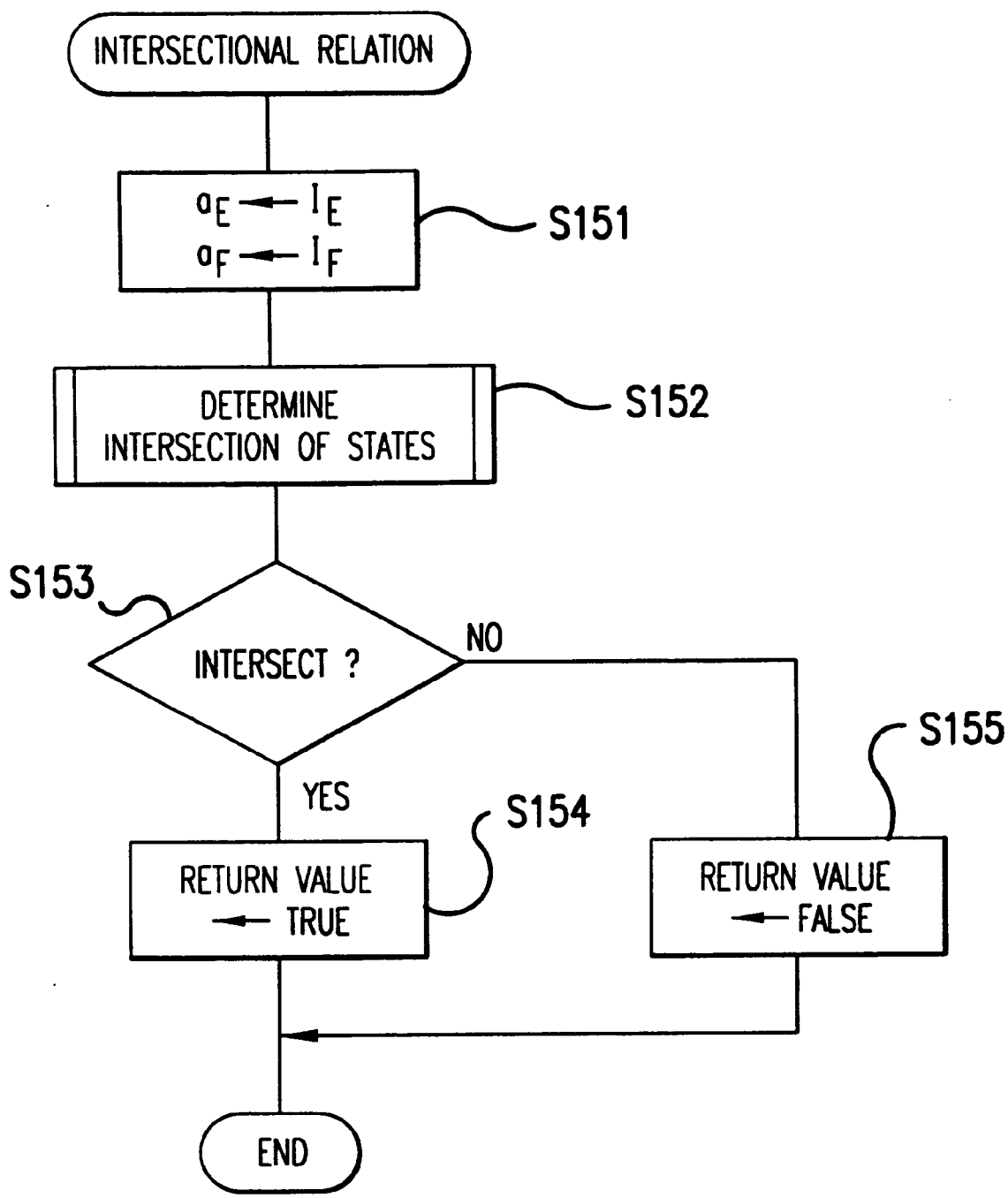
FIG. 30 is a flowchart showing a main procedure for checking whether the intersection of languages defined by two finite-state automatons is a null set.
Figure 31:
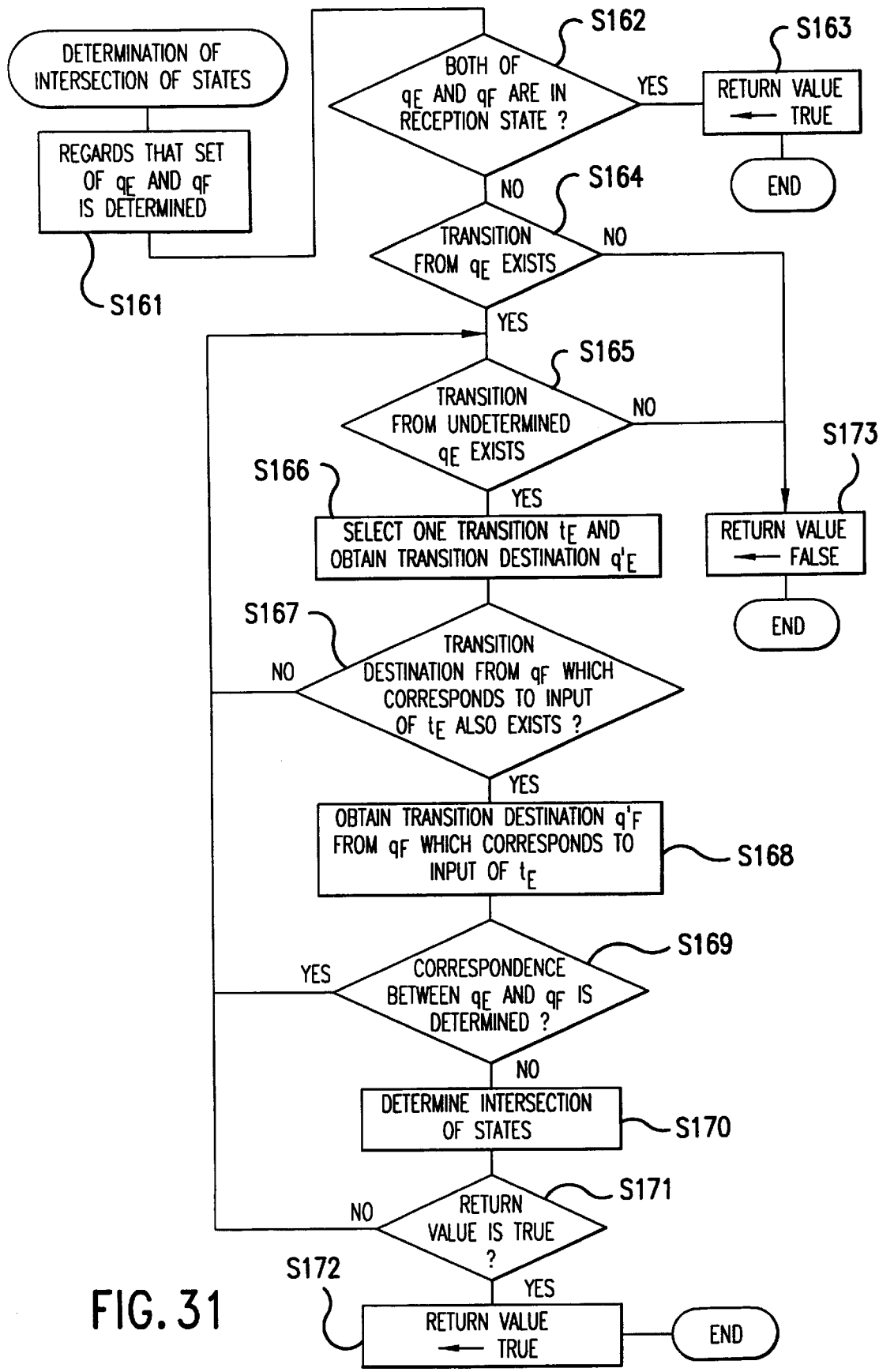
FIG. 31 is a flowchart showing a sub procedure for checking whether the intersection of languages defined by two finite-state automatons is a null set.

FIGS. 30 and 31 are flowcharts showing procedures for checking whether the intersection of the languages defined by two finite-state automatons is a null set. The return value is true when the language defined by the first finite-state automaton intersects the language defined by the second finite-state automaton. The return value is false when the language defined by the first finite-state automaton does not intersect the language defined by the second finite-state automaton.

FIG. 30 is a flowchart showing a main procedure for checking whether the intersection of the languages defined by the two finite-state automatons is a null set. The inputs to the procedure are finite-state automatons $M_E$ and $M_F$, and the output is either true or false. If the language defined by $M_E$ intersects the language defined by $M_F$, the output is true. Otherwise, the output is false.

In step S151, an initial state $I_E$ of $M_E$ and an initial state $I_F$ of $M_F$ are located.

In step S152, the procedure shown in FIG. 31 is called by using $M_E$, $I_E$, $M_F$, and $I^F$ as arguments.

In step S153, a determination on whether the result of the procedure called in step S152 is true is made. If the result is true, the processing routine advances to step S154. Otherwise, the processing routine advances to step S155.

In step S154, the return value is set to true and the processing routine is finished.

In step S155, the return value is set to false and the processing routine is finished.

FIG. 31 is a flowchart showing a sub procedure for checking whether the intersection of the languages defined by two finite-state automatons is null set. That is, this is a flowchart of a procedure for checking whether a common input alphabet string exists which the two finite-state automatons accepts. The inputs to the procedure are $M_E$, $q_E$, $M_F$, and $q_F$. The output is either true or false. If the input alphabet string exists such that the string causes transitions changing the states of $q_E$ and $q_F$ to reception states, the output is true. Otherwise, the output is false. A set S comprising pairs of a state of the finite-state automaton $M_E$ and a state of the finite-state automaton $M_F$ which have been checked is used in the procedure. Although the procedure is recursive, S is commonly used in every procedure call at any level. The initial value of S is $\phi$.

In step S161, the pair of $q_E$ and $q_F$ are added to S as checked ones.

In step S162, whether both $q_E$ and $q_F$ are in the reception state is determined. If YES, the processing routine advances to step S163. If NO, to step S164.

In step S163, the return value is set to true and the processing routine is finished.

In step S164, whether there is an undetermined transition in $q_E$ is checked. If YES, step S165 follows. If NO, step S173 follows.

In step S165, whether an undetermined transition from $q_E$ exists or not is checked. If YES, the processing routine advances to step S166. If NO, to step S173.

In step S166, a transition $t_E$ from the undetermined $q_E$ is selected and its destination $q_E$ is obtained.

In step S167, whether a transition destination from $q_F$, which corresponds to the input Of $t_E$, exists is determined. If the transition destination exists, the processing routine advances to step S168. If not, the processing routine is returned to step S165.

In step S168, a transition destination $q'_F$ from $q_F$, corresponding to the input of $t_E$, is obtained.

In step S169, S is examined and whether the pair of $q'_E$ and $q'_E$ has been discriminated is checked. If YES, the processing routine is returned to step S165. If NO, the processing routine advances to step S170.

In step S170, the main procedure is called recursively by using $M_E$, $q'_E$, $M_F$, and $q'_F$, as arguments.

In step S171, whether the result of the procedure called in step S170 is true is checked. If YES, the processing routine advances to step S172. If NO, the processing routine is returned to step S165.

In step S172, the return value is set to true and the processing routine is finished.

In step S173, the return value is set to false and the processing routine is finished.

By the above procedures, whether the inputted finite-state automatons have an intersection is determined. For example, when the flowchart shown in FIG. 30 is executed by using the finite-state automatons 42 and 43 shown in FIGS. 25 and 26 as arguments, the return value is true. Consequently, it is understood that the intersection of the languages defined by the two finite-state automatons is not null set, that is, they have an intersecting relationship.

Retrieval of the document type will be described hereinafter. A process for searching for document types defining a language having a designated relationship with the language defined by a designated document type is executed in such a manner that the determination control unit 13 sequentially inputs document types to the document collating unit 20 and return values are obtained.

FIGS. 32 to 42 are flowcharts showing a procedure for searching for document types defining a language having a designated relationship with a language defined by a designated document type.

Figure 32:
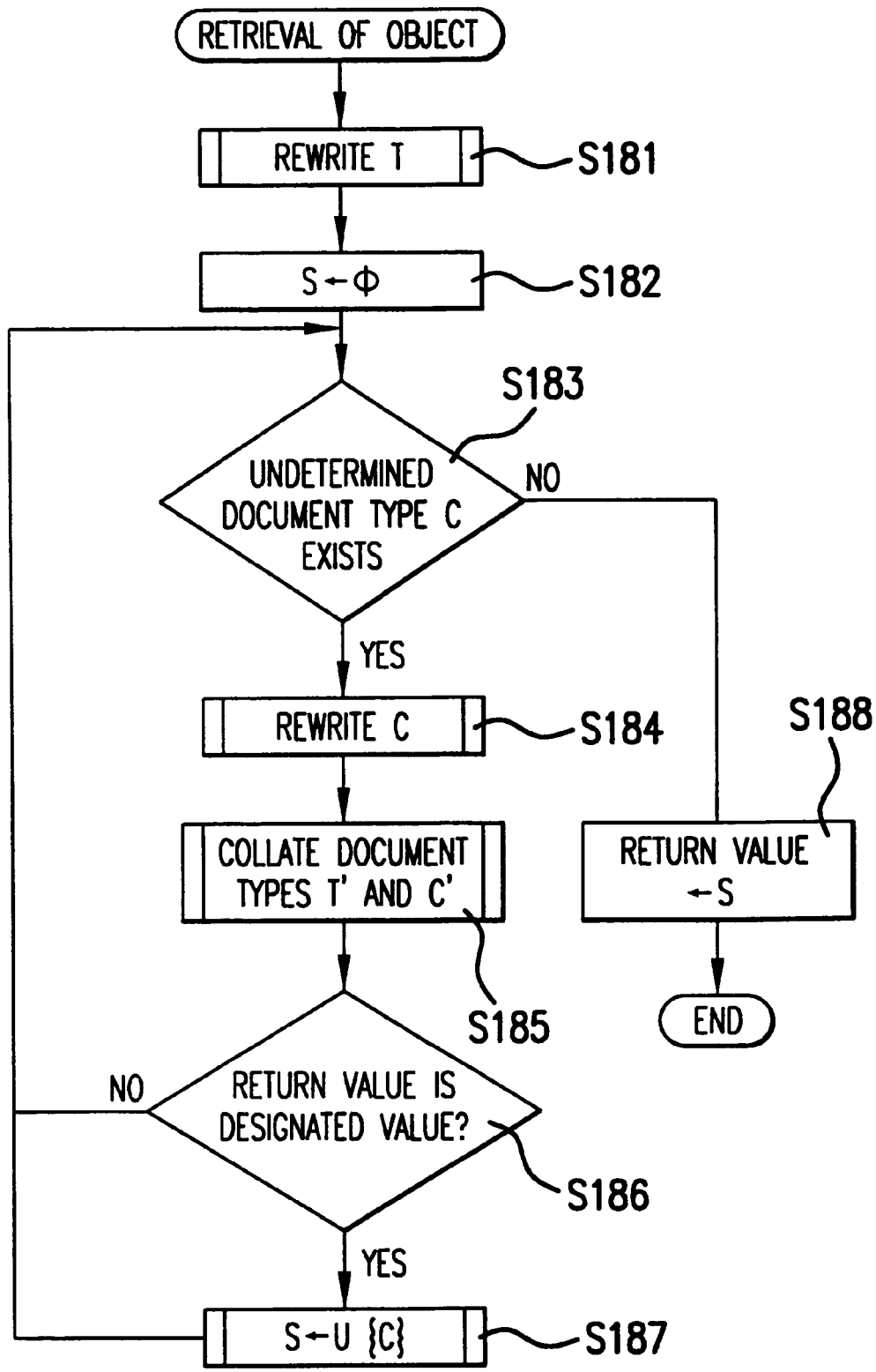
FIG. 32 is a flowchart showing a main procedure for obtaining a document type having a designated relationship with a document type T.

FIG. 32 is a flowchart showing a main procedure for obtaining a set of document types having a designated relationship with a document type T, which is executed by the determination control unit 13. The input of the procedure is a relationship with the document type T. The relationship is designated by a character string of either 'intersects', 'lt', 'gt', or 'eq' indicating "having an intersection without the inclusive relationship with the language defined by T", "including a language defined by T", "being included in a language defined by T", and "being equal to a language defined by T", respectively. The output of the procedure is a set of document types.

In step S181, the procedure shown in FIG. 12 is called by using T as the argument and a document type definition is rewritten, thereby obtaining a document type T'.

In step S182, a variable S indicative of a set of document types is set to null set.

In step S183, whether a document type C, whose relationship with T' has not been checked, exists is checked. If YES, the processing routine advances to step S184. If NO, the processing routine advances to step S188.

In step S184, the procedure shown in FIG. 12 is called by using C as an argument and the document type definition is rewritten, thereby obtaining a document type C'.

Figure 33:
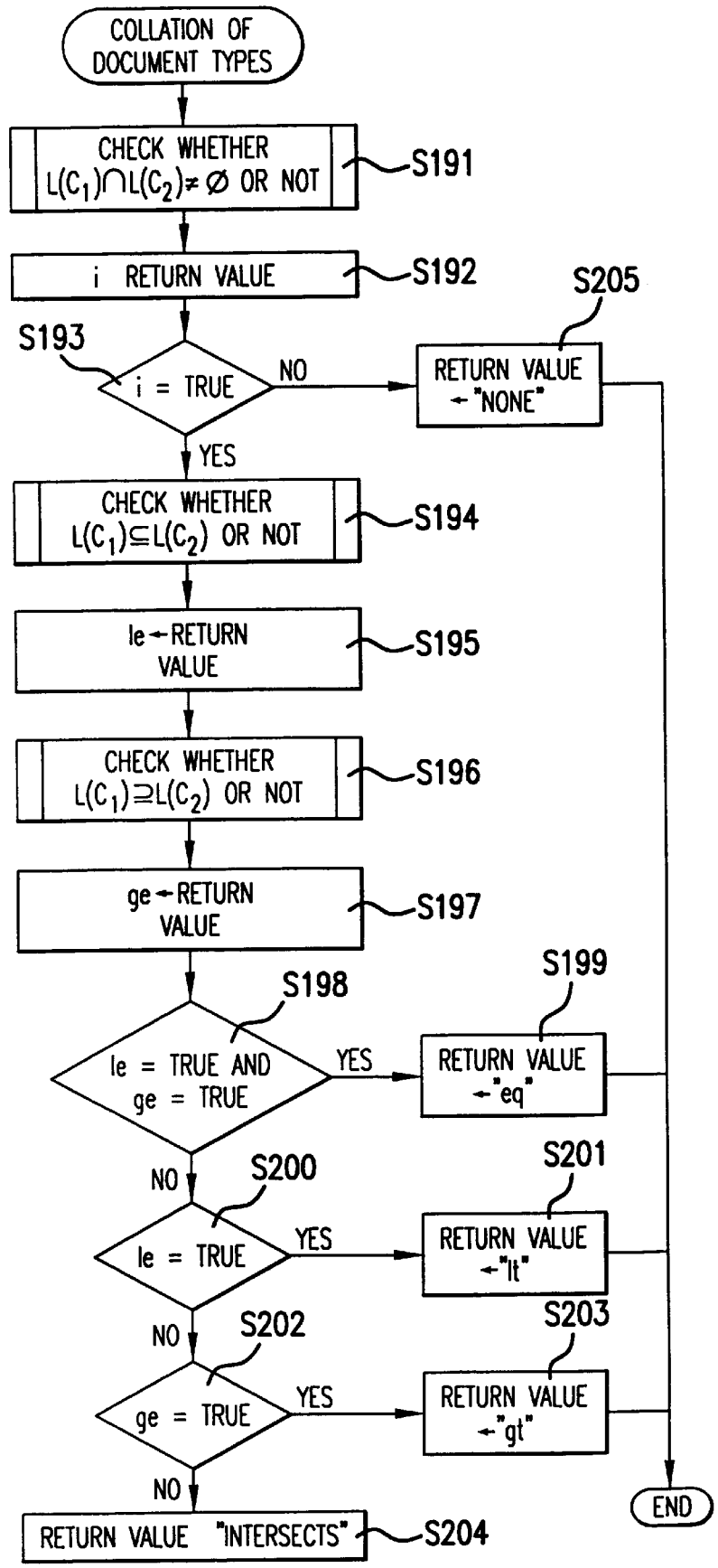
FIG. 33 is a flowchart showing a procedure for determining the relationship of languages defined by two document types.

In step S185, a procedure shown in FIG. 33 is called by using C' and T' as arguments.

In step S186, whether the result of the procedure called in step S185 is a designated value is checked. If YES, the processing routine advances to step S187. If NO, the processing routine is returned to step S183.

In step S187, C is added to S and the processing routine is returned to step S183.

In step S188, the return value is set to the value of S and the processing routine is finished.

FIG. 33 is a flowchart showing a procedure for determining the relationship between languages defined by two document types. The inputs to the procedure are document types $C_1$ and $C_2$ and the return values are character strings of 'intersects', 'lt', 'gt', 'eq', and 'none', each indicating the relationship between a language defined by $C_1$ and a language defined by $C_2$. The strings 'intersects', 'lt', 'gt', and 'eq' are used in the same sense as in the procedure shown in FIG. 32, and 'none' indicates that there is no intersection between the document types $C_1$ and $C_2$.

Figure 35:
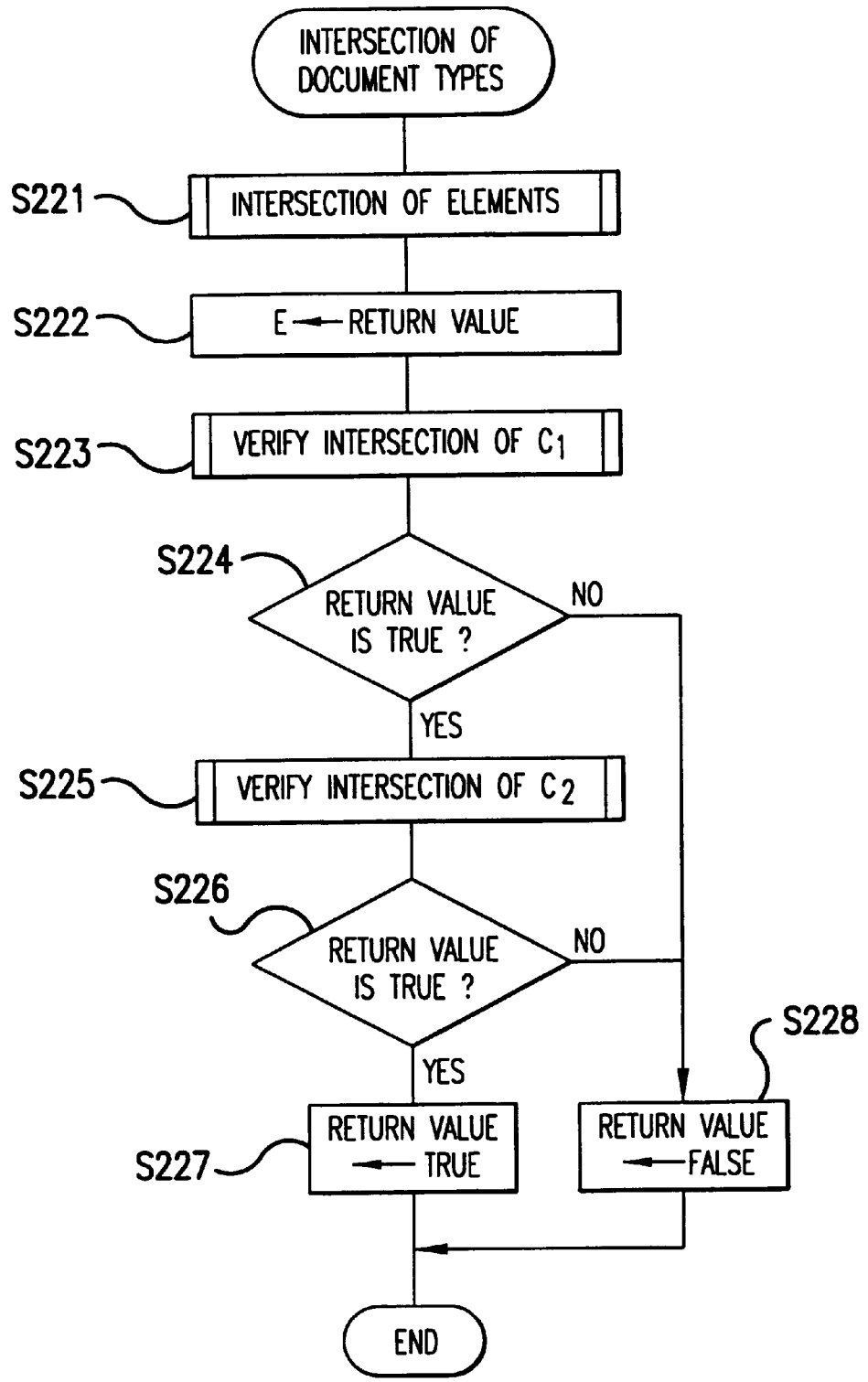
FIG. 35 is a flowchart showing a procedure for checking whether an intersection exists in languages defined by two document types.

In step S191, a procedure shown in FIG. 35 is called by using $C_1$ and $C_2$ as Arguments, and whether an intersection between the language defined by $C_1$ and the language defined by $C_2$ exists is checked.

In step S192, the return value of the procedure called in step S191 is set as the value of a variable i.

In step S193, Whether the variable i is true is checked. If YES, the processing routine advances to step S194. Otherwise, the processing routine advances to step S205.

Figure 34:
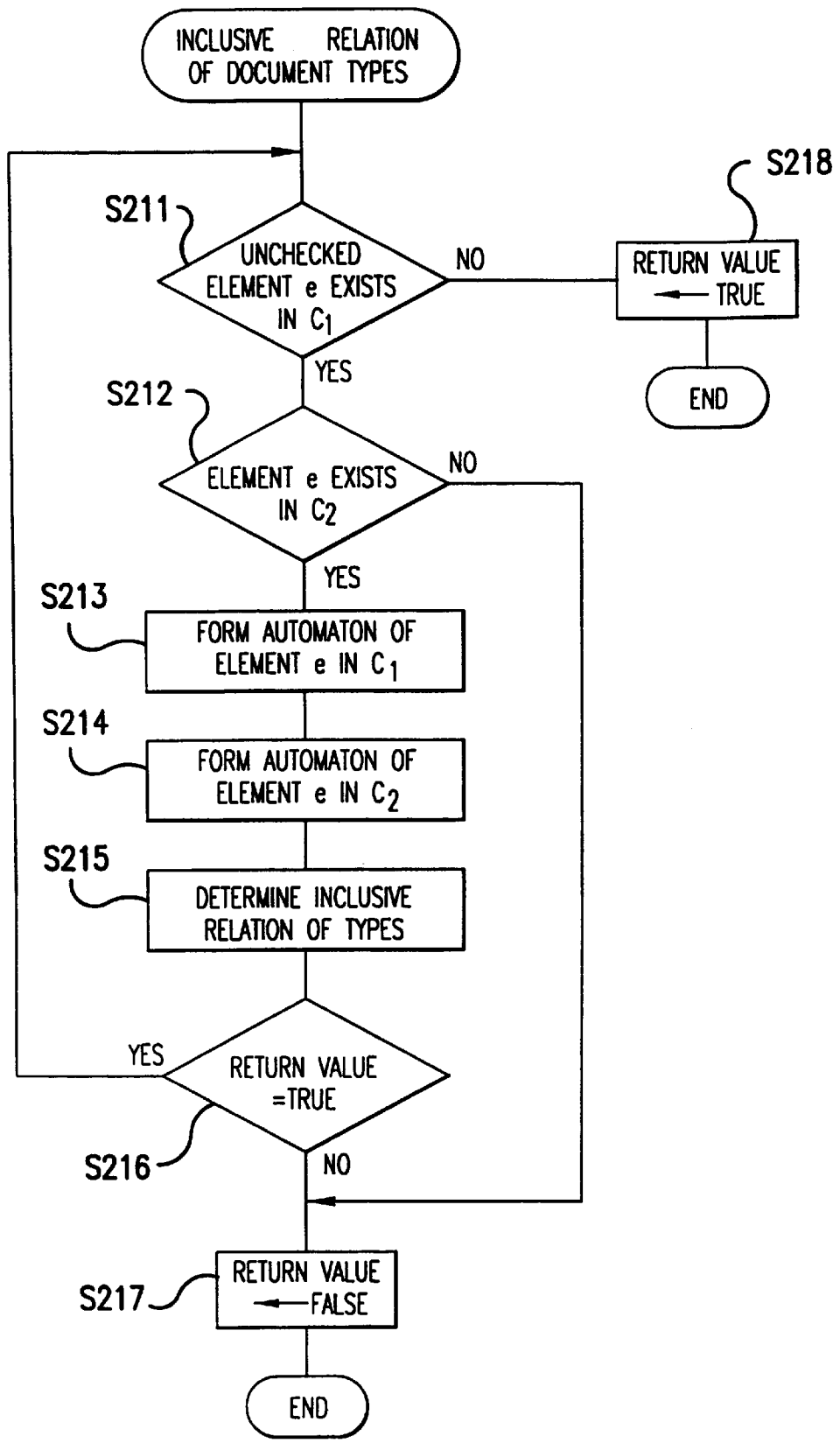
FIG. 34 is a flowchart showing a procedure for checking an inclusive relationship of languages defined by two document types.

In step S194, a procedure shown in FIG. 34 is called by using $C_1$ and $C_2$ as arguments and whether the language defined by $C_1$ is included in the language defined by $C_2$ is checked.

In step S195, the return value of the procedure called in step S195 is set as the value of a variable le.

In step S196, the procedure shown in FIG. 34 is called by using $C_2$ and $C_1$ as arguments and whether the language defined by $C_1$ includes the language defined by $C_2$ or not is checked.

In step S197, the return value of the procedure called in step S196 is set as the value of a variable ge.

In step S198, whether both of the variables le and ge are true is checked. If both variables are true, the processing routine advances to step S199. If not, the processing routine advances to step S200.

In step S199, the return value is set as 'eq' and the processing routine is finished.

In step S200, whether the variable is true is checked. If YES, the processing routine advances to step S201. Otherwise, the processing routine advances to step S202.

In step S201, the return value is set to 'lt' and the processing routine is finished.

In step S202, whether the variable ge is true or not is checked. If YES, the processing routine advances to step S203, and if NO, to step S204.

In step S203, the return value is set to 'gt' and the processing routine is finished.

In step S204, the return value is set to 'intersects' and the processing routine is finished.

In step S205, the return value is set to 'none' and the processing routine is finished.

FIG. 34 is a flowchart showing a procedure for checking the inclusive relationship between the languages defined by two document types. The inputs to the procedure are document types $C_1$ and $C_2$. The return value is either true or false. When a language defined by $C_1$ is the same as or included in a language defined by $C_2$, the return value is true. If not, the return value is false.

Steps S211 to S216 are repetitive processes to elements defined by $C_1$.

In step S211, whether there is an unchecked element e in $C_1$ is checked. If YES, the processing routine advances to step S212. Otherwise, the processing routine advances to step S218.

In step S212, whether an element having the same name as e exists in $C_2$ is checked. If YES, step S213 follows. If NO, step S217 follows.

In step S213, the procedure shown in FIG. 15 is called by using the content model of the element e in $C_1$ as the argument, and a finite-state automaton $M_1$ is formed.

In step S214, the procedure shown in FIG. 15 is called by using the content model of the element e in $C_2$ as the argument, and a finite automaton $M_2$ is formed.

In step S215, the procedure shown in FIG. 27 is called by using $M_1$ and $M_2$ as arguments and whether a language defined by the element e in $C_1$ is included in a language defined by the element e in $C_2$ is checked.

In step S216, whether the return value of the procedure called in step S215 is true is checked. If YES, the processing routine is returned to step S211. If NO, the processing routine advances to step S217.

In step S217, the return value is set to false and the processing routine is finished.

In step S218, the return value is set to true and the processing routine is finished.

FIG. 35 is a flowchart showing a procedure for checking whether languages defined by two document types intersect. The input to the procedure are document types $C_1$ and $C_2$. The return value is either true or false. When the language defined by $C_1$ intersects the language defined by $C_2$, the return value is true. When the language defined by $C_1$ does not intersect the language defined by $C_2$, the return value is false.

Figure 36:
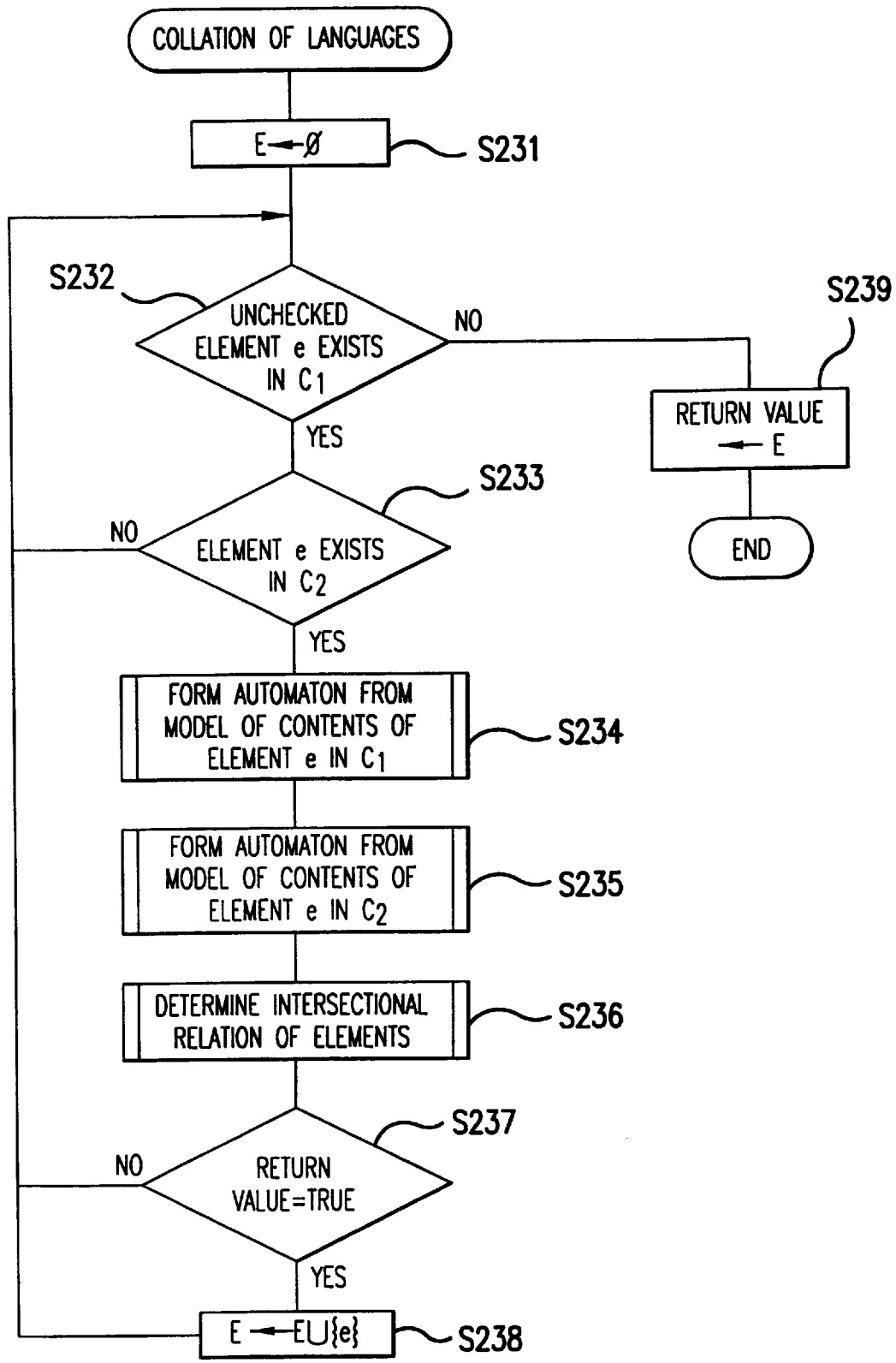
FIG. 36 is a flowchart showing a procedure for obtaining the set of elements having the same name of two document types and whether languages defined by content models are intersected.

In step S221, a procedure shown in FIG. 36 is called by using $C_1$ and $C_2$ as arguments and a set of elements having the same name in $C_1$ an $C_2$, in which languages defined by the content models have an intersection is obtained.

In step S222, the result of the procedure called in step S221 is set as a variable E.

Figure 37:
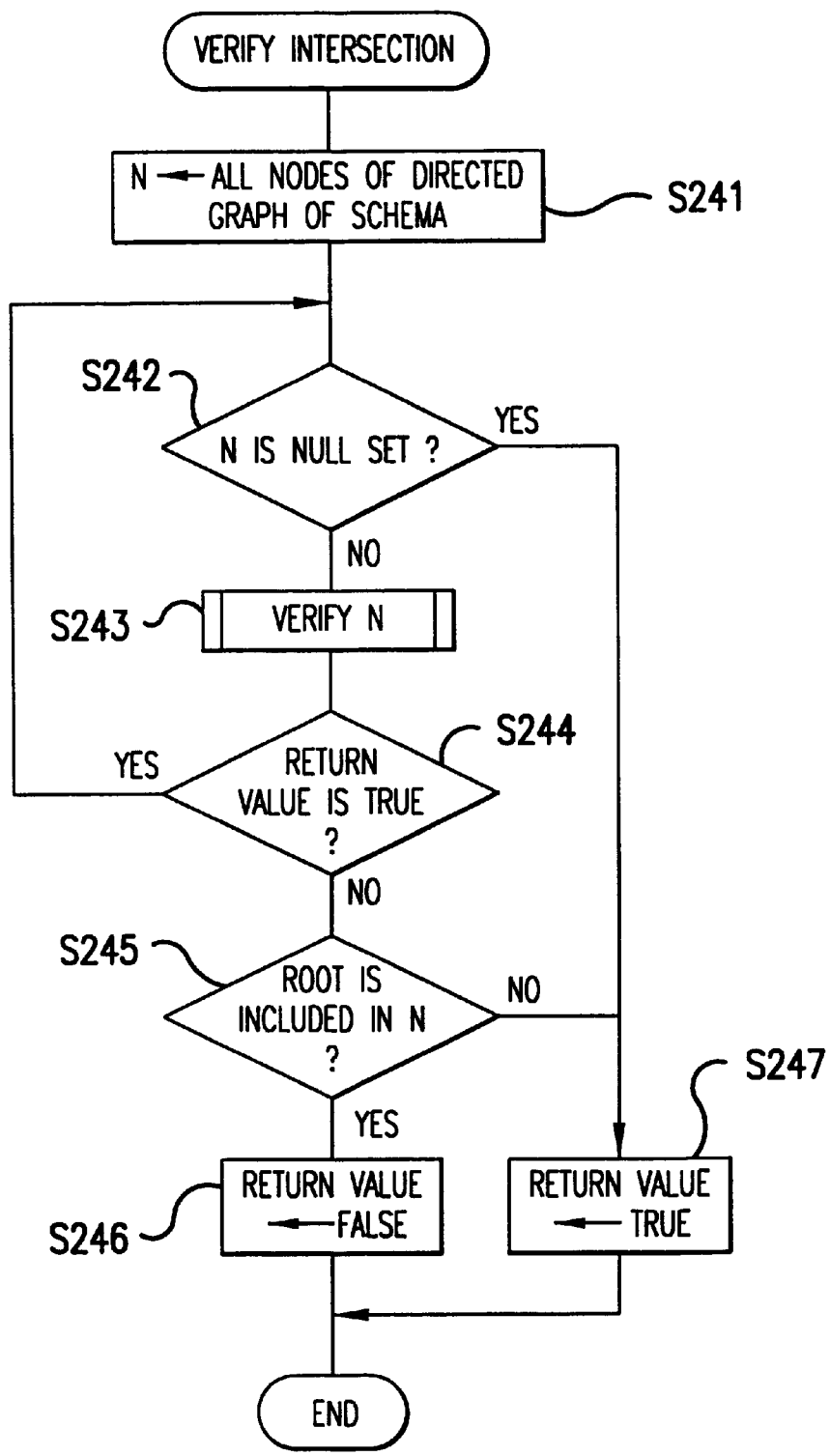
FIG. 37 is a flowchart showing a procedure for determining whether a document can be formed from a designated document type.

In step S223, a procedure shown in FIG. 37 is called by using $C_1$ and E as arguments and whether a document can be formed from $C_2$ by using only elements included in E or not is determined.

In step S224, whether the return value of the procedure called in step S223 is true is checked. If YES, the processing routine advances to step S225, and if NO, to step S228.

In step S225, the procedure shown in FIG. 37 is called by using $C_2$ and E as arguments and whether a document can be formed from $C_2$ by using only elements included in E is determined.

In step S226, whether the return value of the procedure called in step S225 is true is checked. If YES, the processing routine advances to step S227, and if NO, to step S228.

In step S227, the return value is set to true and the processing routine is finished.

In step S228, the return value is set to false and the processing routine is finished.

FIG. 6 is a flowchart showing a procedure for obtaining a set of elements having the same name in two document types and language defined by their content models intersect each other. The input to the procedure are document types $C_1$ and $C_2$ and the output is a set of names of elements whose languages are defined by the content models intersect.

In step S231, the variable E is set to null set.

Steps S232 to S238 are repetitive processes to elements of the document type $C_1$.

In step S232, whether an unexamined element e exists in $C_1$ is checked. If YES, the processing routine advances to step S233, and if NO, to step S239.

In step S233, whether an element having the same name as e exists in $C_2$ is checked. If YES, step S234 follows. If NO, the processing routine is returned to step S232.

In step S234, the procedure shown in FIG. 15 is called by using the content model of the element e in $C_1$ as the argument and a finite-state automaton $M_i$ is constructed.

In step S235, the procedure shown in FIG. 15 is called by using the content model of the element e in $C_2$ as an argument and a finite-state automaton $M_2$ is constructed.

In step S236, the procedure shown in FIG. 30 is called by using $M_1$ and $M_2$ as arguments and whether there is intersection between the languages received by $M_1$ and $M_2$ is determined.

In step S237, whether the return value of the procedure called in step S236 is true is checked. If YES, the processing routine advances to step S238. If NO, the processing routine is returned to step S232.

In step S238, the element name of e is added to the variable E and the processing routine is returned to step S232.

In step S239, the return value is set as the variable E and the processing routine is finished.

FIG. 37 is a flowchart showing a procedure for determining whether a document can be formed from a designated document type. The input to the procedure is a document type T and a set E of elements whose content model is determined to intersect the element of the same name in a certain document type. The output is a true or false. When a document can be formed from T the output is true. When a document cannot be formed from T, the output is false.

In step S241, all nodes of a directed graph expressing $C_1$ are obtained and set as values of a variable N. The following steps S242 to S245 are repetitive processes.

In step S242, whether N is a null set is determined. If YES, step S247 follows. If NO, step S243 follows.

Figure 39:
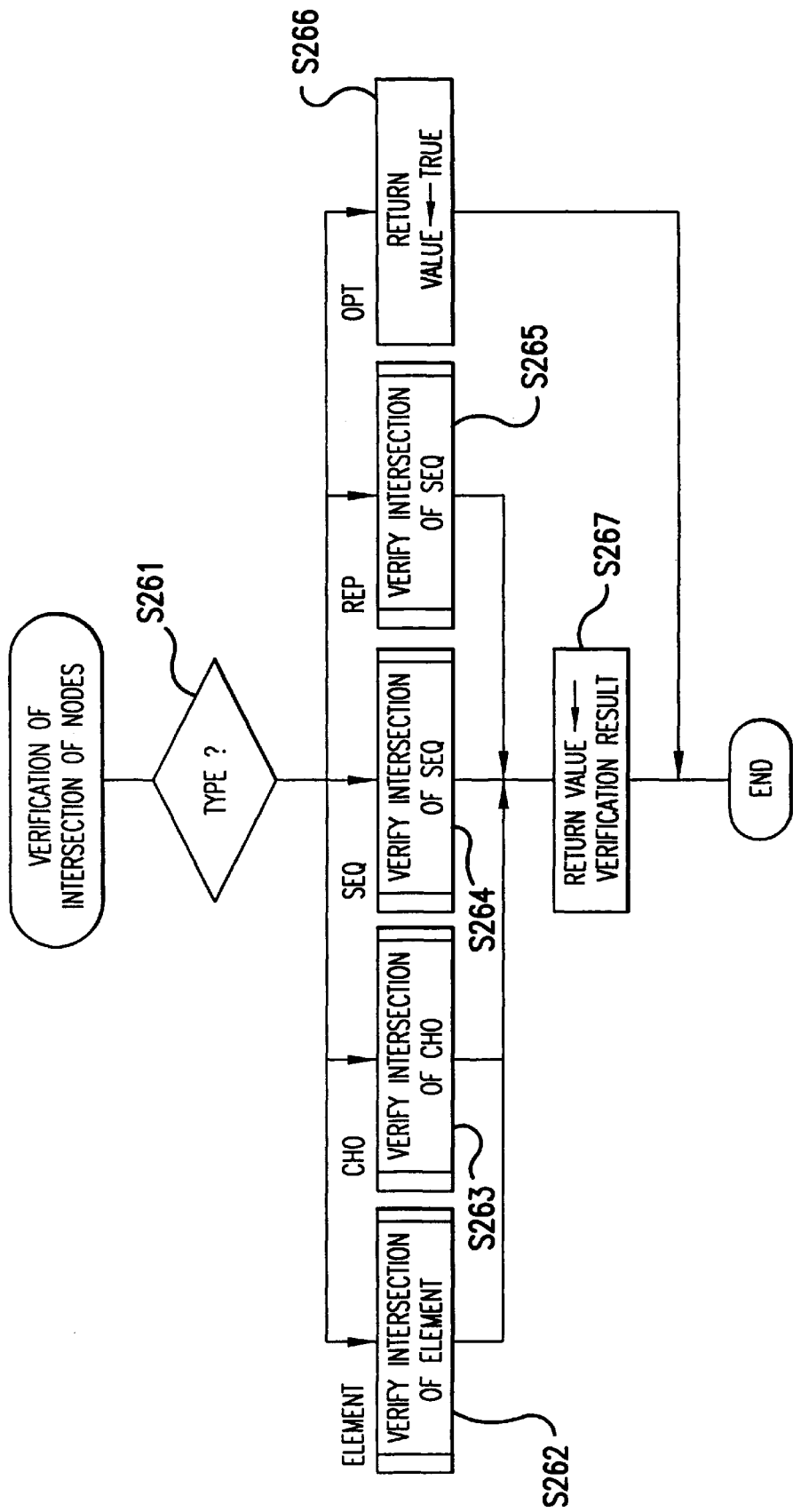
FIG. 39 is a flowchart showing a procedure for determining whether a partial structure can be formed from a node of a document type.

In step S243, a procedure shown in FIG. 39 is called by using N and E as arguments and whether one or more elements each of which can form a partial structure can be ascertained in N is determined.

In step S244, whether the result of the procedure called in step S243 is true is determined. If YES, the processing routine is returned to step S242. If NO, the processing routine advances to step S245.

In step S245, whether the root of C is included in N is checked. If YES, step S246 follows. If NO, step S247 follows.

In step S246, the return value is set to false and the processing routine is finished.

In step S247, the return value is set to true and the processing routine is finished.

Figure 38:
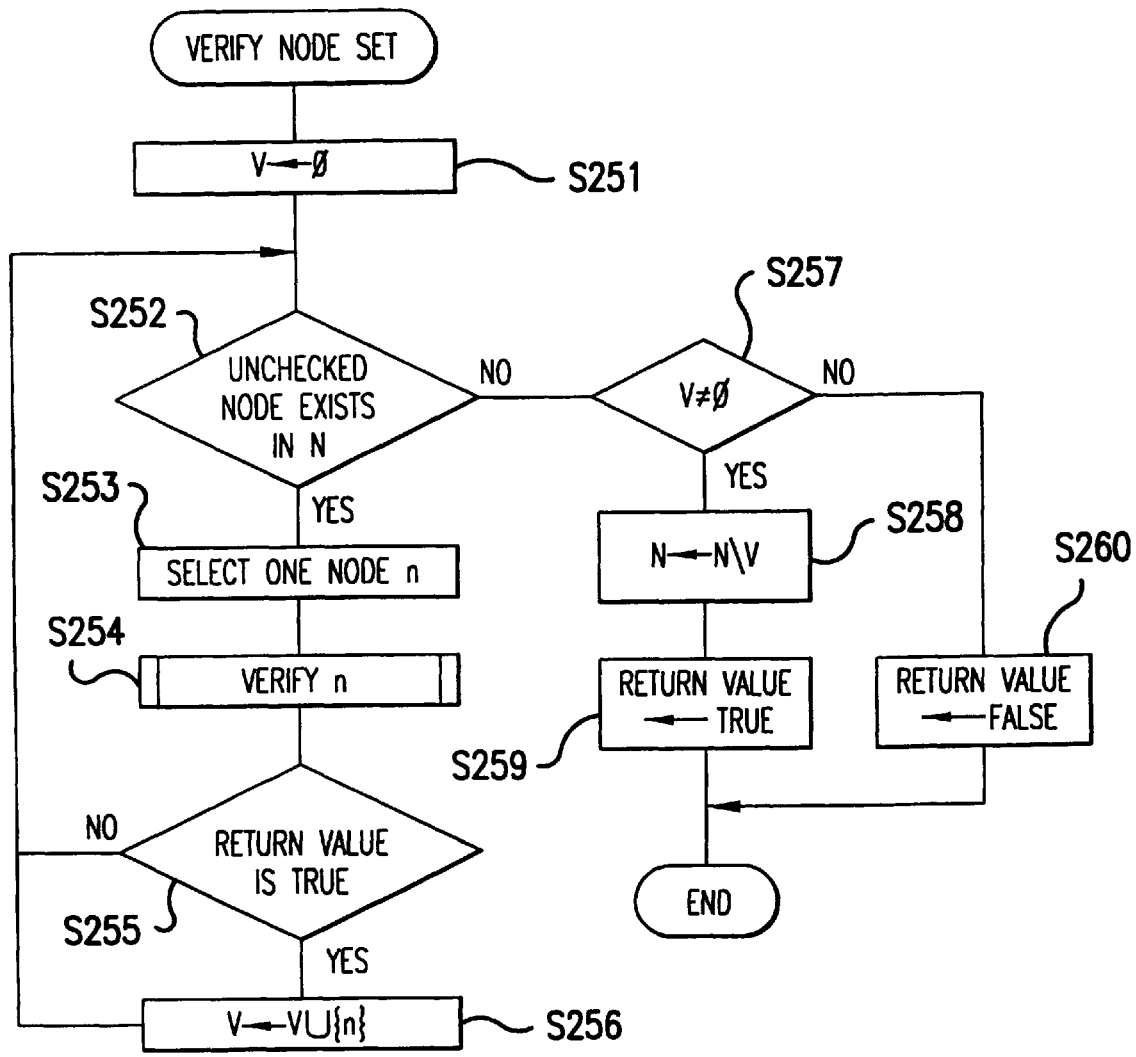
FIG. 38 is a flowchart showing a procedure for determining whether any node which can be ascertained to be capable of forming a partial structure exist among a set of nodes of a document type.

FIG. 38 is a flowchart showing a procedure for determining whether there is a node ascertained to be capable of forming a partial structure in a set of nodes (elements or constructors) of a document type. The input to the procedure are a set N of nodes which are not ascertained to be capable of forming a partial structure and a set E of elements determined to have a content model that intersects other document types. The output of the procedure is either true or false . If a node which can be ascertained to be capable of forming partial structure exists in N, the output is true. If such node does not exist in N, the output is false. By the action of the procedure, the inputted N is directly rewritten.

In step S251, a variable V is set to null set. The following steps S252 to S256 are repetitive processes to N.

In step S252, whether there are unchecked nodes in N is checked. If YES, the processing routine advances to step S253. If NO, the processing routine advances to step S257.

In step S253, an unchecked node n is selected.

Figure 40:
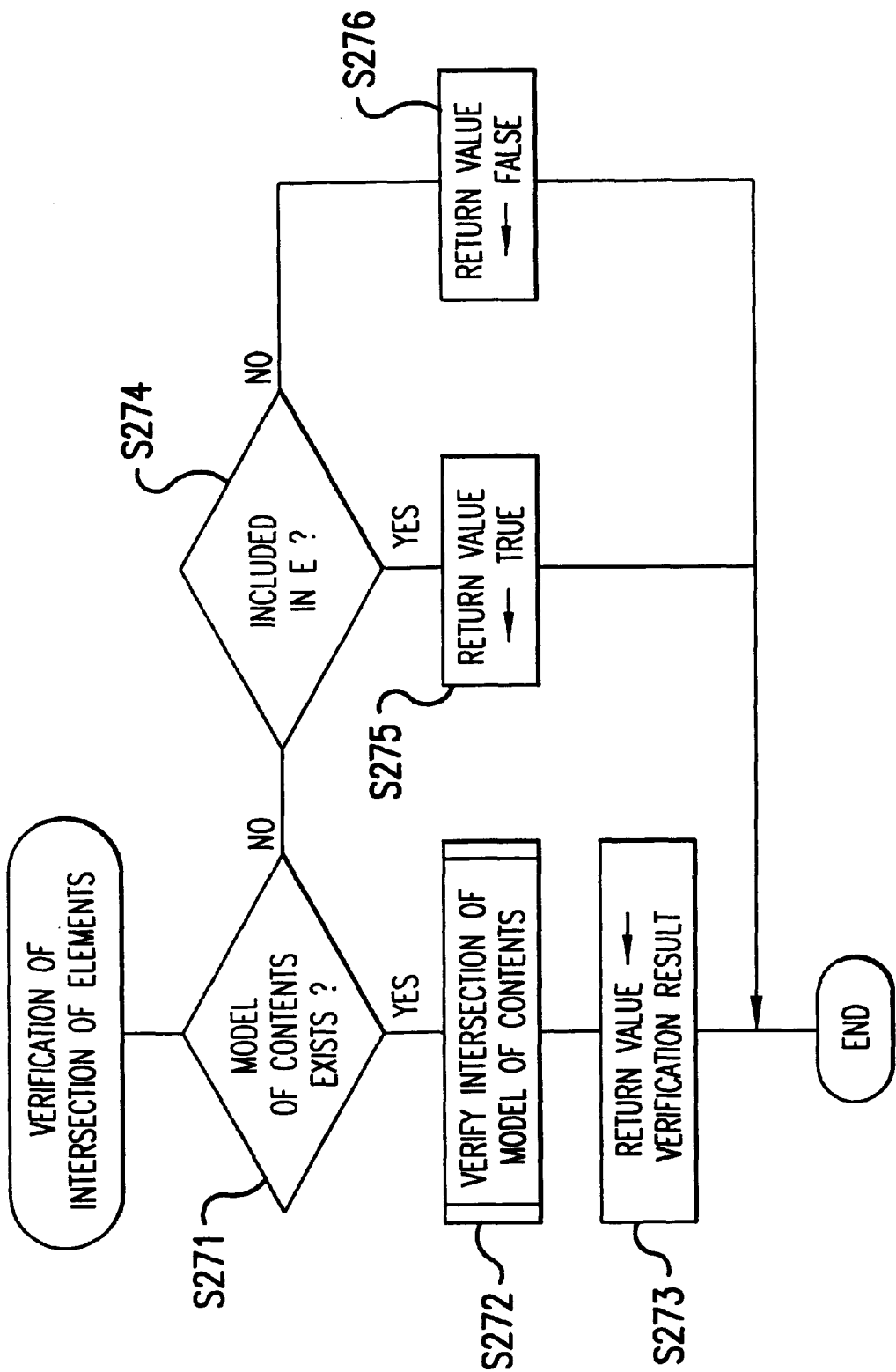
FIG. 40 is a flowchart showing a procedure for determining whether a partial structure can be formed from an element node.

In step S254, a procedure shown in FIG. 40 is called by using n and E as arguments and whether a partial structure can be formed from n is checked.

In step S255, whether the return value of the procedure called in step S254 is true is checked. If YES, the processing routine advances to step S256. If No, the processing routine is returned to step S252.

In step S256, n is added to the value of the variable V and the processing routine is returned to step S252.

In step S257, whether the value of the variable V is a null set is checked. If it is not null set, step S258 follows. If it is null set, step S260 follows.

In step S258, the difference between the set of the values of the variable N and the values of the variable V is obtained and is set as N.

In step S259, the return value is set to true and the processing routine is finished.

In step S260, the return value is set to false and the processing routine is finished.

FIG. 39 is a flowchart showing a procedure for determining whether a partial structure can be formed from the node in the document type or not. The input of the procedure are a node n in the document type and a set E of elements determined to have a content model that intersects a certain document type. The output is either true or false. If it is determined that the partial structure can be formed from n, the output is true. If not, the output is false.

In step S261, the type of the node is discriminated. If the type of the node is an element, the processing routine advances to step S262. If the type of the node is CHO, step S263 follows. If the type of the node is SEQ, step S264 follows. If the type of the node is REP, step S265 follows. If the type of the node is OPT, step S266 follows.

In step S262, a procedure shown in FIG. 40 is called by using n as an argument, whether the partial structure can be formed is determined, and the processing routine advances to step S267.

Figure 42:
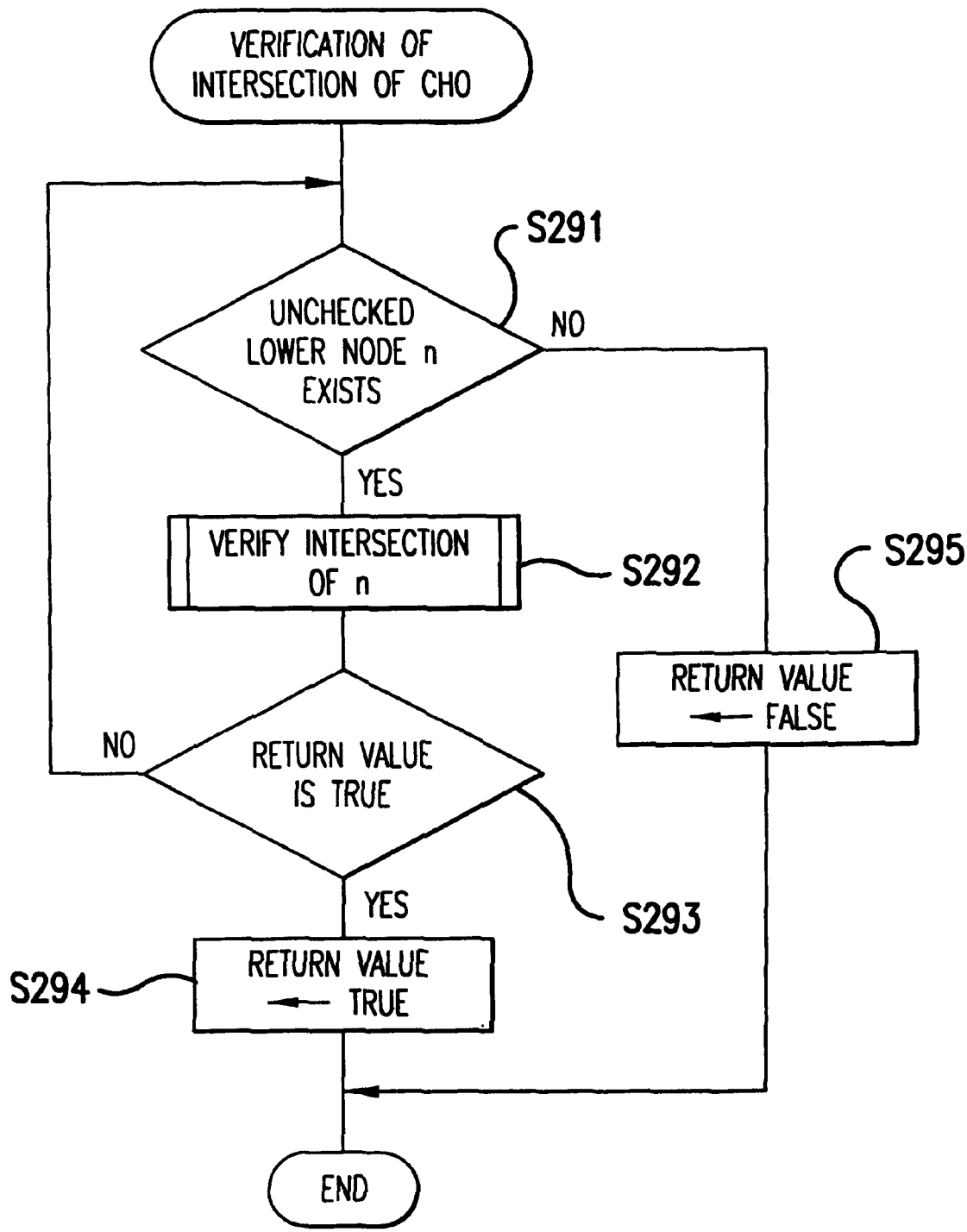
FIG. 42 is a flowchart showing a procedure for determining whether a partial structure can be formed from a CHO node.

In step S263, a procedure shown in FIG. 42 is called by using n as an argument, whether the partial structure can be formed is determined, and the processing routine advances to step S267.

Figure 41:
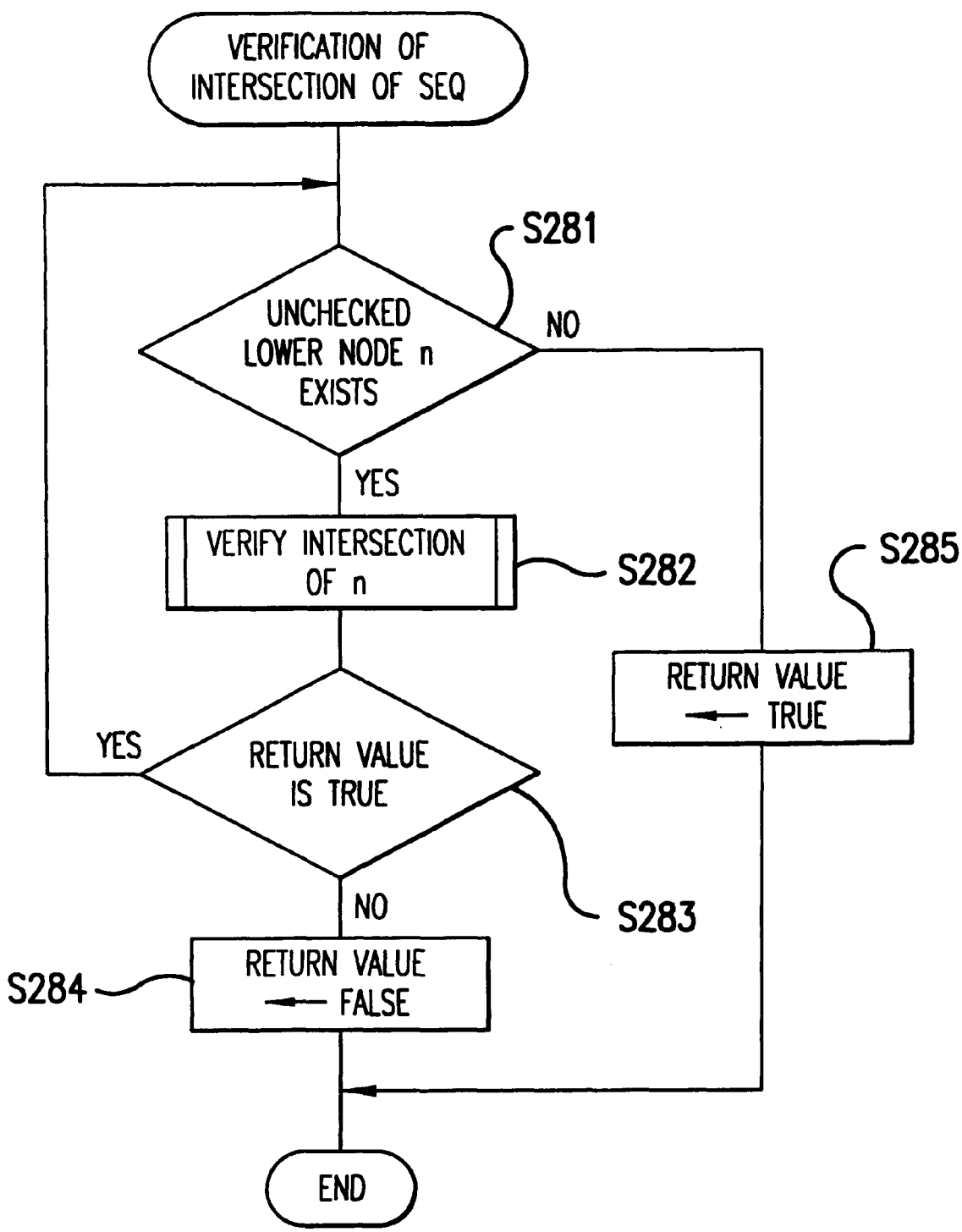
FIG. 41 is a flowchart showing a procedure for determining whether a partial structure can be formed from an SEQ node.

In step S264, a procedure shown in FIG. 41 is called by using n as an argument, whether the partial structure can be formed is determined, and step S267 follows.

In step S265, a procedure shown in FIG. 41 is called by using n as an argument, whether the partial structure can be formed is determined, and the processing routine advances to step S267.

In step S266, the return value is set to true and the processing routine is finished.

In step S267, the return value of the procedure called in steps S262 to 265 are set as return values of the procedure and the processing routine is finished.

FIG. 40 is a flowchart showing a procedure for determining whether the partial structure can be formed from an element node. The input to the procedure are an element node v and a set E of elements determined to have a content model that intersects a certain document type. The output is either true or false. If it is determined that the partial structure can be formed from v, the output is true. If not, the output is false.

In step S271, whether v has a content model is checked. If YES, the processing routine advances to step S272. If NO, the processing routine advances to step S274.

In step S272, the procedure shown in FIG. 39 is called by using the content model of v and E as arguments.

In step S273, the return value of the procedure called in step S272 is set as a return value of this procedure and the processing routine is finished.

In step S274, whether v is included in E is checked. If YES, step S275 follows. If NO, step S276 follows.

In step S275, the return value is set to true and the processing routine is finished.

In step S276, the return value is set to false and the processing routine is finished.

FIG. 41 is a flowchart showing a procedure for determining whether a partial structure can be formed from an SEQ node. The input to the procedure are an SEQ node v and a set E of elements determined to have a content model that intersects a certain document type. The output is a true or a false. If it is determined that the partial structure can be formed from v, the output is true. If not, the output is false.

Steps S281 to S283 are repetitive processes to lower nodes of v.

In step S281, whether unchecked nodes n exists in the lower nodes of v is checked. If YES, step S282 follows. If NO, step S285 follows.

In step S282, the procedure shown in FIG. 39 is called by using n and E as arguments and whether the partial structure can be formed from n is checked.

In step S283, whether the result of the determination of the procedure called in step S282 is true is checked. If the determination result is true, the processing routine is returned to step S281. If it is false, the processing routine advances to step S284.

In step S284, the return value is set to false and the processing routine is finished.

In step S285, the return value is set to true and the processing routine is finished.

FIG. 42 is a flowchart showing a procedure for determining whether the partial structure can be formed from a CHO node. The input to the procedure are a CHO node v and a set E of elements in which it is determined that its content model intersects a certain document type. The output is either true or false. If it is determined that the partial structure can be formed from v, the output is true. If not, the output is false.

Steps S291 to S293 are repetitive processes to the lower nodes of v.

In step S291, whether an unchecked node n exists in the lower nodes of v is checked. If YES, step S292 follows. If NO, step S295 follows.

In step S292, the procedure shown in FIG. 39 is called by using n and E as arguments and whether the partial structure can be formed from n is determined.

In step S293, whether the determination result of the procedure called in step S292 is true is determined. If the determination result is true, the processing routine advances to step S294. If it is not true, the processing routine is returned to step S291.

In step S294, the return value is set to true and the processing routine is finished.

In step S295, the return value is set to false and the processing routine is finished.

Figure 43:
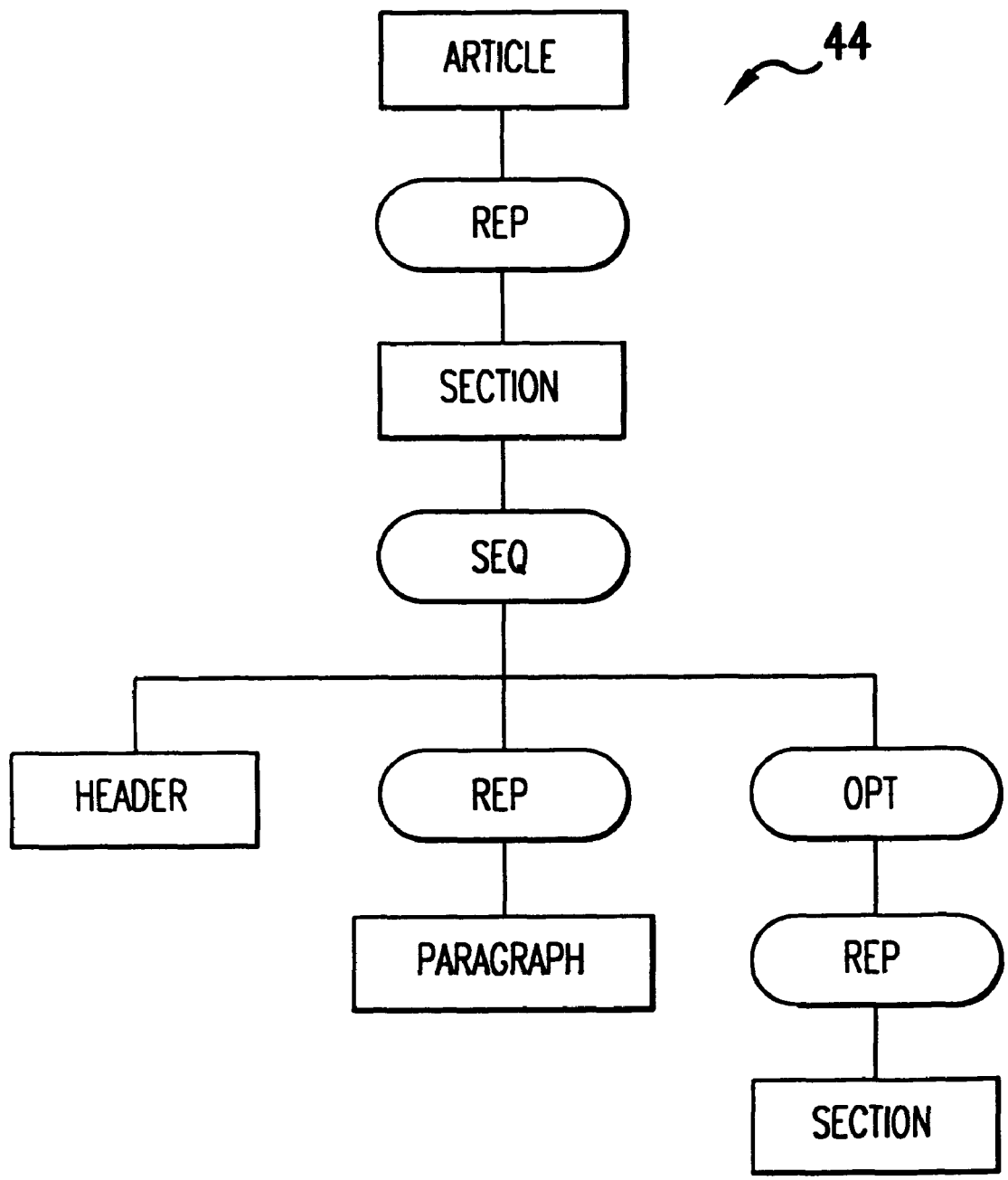
FIG. 43 is a diagram showing a third example of the document type.
Figure 44:
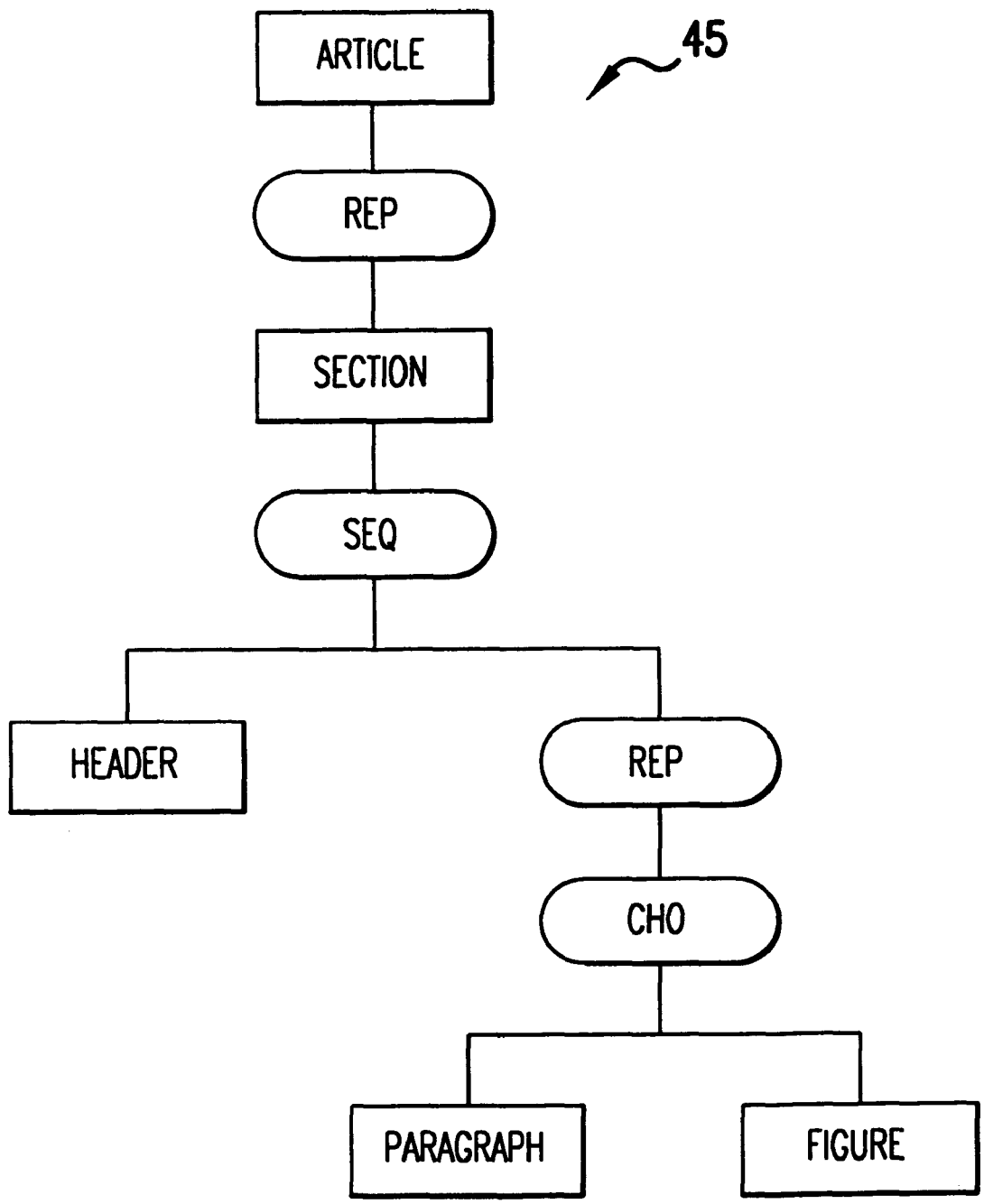
FIG. 44 is a diagram showing a fourth example of the document type.

By the above procedures, the relationship between the two document types can be known. For example, the relationship between the following third and fourth examples of the document type will be examined. FIG. 43 is a diagram showing the third example of the document type. FIG. 44 is a diagram showing the fourth example of the document type. When the relationship between them is examined, it is understood that there is no inclusive relationship but there is an intersecting relationship between the language defined by a document type 44 shown in FIG. 43 and the language defined by a document type 45 shown in FIG. 44.

Figure 45:
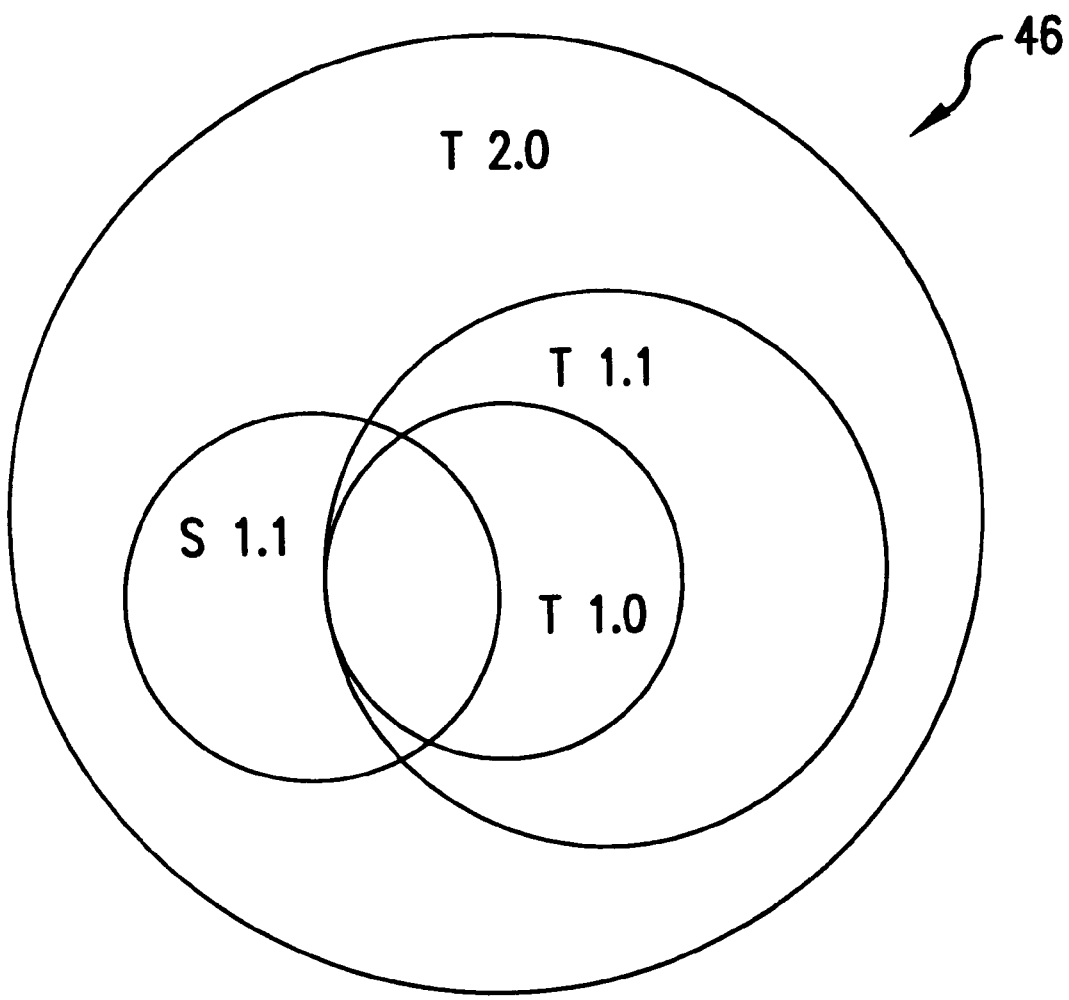
FIG. 45 is a diagram showing an example of the relationship between languages defined by document types.
Figure 46:
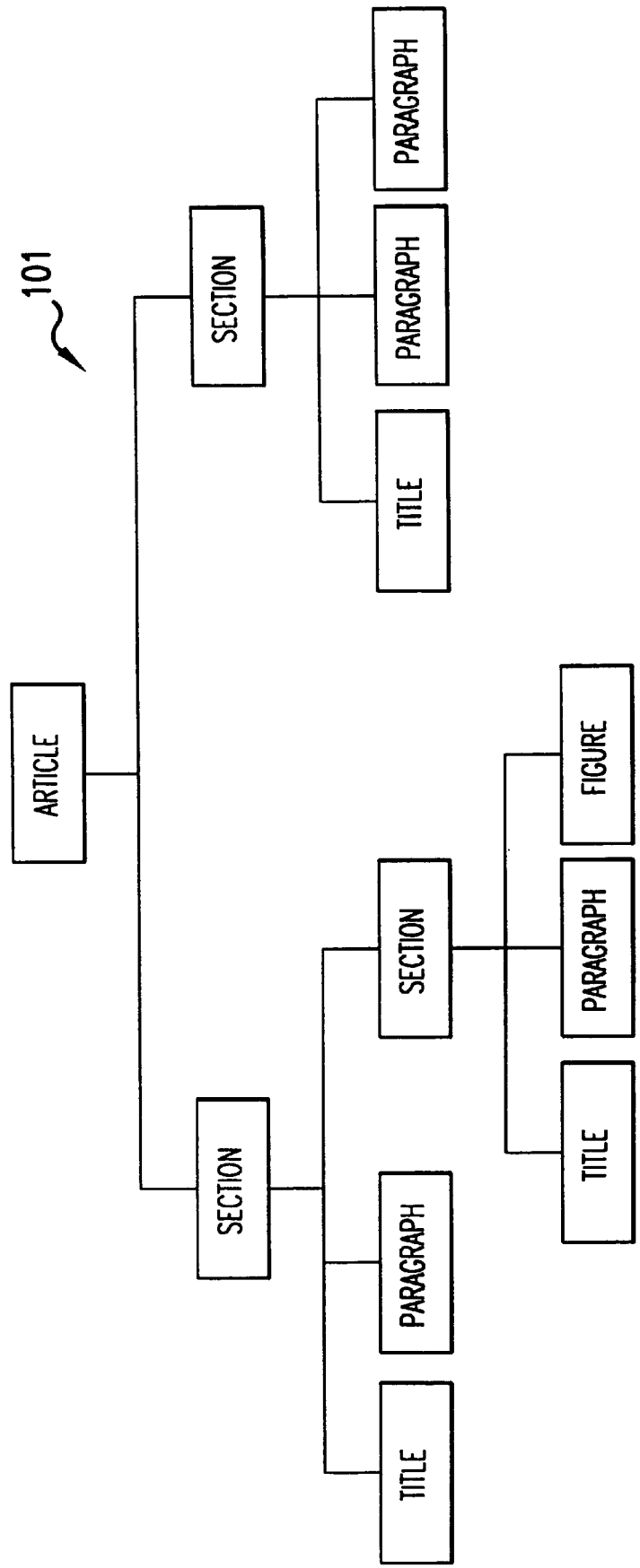
FIG. 46 is a diagram showing an example of a logical structure.
Figure 47:
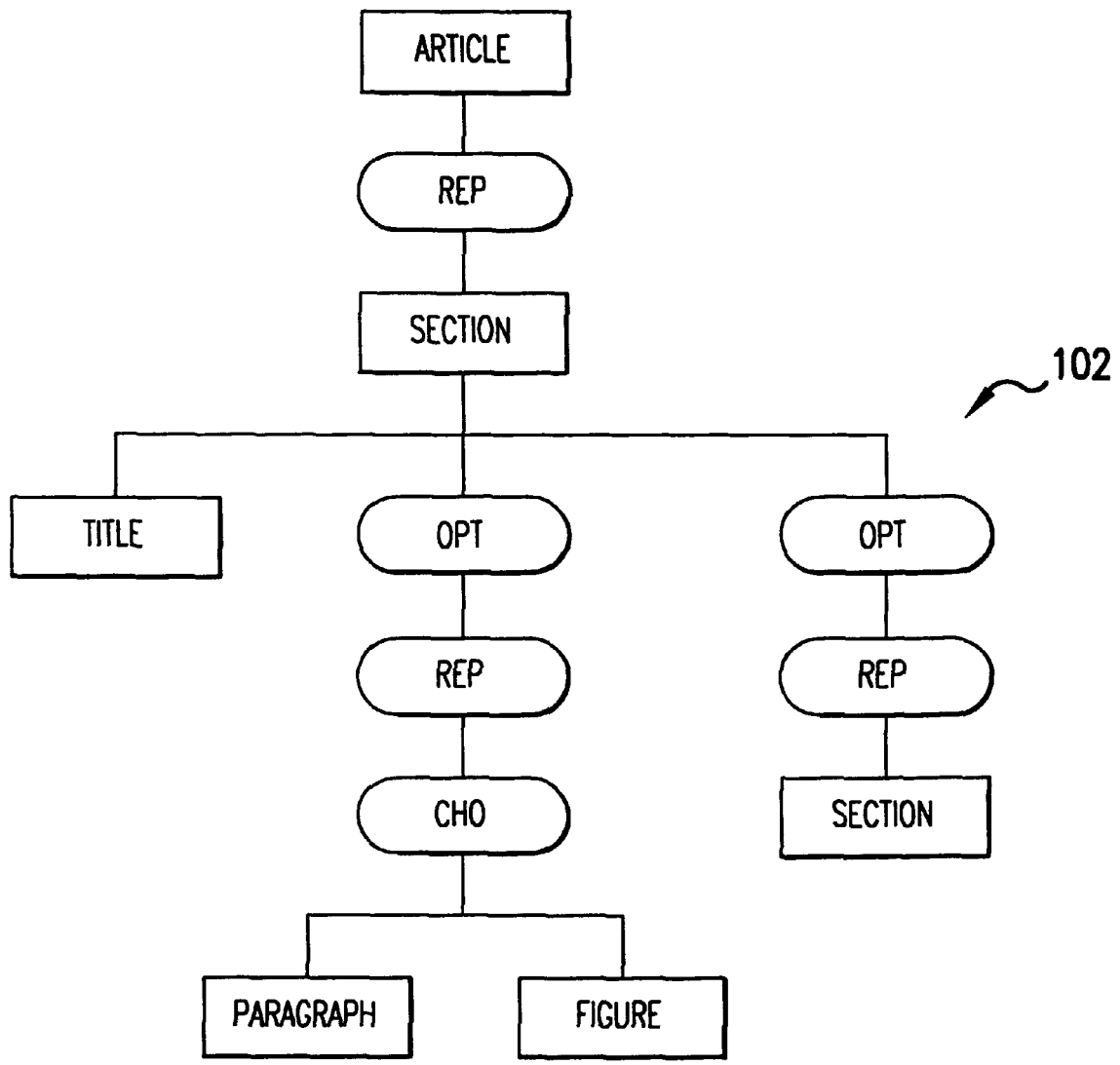
FIG. 47 is a diagram showing an example of a document type.
Figure 48:
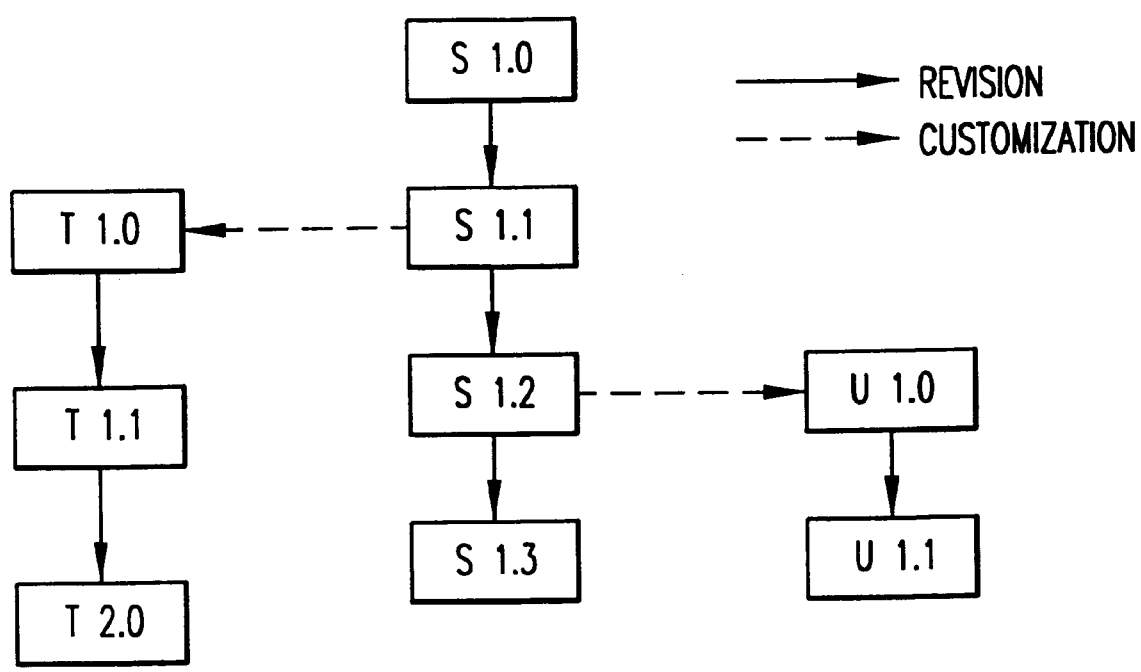
FIG. 48 is a diagram showing an example of derivation of a document type.
Figure 49:
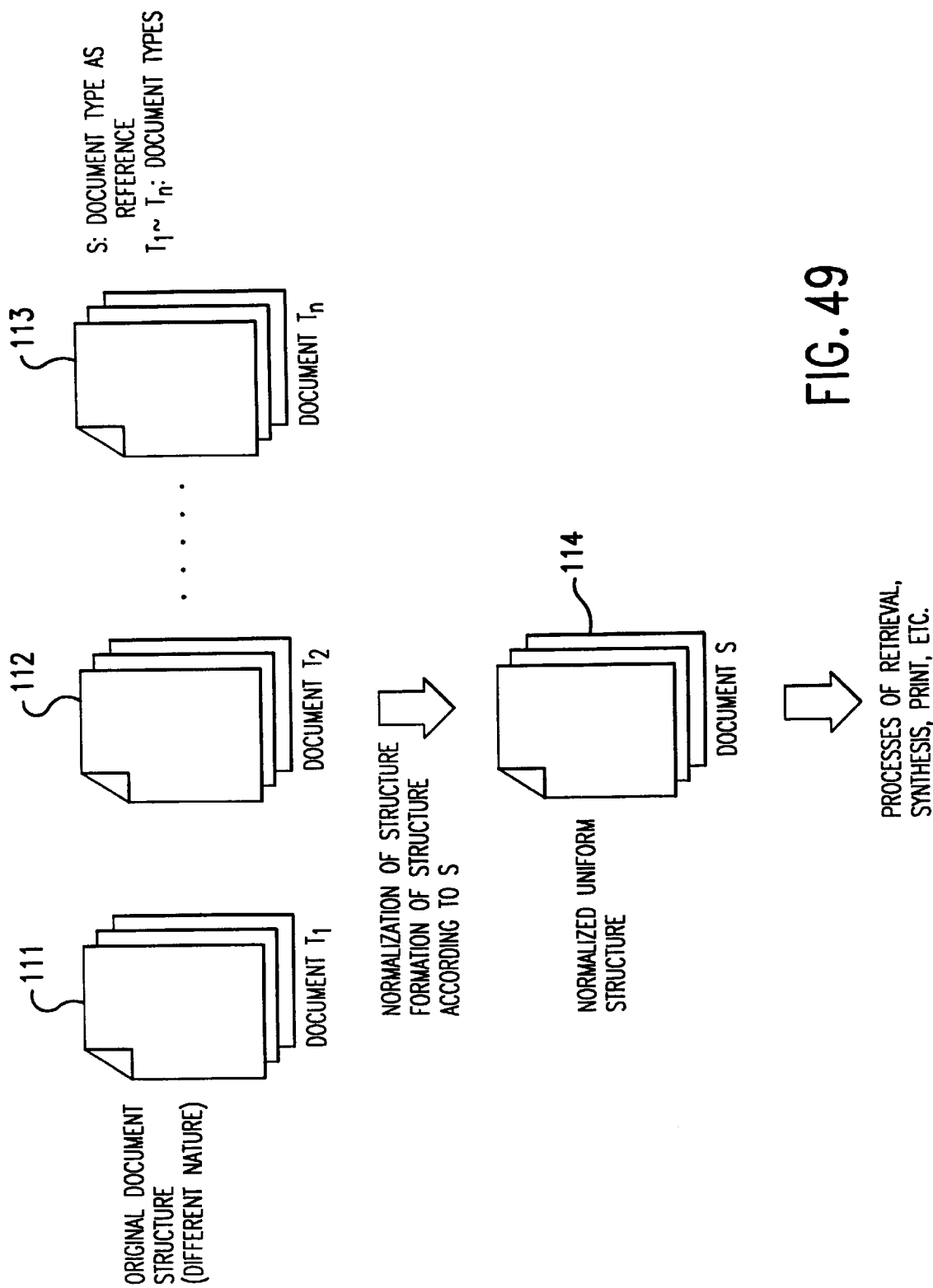
FIG. 49 is a diagram showing a process using normalization of a logical structure.

According to the invention, when there is a derivative relationship of document types as shown in FIG. 48, the relationship between the language defined by respective document types can be determined. FIG. 45 is a diagram showing an example of the relationship between languages defined by document types. It is understood that, for example, when it is determined that the language defined by the document type 45 shown in FIG. 44 has the relationship as shown in FIG. 49, not only a document T2.0 but also documents defined by S1.1, T1.0, and T1.1 can be simultaneously operated by a process defined for the document T2.0. In this case, documents of any document types can be dealt with as documents T2.0 without changing the original logical structure. Therefore, there is a small burden on the user.

The following modifications of the invention can be considered.

When a document type is revised, a check can be made to see whether all of documents of an old version can be accurately analyzed according to a document type definition of a new version or whether or not all of documents of the new version can be accurately analyzed according to the document type definition of the old version. When all of the documents of the old version can be accurately analyzed according to the document type definition of the new version, all of the documents of the old version can be processed by a document processing program formed so as to process documents of the new version. Conversely, when all of the documents of the new version can be accurately analyzed according to the document type definition of the old version, a document processing program which has been used until then can also be applied to the new document type.

A check can be also made when a document type is customized. That is, there is the possibility that a document which does not conform to the original document type definition is formed based on customization. A customized document type cannot always be dealt with correctly by a process specified with respect to the original document type. According to the invention, whether such a document derived by customization exists can be checked.

Further, according to the invention, a modification as shown below can also be considered.

When the document type is checked, a collation is performed not by considering all of the elements of the document type, but by ignoring a specific part. For example, by excluding specific elements showing a figure and the like from the target to be checked, a document type having a common structure of a chapter or the like can be obtained.

A process program or a process description can be also retrieved. That is, a process program or a process description which can be applied to a document type as a target to be processed is retrieved on the basis of the relationship between document types and the obtained program or description is applied to the target document type. For example, when a document of a certain document type is printed, if a style sheet has not been prepared for the document type, a style sheet which is a super set of the document type can be used. Whether a style sheet defined for a document type as a subset of the document type or a document type having intersection without no inclusive relationship can be applied is checked by seeing if parsing can be actually performed by the document types.

The constructed finite-state automaton can be stored and reused. That is, although the finite-state automaton for collation is constructed each time a check is made in the embodiment, it is also possible that a finite-state automaton is constructed when a document type is defined or stored, the finite-state automaton is stored in a main storage, an object oriented database, or the like, and the finite-state automaton stored is used upon collation.

The result of check can be also stored. Although the document type defining the language having the inclusive relationship between the language defined by the document type designated by the instruction of the process is obtained each time the document is processed, it is also possible that the document type is checked only once when it is defined or stored and the result of such check stored. For example, in case of the SGML document, if an entity parameter is used in definition of the document type, the element declaration can be changed by defining the entity parameter in the document type declaration subset. That is, the document type can be customized in every document. When document types can be customized as mentioned above, the result is used when the document type is not customized, and the inclusive relationship of the languages defined by the document types is checked only when the document type is customized.

The invention can also be applied to support for using an architectural form. Even when a document type is formed according to the architectural form, it is not known whether a document of the document type is adapted to the meta-document type. There is the possibility that a document may not conform to the meta-document type depending on the definition of the document type. There is also a situation where some documents conform and others do not conform. Due to the nature of the architectural form, the user forming a document has to consider both the legitimacy as SGML and the conformity to the meta-document type.

When the document type according to the architectural form is defined, whether all of documents can conform to the original architectural form can be checked. In the case where all of the documents conform, the user can edit the documents without considering the conformity to the architectural form.

The embodiment can also be used with SDA. When using only a rule, the element names that correspond in a one-to-one manner, the names of a canonical document type are substituted for the element name and then a collating process is executed, thereby expanding a range of collation.

As mentioned above, according to the invention, by providing the means for specifying the document type and defining the language intersecting the language defined by the document type designated by the instruction of the document process, documents can be simultaneously constructed. It is consequently unnecessary to add information to the document type, and the process for forming the logical structure or preparation for the process are not needed to compose the documents.

According to the invention, in contrast to the architectural form and SDA as opposed to the conventional techniques, the definition of the meta-document type or canonical document type and the definition of the relationship between the document type and the meta-document or canonical document type are unnecessary and the burden on a document type designer and/or a user is remarkably reduced.

In contrast to the duplexing of logical structure (Japan Published Unexamined Patent Appln. No. Hei 8-190542), it is unnecessary to define the rule for forming the logical structure in the database. It is also unnecessary to define the rule of forming the logical structure of a desired document type from the logical structure in the database.

In contrast to the semantic description (Japan Published Unexamined Patent Appln. No. Hei 7-319917), there is no need to add semantics of elements of a document type to the element definition when a document type is defined. Nor is it necessary to form a logical structure of a desired document type from a logical structure obtained as a result of retrieval.

Further, the invention has the advantage that a document described according to a certain document type can be dealt with as if the document were conforming to a plurality of document types.

The document type of the structured document in the above description is a kind of hierarchical regular expression. The invention can be applied not only to the document type of the structured document but also to all information expressed by the hierarchical regular expression.

According to the document processing apparatus of the invention as mentioned above, by providing a document type collating means for specifying a document type which defines a language having a predetermined relationship with a language defined by a document type designated by an instruction of a document process, with instruction to a single document type, documents of document types which can form documents satisfying the conditions of the document type can be simultaneously processed. In order to process the documents, it is not necessary to add information to the document type, execute a process for forming a logical structure, nor to prepare for the process, therefore, the burden on the user is small.

According to the document type determining method of the invention, finite-state automatons are constructed from the content models of the elements of the first and second document types, the finite-state automatons constructed from the elements having the same name are collated, the relationships (inclusion or intersection) of languages received by the content models is determined, and the inclusive relationship of the document types is determined on the basis of the determination result. Consequently, only by inputting the first and second document types, can the user check whether there is an inclusive or an intersectional relationship between the inputted document types, and the inclusion or intersection relationship can easily be determined.

According to the hierarchical regular expression determining method of the invention, finite-state automatons are constructed from the content models of elements of the first and second hierarchical regular expressions, finite-state automatons constructed from elements having the same name are collated, the relationships (inclusion or intersection) of the languages received by the content models is determined, and the presence or absence of the relationships is determined on the basis of the result. Consequently, only by inputting the first and second hierarchical regular expressions, can the user determine whether there is an inclusive or an intersectional relationship in the inputted hierarchical regular expressions. Thus, the inclusive or intersecting relationship in the hierarchical regular expressions can easily be determined.

What is claimed is:

1. A document processing apparatus in which structured documents are processed, comprising:

a document type holding means for holding information of a plurality of document types;

a document holding means for holding a plurality of documents each of which is composed according to any one of the document types held in the document type holding means;

a document process designating means for designating a target document type as a target to be processed and process contents to be executed;

a document type collating means for constructing finite-state automatons from a content model defining lower elements which can be included in an element of a document type based on the document types held in the document type holding means and for comparing said finite-state automaton of the target document type with finite-state automatons of document types other than the target document type, thereby obtaining related document types having a predetermined relationship with the target document type; and a document process executing means for executing the process instructed by the document process designating means on a document representing the target document type and a document of the related document type which are targets to be processed among the documents held by the document holding means.

2. The apparatus according to claim 1, wherein the document type collating means comprises:

finite-state automaton constructing means for constructing a finite-state automaton from the content model defining lower elements which can be included in the element of a document type based on an inputted document type;

a finite-state automaton collating means for determining whether an inclusive and intersectional relationship exist between languages received by two finite-state automatons; and a document type collation control means for inputting the document type in the document type holding means to the finite-state automaton constructing means, acquiring a finite-state automaton constructed from each document type, inputting a set of finite-state automatons constructed from elements having the same name included in the target document type and the other document type, to the finite-state automaton collating means, determining the relationship of the two document types on the basis of a determination result of the finite-state automaton collating means, and obtaining a related document type having a predetermined relationship with the target document type.

3. The apparatus according to claim 1, wherein when there is an omissible document type including one or more omissible elements, the document type collating means generates a document type for collation defining the same language as the omissible document type without including omissible elements, and a finite-state automaton is constructed from the document type for collation in place of the omissible document type.

4. The apparatus according to claim 1, wherein the document process designating means gives instructions which includes a relationship with the target document type which should be satisfied by a document type as the target to be processed, and the document type collating means uses the document type having the relationship with the target document type generated by the document process designating means.

5. The apparatus according to claim 1, wherein the document process designating means gives instructions including an instruction designating a specific element to be used as a target, and the document type collating means obtains a related document type having a predetermined relationship with the target document type by comparing finite-state automaton constructed from the specific element included in the target document type with a finite-state automaton constructed from the specific element included in another document type.

6. The apparatus according to claim 1, wherein the document process executing means executes a retrieving process.

7. A document type determining method for determining an inclusive relationship of a document type by determining a possible structure of a structured document, comprising:

a document type inputting step for designating the first document type and the second document type which are to be compared;

a finite-state automaton constructing step for constructing finite-state automatons from content models defining lower elements which can be included in elements in the first and second document types, respectively;

a finite-state automaton collating step for determining whether a language received by the finite-state automaton constructed from the first document type is included in a language received by the finite-state automaton constructed from the second document type, the two finite-state automatons being constructed from the elements of the same name in the first and second document types, respectively; and a document type collating step for determining the presence or absence of the inclusive relationship by checking whether an element of the same name as the element in the first document type exists in the second document type and the language defined by the element in the first document type is included in the language defined by the element of the second document style.

8. The method according to claim 7, further comprising:

a step for constructing a document type for collation defining the same language as that of an omissible document type without including omissible elements when the first document type or the second document type is an omissible document type which includes an omissible element after the document type inputting step, and finite-state automaton is constructed from the document type for collation in place of the omissible document type in the finite-state automaton constructing step.

9. The method according to claim 7, wherein a specific element name which represents a target to be determined is inputted in the document type inputting step and an inclusive relationship between a language defined by the element in the first document type and a language defined by the element in the second document type is determine with respect to only the specific clement name as a target.

10. A document type determining method for determining the intersecting relationship between document types and determining possible structures of structured documents, comprising;

a document type inputting step for designating the first document type and the second document type which are to be compared;

a finite-state automaton constructing step for constructing finite-state automatons from content models defining lower elements which can be included in elements in the first and second document types respectively;

a finite-state automaton collating step of determining whether the intersecting relationship exists between two finite-state automatons constructed from the elements of the same name existing in both of the first and second document types, respectively; and a document type collating step for determining the presence or absence of the intersecting relationship by checking whether there is a document which can be formed from both of the first document type and the second document type from the determination result of the intersection of the languages of the elements existing in both of the first and second document types.

11. The method according to claim 10, wherein when either the first document type or the second document type is an omissible document type which includes an omissible element, a step of constructing a document type for collation defining the same language as that of the omissible document type without including the omissible clement is further provided after the document type inputting step, and the finite-state automaton is constructed from the document type for collation in place of the omissible document type in the finite-state automaton constructing step.

12. The method according to claim 10, wherein a specific element name used as a target to be determined is also inputted in the document type inputting step and the intersecting relationship between languages defined by the elements in the first and second document types is determined with respect to only the elements having, the inputted specific element name as a target.

13. A hierarchical regular expression determining method for determining the inclusive relationship between languages received by hierarchical regular expressions, comprising:

a hierarchical regular expression inputting step of designating the first hierarchical regular expression and the second hierarchical regular expression which are to be compared;

a finite-state automaton constructing step of constructing finite-state automatons from regular expressions defining lower elements which can be included in elements in the first and second hierarchical regular expressions, respectively;

a finite-state automaton collating step of determining whether the language received by the finite-state automaton constructed from the first hierarchical regular expression is included in the language received by the finite-state automaton constructed from the second hierarchical regular expression, the two finite-state automatons being constructed from elements of the same name in the first and second hierarchical regular expressions;

and a hierarchical regular expression collating method of collating the presence or absence of the inclusive relationship by checking whether the clement of the same name as the element in the first hierarchical regular expression exists in the second hierarchical regular expression and a language defined by the element in the first hierarchical regular expression is included in a language defined by the element in the second hierarchical regular expression.

14. A hierarchical regular expression determining method for determining the intersecting relationship between hierarchical regular expressions, comprising:

a hierarchical regular expression inputting step of designating a first hierarchical regular expression and a second hierarchical regular expression which are to be compared;

a finite-state automaton constructing step for constructing finite-state automatons from regular expressions defining lower elements which can be included in respective elements in the first and second hierarchical, regular expressions;

a finite-state automaton collating step of determining whether the finite-state automatons constructed from the elements of the same name existing in both of the first and second hierarchical regular expressions have an intersecting relationship; and a hierarchical regular expression collating step of determining the presence or absence of the intersecting relationship by checking whether there is a document which can be formed from both of the first and second hierarchical regular expressions from the determination result of the intersection of the elements existing in both of the first and the second hierarchical regular expressions.

* * * * *